(12) United States Patent
Guttmann

(10) Patent No.: US 11,645,551 B2
(45) Date of Patent: May 9, 2023

(54) PRESENTING INFERENCE MODELS BASED ON INTERRELATIONSHIPS

(71) Applicant: Moshe Guttmann, Tel Aviv (IL)

(72) Inventor: Moshe Guttmann, Tel Aviv (IL)

( * ) Notice: Subject to any disclaimer, the term of this patent is extended or adjusted under 35 U.S.C. 154(b) by 889 days.

(21) Appl. No.: 16/441,115

(22) Filed: Jun. 14, 2019

(65) Prior Publication Data

US 2019/0294986 A1 Sep. 26, 2019

Related U.S. Application Data

(60) Provisional application No. 62/685,914, filed on Jun. 16, 2018.

(51) Int. Cl.
| | | |
|---|---|---|
| *G06N 5/04* | (2006.01) | |
| *G06N 20/00* | (2019.01) | |
| *G06K 9/62* | (2022.01) | |
| *G06N 20/20* | (2019.01) | |
| *G06N 5/047* | (2023.01) | |
| *G06F 3/04845* | (2022.01) | |
| *G06N 20/10* | (2019.01) | |
| *G10L 15/065* | (2013.01) | |
| *G06N 5/043* | (2023.01) | |
| *G06V 20/20* | (2022.01) | |
| *G06N 3/08* | (2023.01) | |
| *G06N 3/04* | (2023.01) | |

(52) U.S. Cl.
CPC ........... *G06N 5/04* (2013.01); *G06F 3/04845* (2013.01); *G06K 9/6219* (2013.01); *G06K 9/6262* (2013.01); *G06K 9/6296* (2013.01); *G06N 3/08* (2013.01); *G06N 5/043* (2013.01); *G06N 5/047* (2013.01); *G06N 20/00* (2019.01); *G06N 20/10* (2019.01); *G06N 20/20* (2019.01); *G06V 20/20* (2022.01); *G10L 15/065* (2013.01); *G06N 3/04* (2013.01)

(58) Field of Classification Search
None
See application file for complete search history.

(56) References Cited

U.S. PATENT DOCUMENTS

| | | | | |
|---|---|---|---|---|
| 9,418,337 | B1 * | 8/2016 | Elser | G06N 7/005 |
| 10,460,235 | B1 * | 10/2019 | Truong | G06T 7/254 |
| 10,810,491 | B1 * | 10/2020 | Xia | G06N 3/08 |
| 2018/0089592 | A1 * | 3/2018 | Zeiler | G06N 20/00 |
| 2018/0285685 | A1 * | 10/2018 | Singh | G06F 16/9038 |
| 2019/0138935 | A1 * | 5/2019 | Dasgupta | G06N 20/00 |
| 2019/0173918 | A1 * | 6/2019 | Sites | H04L 63/1433 |
| 2020/0193266 | A1 * | 6/2020 | Scheidegger | G06N 3/04 |

* cited by examiner

*Primary Examiner* — Alan Chen

(57) ABSTRACT

Systems and methods for presenting inference models based on interrelationships among inference models are provided. For example, information related to a group of at least three inference models may be obtained. Further, in some examples, a plurality of interrelationship records may be obtained, wherein each interrelationship record may correspond to one subgroup of the group of at least three inference models, and each subgroup may comprise at least two inference models. Further, in some examples, the plurality of interrelationship records may be used to determine information related to a first inference model of the group of at least three inference models. Further, in some examples, the determined information may be used to present the first inference model to a user.

19 Claims, 20 Drawing Sheets

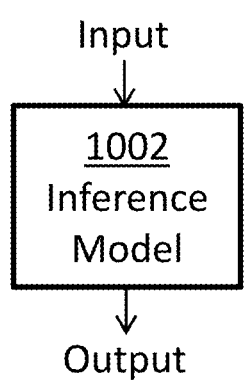 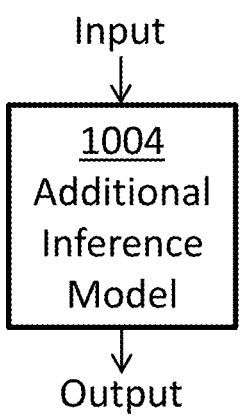 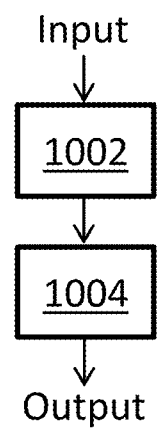 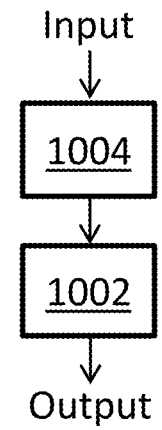
FIG. 10A  FIG. 10B  FIG. 10C  FIG. 10D
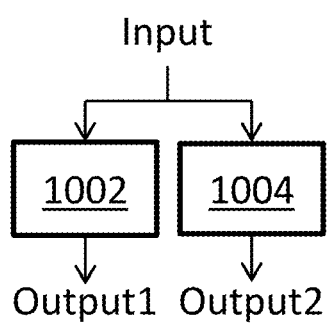 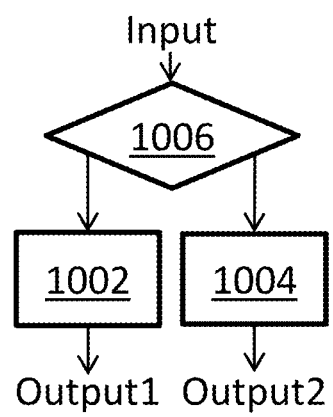 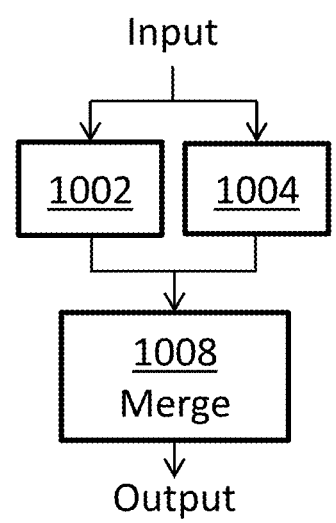
FIG. 10E  FIG. 10F  FIG. 10G

1500

1510 Receiving an indication of a selected object type

1520 Presenting an image to a user

1530 Receiving an input to an object selection tool

1540 Selecting a region of the image corresponding to an object of the selected object type in the image based on the selected object type and the input to the object selection tool

FIG. 15

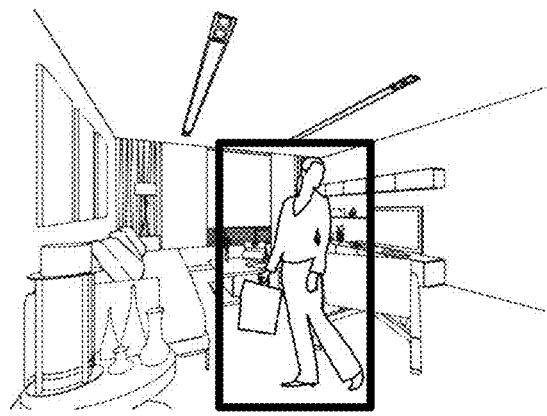
FIG. 16A      FIG. 16B      FIG. 16C
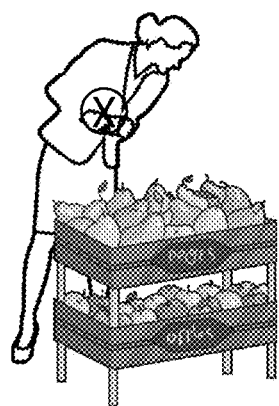
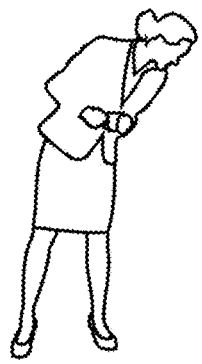
FIG. 16D      FIG. 16E      FIG. 16F

PRESENTING INFERENCE MODELS BASED ON INTERRELATIONSHIPS

CROSS REFERENCES TO RELATED APPLICATIONS

This application claims the benefit of priority of U.S. Provisional Patent Application No. 62/685,914, filed on Jun. 16, 2018. The entire content of all of the above-identified application is herein incorporated by reference.

BACKGROUND

Technological Field

The disclosed embodiments generally relate to systems and methods for presenting inference models. More particularly, the disclosed embodiments relate to systems and methods for presenting inference models based on interrelationships among inference models.

Background Information

Computerized devices are now prevalent, and data produced and maintained by those devices is increasing.

Audio sensors are now part of numerous devices, and the availability of audio data produced by those devices is increasing.

Image sensors are now part of numerous devices, from security systems to mobile phones, and the availability of images and videos produced by those devices is increasing.

Machine learning algorithms, that use data to generate insights, rules and algorithms, are widely used.

SUMMARY

In some embodiments, systems and methods for the creation, maintenance, and usage of datasets and annotations are provided.

In some embodiments, systems and methods for presenting inference models based on interrelationships among inference models are provided.

In some embodiments, information related to a group of at least three inference models may be obtained. Further, in some examples, a plurality of interrelationship records may be obtained, wherein each interrelationship record may correspond to one subgroup of the group of at least three inference models, and each subgroup may comprise at least two inference models. Further, in some examples, the plurality of interrelationship records may be used to determine information related to a first inference model of the group of at least three inference models. Further, in some examples, the determined information may be used to present the first inference model to a user.

Consistent with other disclosed embodiments, non-transitory computer-readable storage media may store data and/or computer implementable instructions for carrying out any of the methods described herein.

BRIEF DESCRIPTION OF THE DRAWINGS

FIGS. 10A, 10B, 10C, 10D, 10E, 10F and 10G are schematic illustrations of different configurations for using inference models consistent with embodiments of the present disclosure.

FIG. 15 illustrates an example of a method for class aware object marking.

FIGS. 16A, 16B, 16C, 16D, 16E and 16F are schematic illustrations of images consistent with embodiments of the present disclosure.

DESCRIPTION

Figure 1A:
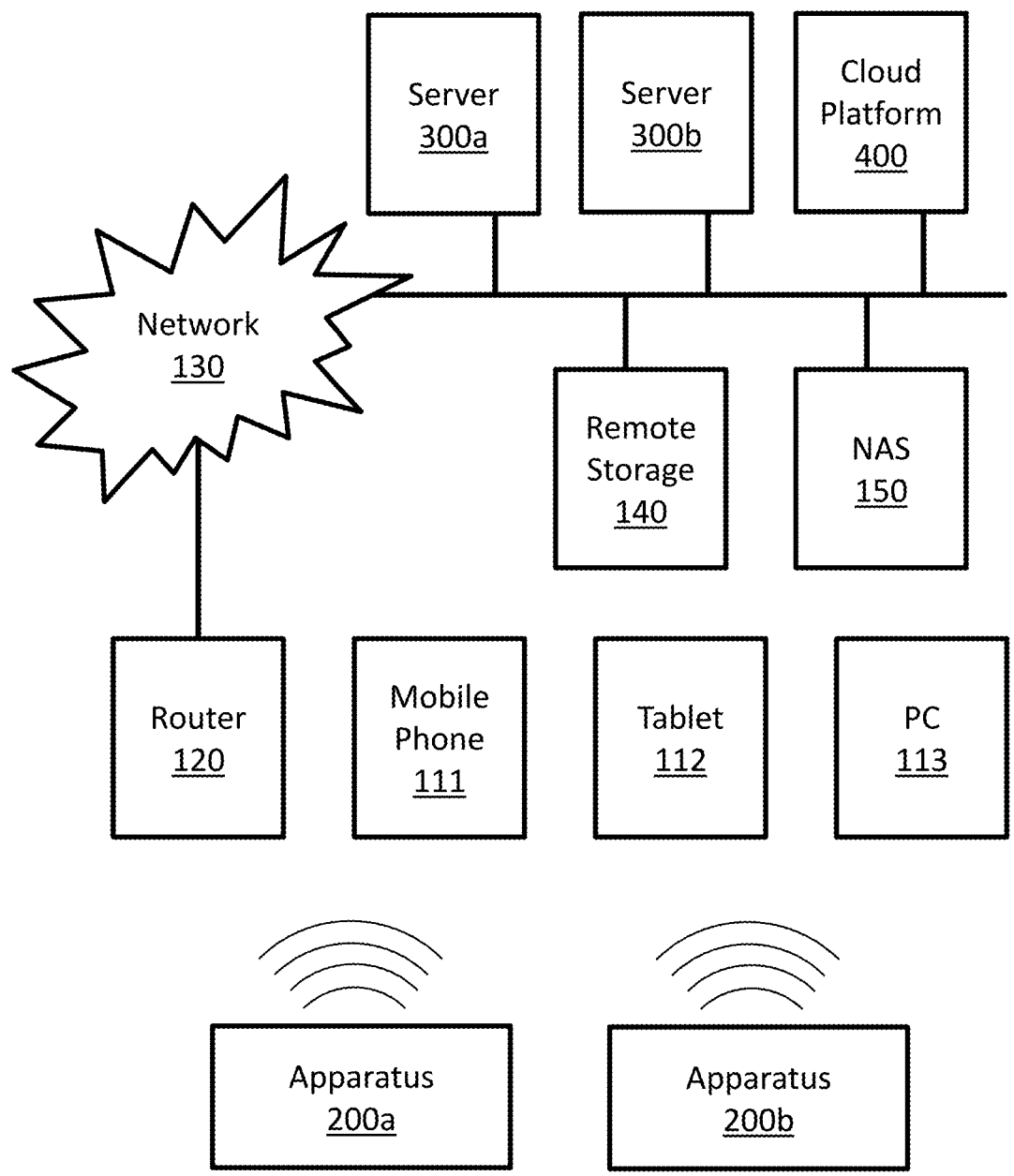
FIGS. 1A and 1B are block diagrams illustrating some possible implementations of a communicating system.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include action and/or processes of a computer that manipulate and/or transform data into other data, said data represented as physical quantities, for example such as electronic quantities, and/or said data representing the physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus the appearance of the phrase "one case", "some cases", "other cases" or variants thereof does not necessarily refer to the same embodiment(s). As used herein, the term "and/or" includes any and all combinations of one or more of the associated listed items.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The term "image sensor" is recognized by those skilled in the art and refers to any device configured to capture images, a sequence of images, videos, and so forth. This includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of image sensor technologies may include: CCD, CMOS, NMOS, and so forth. 3D sensors may be implemented using different technologies, including: stereo camera, active stereo camera, time of flight camera, structured light camera, radar, range image camera, and so forth.

The term "audio sensor" is recognized by those skilled in the art and refers to any device configured to capture audio data. This includes sensors that convert audio and sounds into digital audio data.

The term "electrical impedance sensor" is recognized by those skilled in the art and refers to any sensor configured to measure the electrical connectivity and/or permittivity between two or more points. This include but not limited to: sensors configured to measuring changes in connectivity and/or permittivity over time; sensors configured to measure the connectivity and/or permittivity of biological tissues; sensors configured to measure the connectivity and/or permittivity of parts of body based, at least in part, on the connectivity and/or permittivity between surface electrodes; sensors configured to provide Electrical Impedance Tomography images, and so forth. Such sensors may include but not limited to: sensors that apply alternating currents at a single frequency; sensors that apply alternating currents at multiple frequencies; and so forth. Additionally, this may also include sensors that measure the electrical resistance between two or more points, which are sometimes referred to as ohmmeter.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is a block diagram illustrating a possible implementation of a communicating system. In this example, apparatuses 200a and 200b may communicate with server 300a, with server 300b, with cloud platform 400, with each other, and so forth. Possible implementations of apparatuses 200a and 200b may include apparatus 200 as described in FIGS. 2A and 2B. Possible implementations of servers 300a and 300b may include server 300 as described in FIG. 3. Some possible implementations of cloud platform 400 are described in FIGS. 4A, 4B and 5. In this example apparatuses 200a and 200b may communicate directly with mobile phone 111, tablet 112, and personal computer (PC) 113. Apparatuses 200a and 200b may communicate with local router 120 directly, and/or through at least one of mobile phone 111, tablet 112, and personal computer (PC) 113. In this example, local router 120 may be connected with a communication network 130. Examples of communication network 130 may include the Internet, phone networks, cellular networks, satellite communication networks, private communication networks, virtual private networks (VPN), and so forth. Apparatuses 200a and 200b may connect to communication network 130 through local router 120 and/or directly. Apparatuses 200a and 200b may communicate with other devices, such as servers 300a, server 300b, cloud platform 400, remote storage 140 and network attached storage (NAS) 150, through communication network 130 and/or directly.

Figure 1B:
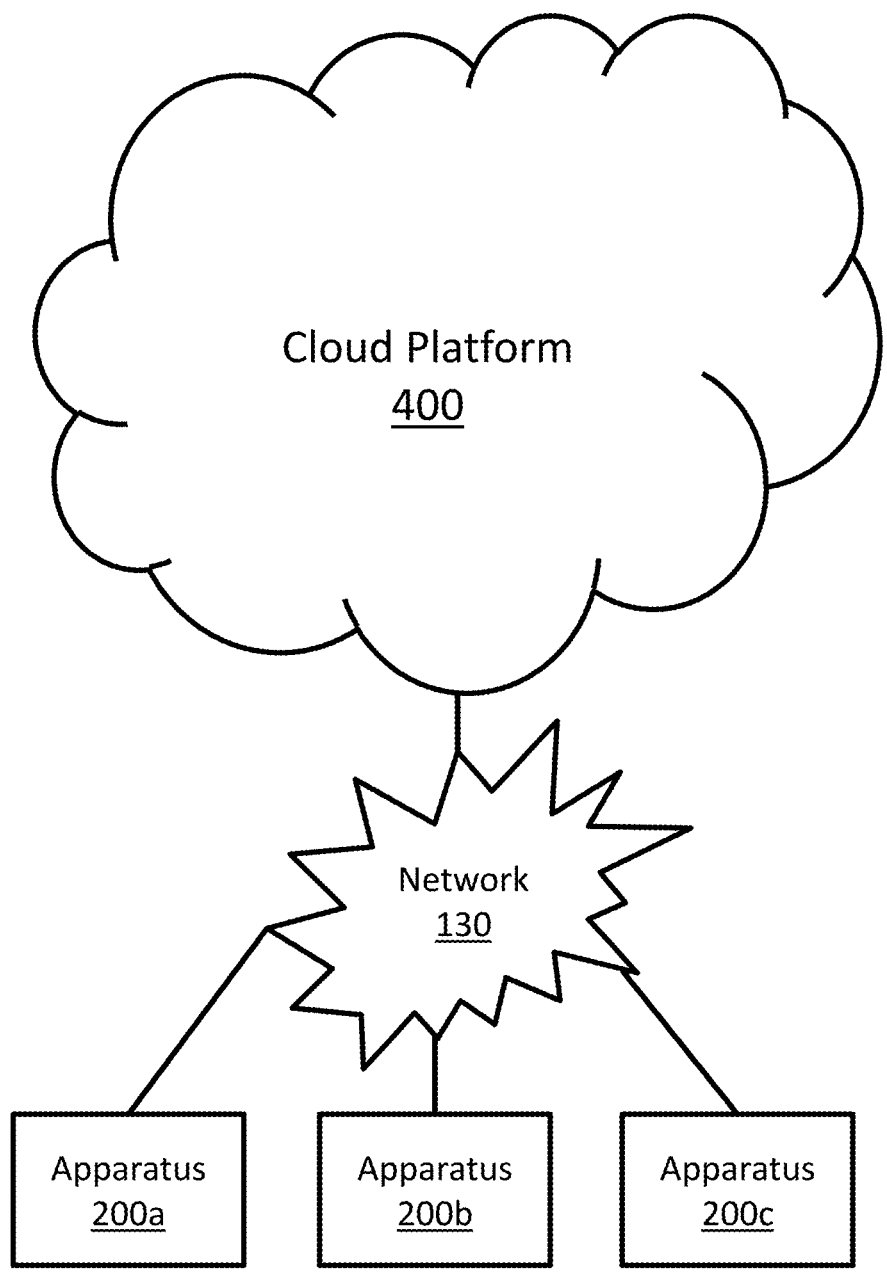

FIG. 1B is a block diagram illustrating a possible implementation of a communicating system. In this example, apparatuses 200a, 200b and 200c may communicate with cloud platform 400 and/or with each other through communication network 130. Possible implementations of apparatuses 200a, 200b and 200c may include apparatus 200 as described in FIGS. 2A and 2B. Some possible implementations of cloud platform 400 are described in FIGS. 4A, 4B and 5.

FIGS. 1A and 1B illustrate some possible implementations of a communication system. In some embodiments, other communication systems that enable communication between apparatus 200 and server 300 may be used. In some embodiments, other communication systems that enable communication between apparatus 200 and cloud platform 400 may be used. In some embodiments, other communication systems that enable communication among a plurality of apparatuses 200 may be used.

Figure 2A:
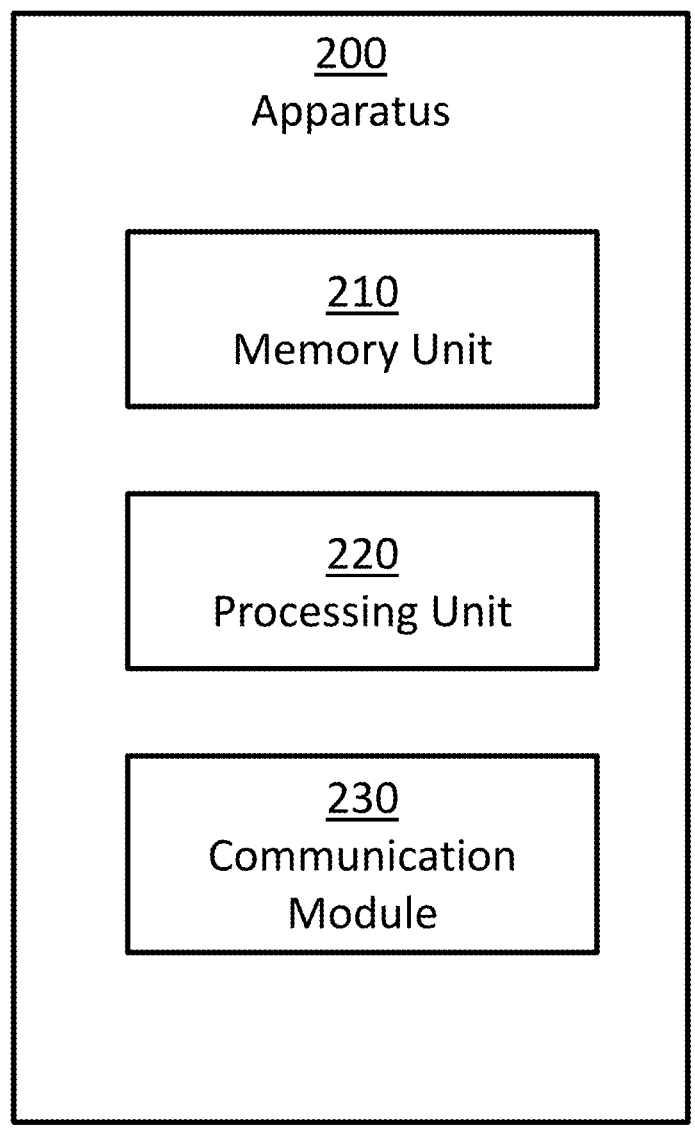
FIGS. 2A and 2B are block diagrams illustrating some possible implementations of an apparatus.

FIG. 2A is a block diagram illustrating a possible implementation of apparatus 200. In this example, apparatus 200 may comprise: one or more memory units 210, one or more processing units 220, and one or more communication modules 230. In some implementations, apparatus 200 may comprise additional components, while some components listed above may be excluded.

Figure 2B:
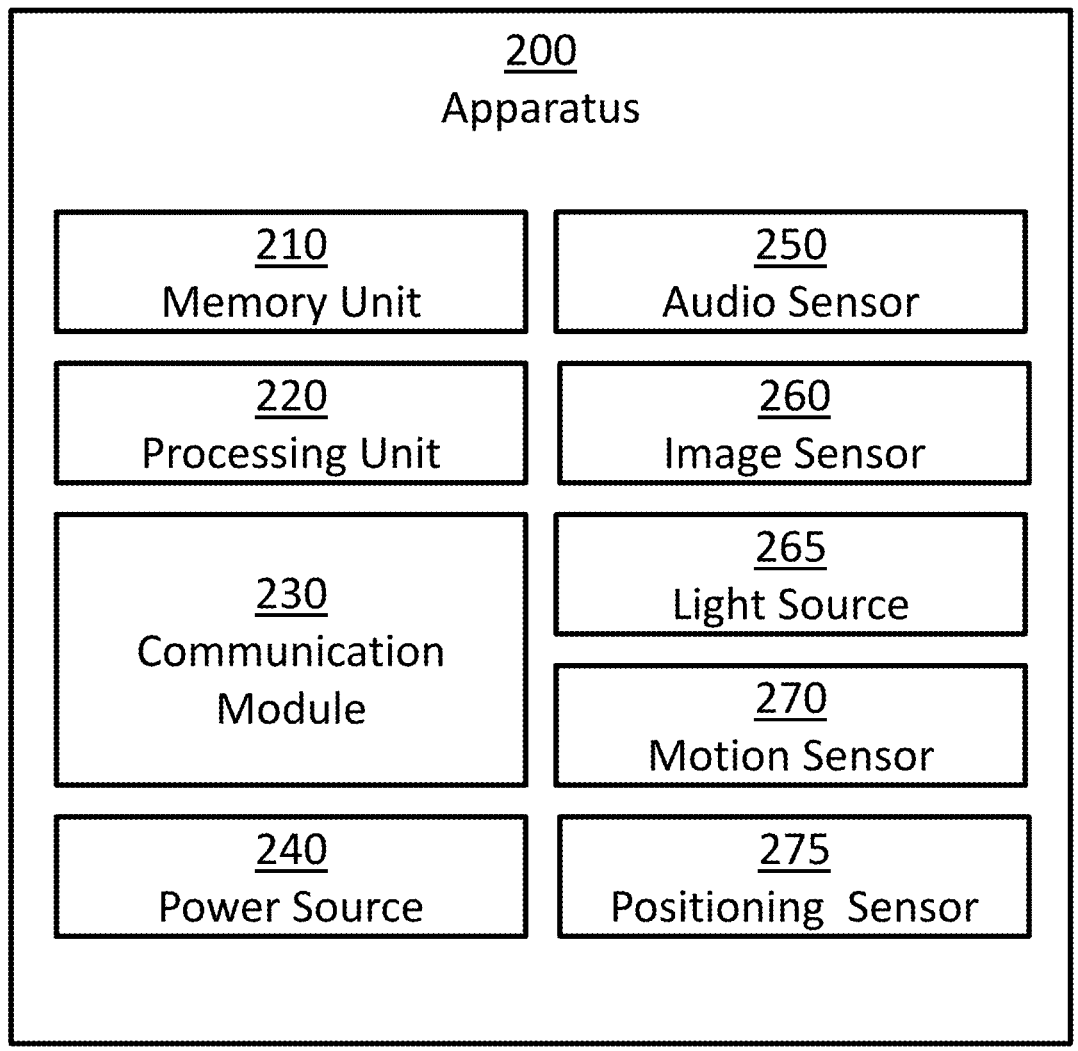

FIG. 2B is a block diagram illustrating a possible implementation of apparatus 200. In this example, apparatus 200 may comprise: one or more memory units 210, one or more processing units 220, one or more communication modules 230, one or more power sources 240, one or more audio sensors 250, one or more image sensors 260, one or more light sources 265, one or more motion sensors 270, and one or more positioning sensors 275. In some implementations, apparatus 200 may comprise additional components, while some components listed above may be excluded. For example, in some implementations apparatus 200 may also comprise at least one of the following: one or more barometers; one or more pressure sensors; one or more proximity sensors; one or more electrical impedance sensors; one or more electrical voltage sensors; one or more electrical current sensors; one or more user input devices; one or more output devices; and so forth. In another example, in some implementations at least one of the following may be excluded from apparatus 200: memory units 210, communication modules 230, power sources 240, audio sensors 250, image sensors 260, light sources 265, motion sensors 270, and positioning sensors 275.

In some embodiments, one or more power sources 240 may be configured to: power apparatus 200; power server 300; power cloud platform 400; and/or power computational node 500. Possible implementation examples of power sources 240 may include: one or more electric batteries; one or more capacitors; one or more connections to external power sources; one or more power convertors; any combination of the above; and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible implementation examples of the processing units 220 may include: one or more single core processors, one or more multicore processors; one or more controllers; one or more application processors; one or more system on a chip processors; one or more central processing units; one or more graphical processing units; one or more neural processing units; any combination of the above; and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors 250; image sensors 260; motion sensors 270; positioning sensors 275; chemical sensors; temperature sensors; barometers; pressure sensors; proximity sensors; electrical impedance sensors; electrical voltage sensors; electrical current sensors; and so forth.

In some embodiments, the one or more audio sensors 250 may be configured to capture audio by converting sounds to digital information. Some examples of audio sensors 250 may include: microphones, unidirectional microphones, bidirectional microphones, cardioid microphones, omnidirectional microphones, onboard microphones, wired microphones, wireless microphones, any combination of the above, and so forth. In some examples, the captured audio may be stored in memory units 210. In some additional examples, the captured audio may be transmitted using communication modules 230, for example to other computerized devices, such as server 300, cloud platform 400, computational node 500, and so forth. In some examples, processing units 220 may control the above processes. For example, processing units 220 may control at least one of: capturing of the audio; storing the captured audio; transmitting of the captured audio; and so forth. In some cases, the captured audio may be processed by processing units 220. For example, the captured audio may be compressed by processing units 220; possibly followed: by storing the compressed captured audio in memory units 210; by transmitted the compressed captured audio using communication modules 230; and so forth. In another example, the captured audio may be processed using speech recognition algorithms. In another example, the captured audio may be processed using speaker recognition algorithms.

In some embodiments, the one or more image sensors 260 may be configured to capture visual information by converting light to: images; sequence of images; videos; and so forth. In some examples, the captured visual information may be stored in memory units 210. In some additional examples, the captured visual information may be transmitted using communication modules 230, for example to other computerized devices, such as server 300, cloud platform 400, computational node 500, and so forth. In some examples, processing units 220 may control the above processes. For example, processing units 220 may control at least one of: capturing of the visual information; storing the captured visual information; transmitting the captured visual information; and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum.

In some embodiments, the one or more motion sensors 270 may be configured to perform at least one of the following: detect motion of objects in the environment of apparatus 200; measure the velocity of objects in the environment of apparatus 200; measure the acceleration of objects in the environment of apparatus 200; detect motion of apparatus 200; measure the velocity of apparatus 200; measure the acceleration of apparatus 200; and so forth. In some implementations, the one or more motion sensors 270 may comprise one or more accelerometers configured to detect changes in proper acceleration and/or to measure proper acceleration of apparatus 200. In some implementations, the one or more motion sensors 270 may comprise one or more gyroscopes configured to detect changes in the orientation of apparatus 200 and/or to measure information related to the orientation of apparatus 200. In some implementations, motion sensors 270 may be implemented using image sensors 260, for example by analyzing images captured by image sensors 260 to perform at least one of the following tasks: track objects in the environment of apparatus 200; detect moving objects in the environment of apparatus 200; measure the velocity of objects in the environment of apparatus 200; measure the acceleration of objects in the environment of apparatus 200; measure the velocity of apparatus 200, for example by calculating the egomotion of image sensors 260; measure the acceleration of apparatus 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270: may be stored in memory units 210, may be processed by processing units 220, may be transmitted and/or received using communication modules 230, and so forth.

In some embodiments, the one or more positioning sensors 275 may be configured to obtain positioning information of apparatus 200, to detect changes in the position of apparatus 200, and/or to measure the position of apparatus 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, the one or more chemical sensors may be configured to perform at least one of the following: measure chemical properties in the environment of apparatus 200; measure changes in the chemical properties in the environment of apparatus 200; detect the present of chemicals in the environment of apparatus 200; measure the concentration of chemicals in the environment of apparatus 200. Examples of such chemical properties may include: pH level, toxicity, temperature, and so forth. Examples of such chemicals may include: electrolytes, particular enzymes, particular hormones, particular proteins, smoke, carbon dioxide, carbon monoxide, oxygen, ozone, hydrogen, hydrogen sulfide, and so forth. In some examples, information captured using chemical sensors may be stored in memory units 210, may be processed by processing units 220, may be transmitted and/or received using communication modules 230, and so forth.

In some embodiments, the one or more temperature sensors may be configured to detect changes in the temperature of the environment of apparatus 200 and/or to measure the temperature of the environment of apparatus 200. In some examples, information captured using temperature sensors may be stored in memory units 210, may be processed by processing units 220, may be transmitted and/or received using communication modules 230, and so forth.

In some embodiments, the one or more barometers may be configured to detect changes in the atmospheric pressure in the environment of apparatus 200 and/or to measure the atmospheric pressure in the environment of apparatus 200. In some examples, information captured using the barometers may be stored in memory units 210, may be processed by processing units 220, may be transmitted and/or received using communication modules 230, and so forth.

In some embodiments, the one or more pressure sensors may be configured to perform at least one of the following: detect pressure in the environment of apparatus 200; measure pressure in the environment of apparatus 200; detect change in the pressure in the environment of apparatus 200; measure change in pressure in the environment of apparatus 200; detect pressure at a specific point and/or region of the surface area of apparatus 200; measure pressure at a specific point and/or region of the surface area of apparatus 200; detect change in pressure at a specific point and/or area; measure change in pressure at a specific point and/or region of the surface area of apparatus 200; measure the pressure differences between two specific points and/or regions of the surface area of apparatus 200; measure changes in relative pressure between two specific points and/or regions of the surface area of apparatus 200. In some examples, information captured using the pressure sensors may be stored in memory units 210, may be processed by processing units 220, may be transmitted and/or received using communication modules 230, and so forth.

In some embodiments, the one or more proximity sensors may be configured to perform at least one of the following: detect contact of a solid object with the surface of apparatus 200; detect contact of a solid object with a specific point and/or region of the surface area of apparatus 200; detect a proximity of apparatus 200 to an object. In some implementations, proximity sensors may be implemented using image sensors 260 and light sources 265, for example by emitting light using light sources 265, such as ultraviolet light, visible light, infrared light and/or microwave light, and detecting the light reflected from nearby objects using image sensors 260 to detect the present of nearby objects. In some examples, information captured using the proximity sensors may be stored in memory units 210, may be processed by processing units 220, may be transmitted and/or received using communication modules 230, and so forth.

In some embodiments, the one or more electrical impedance sensors may be configured to perform at least one of the following: detect change over time in the connectivity and/or permittivity between two electrodes; measure changes over time in the connectivity and/or permittivity between two electrodes; capture Electrical Impedance Tomography (EIT) images. In some examples, information captured using the electrical impedance sensors may be stored in memory units 210, may be processed by processing units 220, may be transmitted and/or received using communication modules 230, and so forth.

In some embodiments, the one or more electrical voltage sensors may be configured to perform at least one of the following: detect and/or measure voltage between two electrodes; detect and/or measure changes over time in the voltage between two electrodes. In some examples, information captured using the electrical voltage sensors may be stored in memory units 210, may be processed by processing units 220, may be transmitted and/or received using communication modules 230, and so forth.

In some embodiments, the one or more electrical current sensors may be configured to perform at least one of the following: detect and/or measure electrical current flowing between two electrodes; detect and/or measure changes over time in the electrical current flowing between two electrodes. In some examples, information captured using the electrical current sensors may be stored in memory units 210, may be processed by processing units 220, may be transmitted and/or received using communication modules 230, and so forth.

In some embodiments, the one or more user input devices may be configured to allow one or more users to input information. In some examples, user input devices may comprise at least one of the following: a keyboard, a mouse, a touch pad, a touch screen, a joystick, a microphone, an image sensor, and so forth. In some examples, the user input may be in the form of at least one of: text, sounds, speech, hand gestures, body gestures, tactile information, and so forth. In some examples, the user input may be stored in memory units 210, may be processed by processing units 220, may be transmitted and/or received using communication modules 230, and so forth.

In some embodiments, the one or more user output devices may be configured to provide output information to one or more users. In some examples, such output information may comprise of at least one of: notifications, feedbacks, reports, and so forth. In some examples, user output devices may comprise at least one of: one or more audio output devices; one or more textual output devices; one or more visual output devices; one or more tactile output devices; and so forth. In some examples, the one or more audio output devices may be configured to output audio to a user, for example through: a headset, a set of speakers, and so forth. In some examples, the one or more visual output devices may be configured to output visual information to a user, for example through: a display screen, an augmented reality display system, a printer, a LED indicator, and so forth. In some examples, the one or more tactile output devices may be configured to output tactile feedbacks to a user, for example through vibrations, through motions, by applying forces, and so forth. In some examples, the output may be provided: in real time, offline, automatically, upon request, and so forth. In some examples, the output information may be read from memory units 210, may be provided by a software executed by processing units 220, may be transmitted and/or received using communication modules 230, and so forth.

Figure 3:
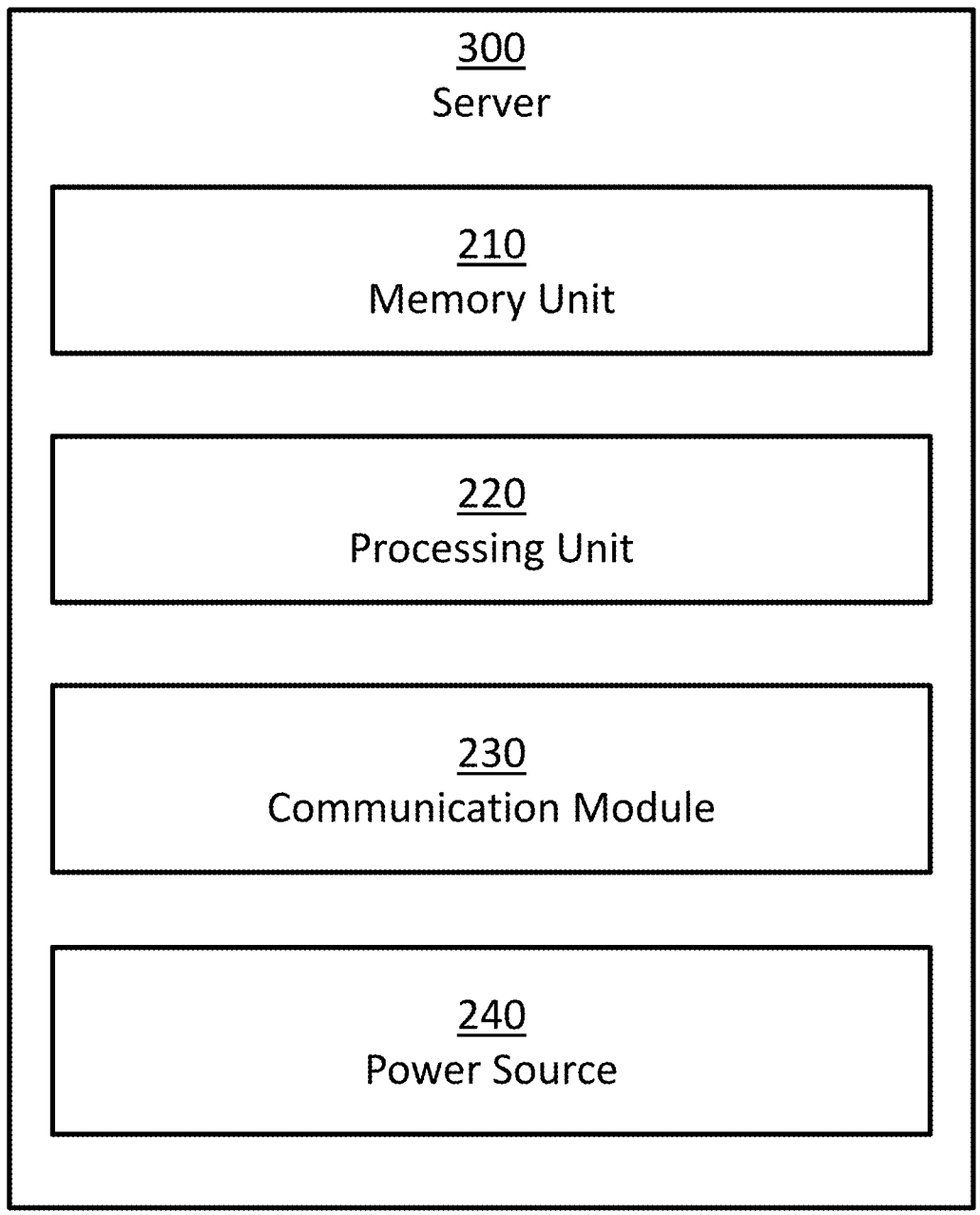
FIG. 3 is a block diagram illustrating a possible implementation of a server.

FIG. 3 is a block diagram illustrating a possible implementation of server 300. In this example, server 300 may comprise: one or more memory units 210, one or more processing units 220, one or more communication modules 230, and one or more power sources 240. In some implementations, server 300 may comprise additional components, while some components listed above may be excluded. For example, in some implementations server 300 may also comprise at least one of the following: one or more user input devices; one or more output devices; and so forth. In another example, in some implementations at least one of the following may be excluded from server 300: memory units 210, communication modules 230, and power sources 240.

Figure 4A:
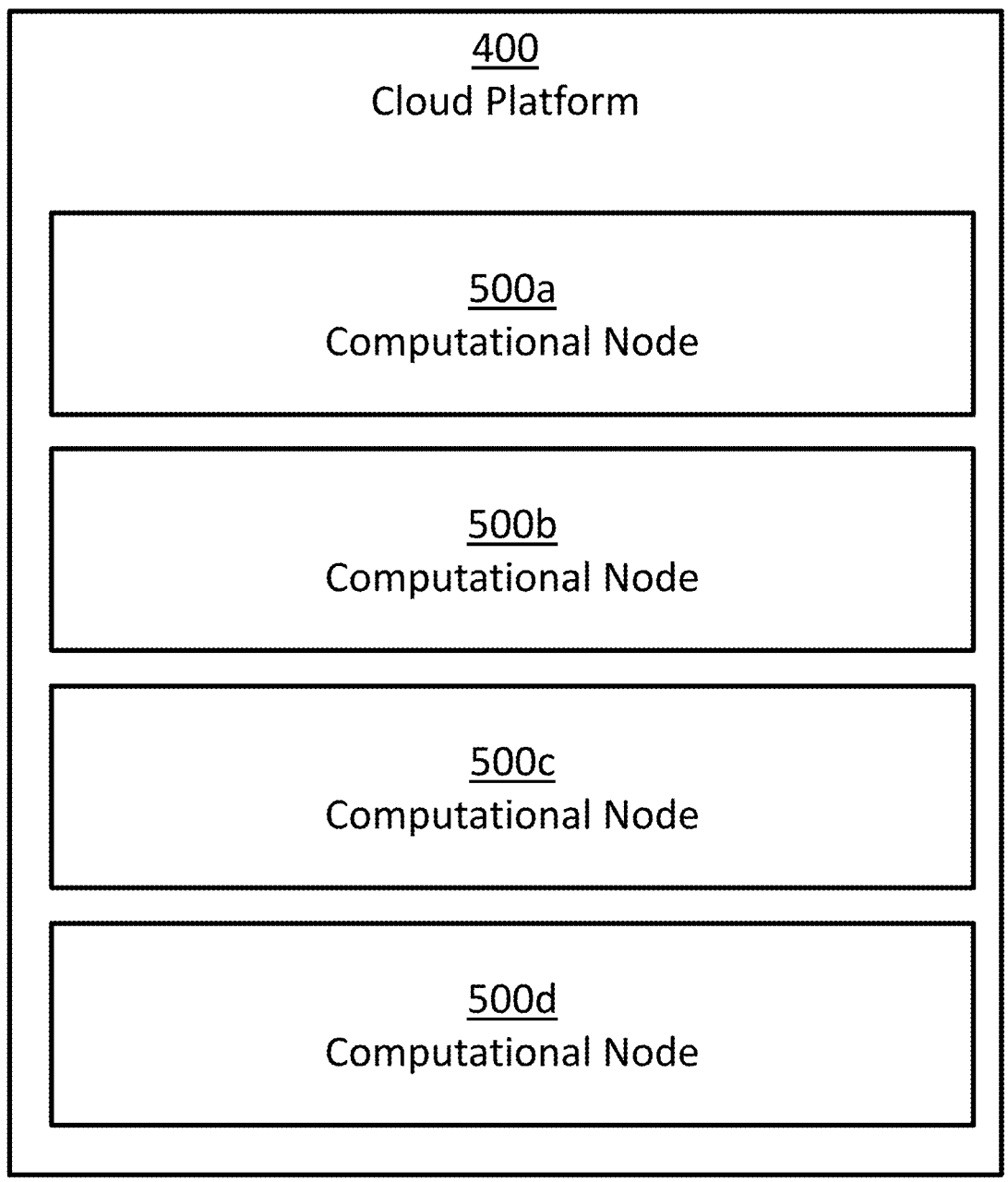
FIGS. 4A and 4B are block diagrams illustrating some possible implementations of a cloud platform.

FIG. 4A is a block diagram illustrating a possible implementation of cloud platform 400. In this example, cloud platform 400 may comprise computational node 500a, computational node 500b, computational node 500c and computational node 500d. In some examples, a possible implementation of computational nodes 500a, 500b, 500c and 500d may comprise server 300 as described in FIG. 3. In some examples, a possible implementation of computational nodes 500a, 500b, 500c and 500d may comprise computational node 500 as described in FIG. 5.

Figure 4B:
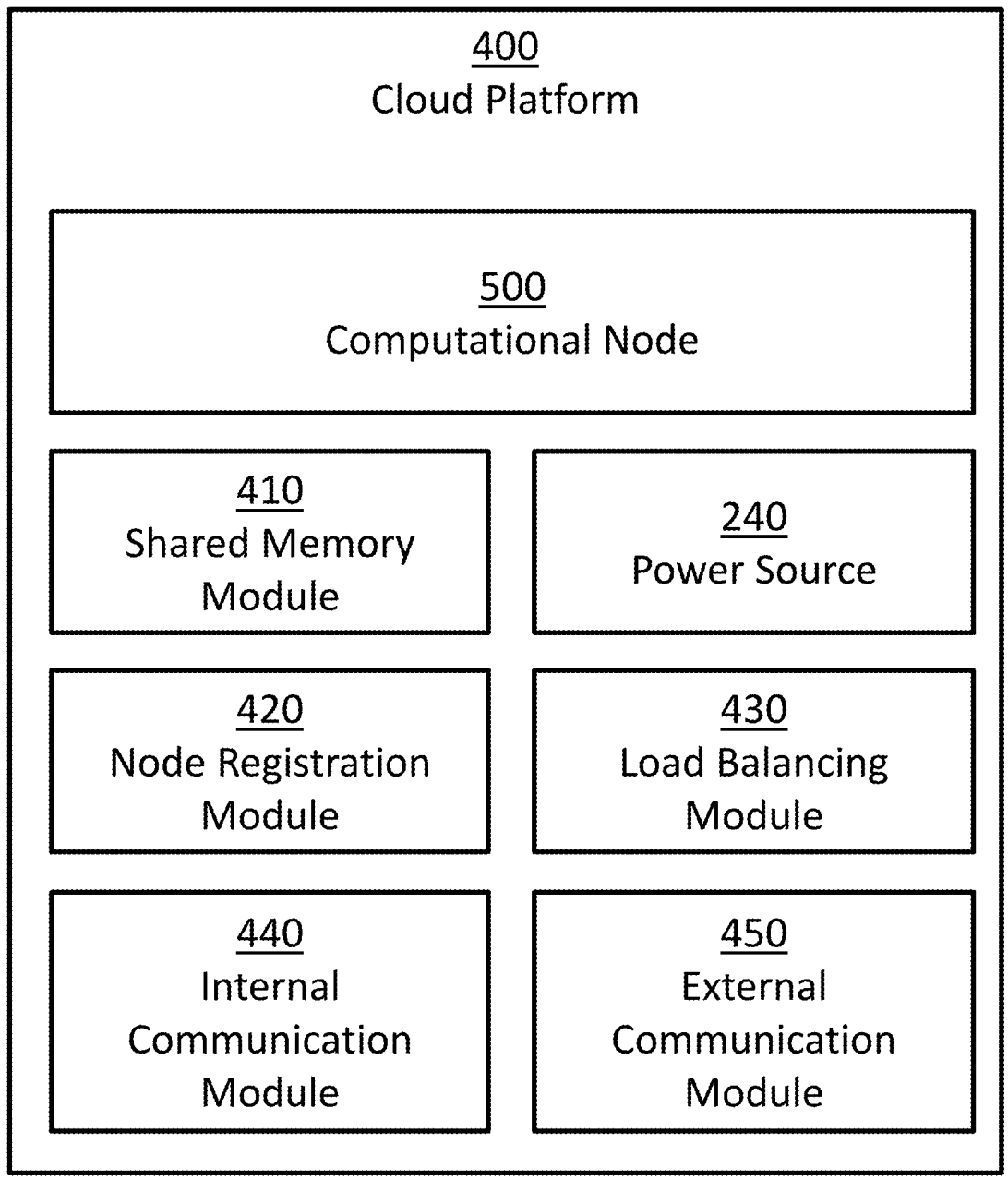

FIG. 4B is a block diagram illustrating a possible implementation of cloud platform 400. In this example, cloud platform 400 may comprise: one or more computational nodes 500, one or more shared memory modules 410, one or more power sources 240, one or more node registration modules 420, one or more load balancing modules 430, one or more internal communication modules 440, and one or more external communication modules 450. In some implementations, cloud platform 400 may comprise additional components, while some components listed above may be excluded. For example, in some implementations cloud platform 400 may also comprise at least one of the following: one or more user input devices; one or more output devices; and so forth. In another example, in some implementations at least one of the following may be excluded from cloud platform 400: shared memory modules 410, power sources 240, node registration modules 420, load balancing modules 430, internal communication modules 440, and external communication modules 450.

Figure 5:
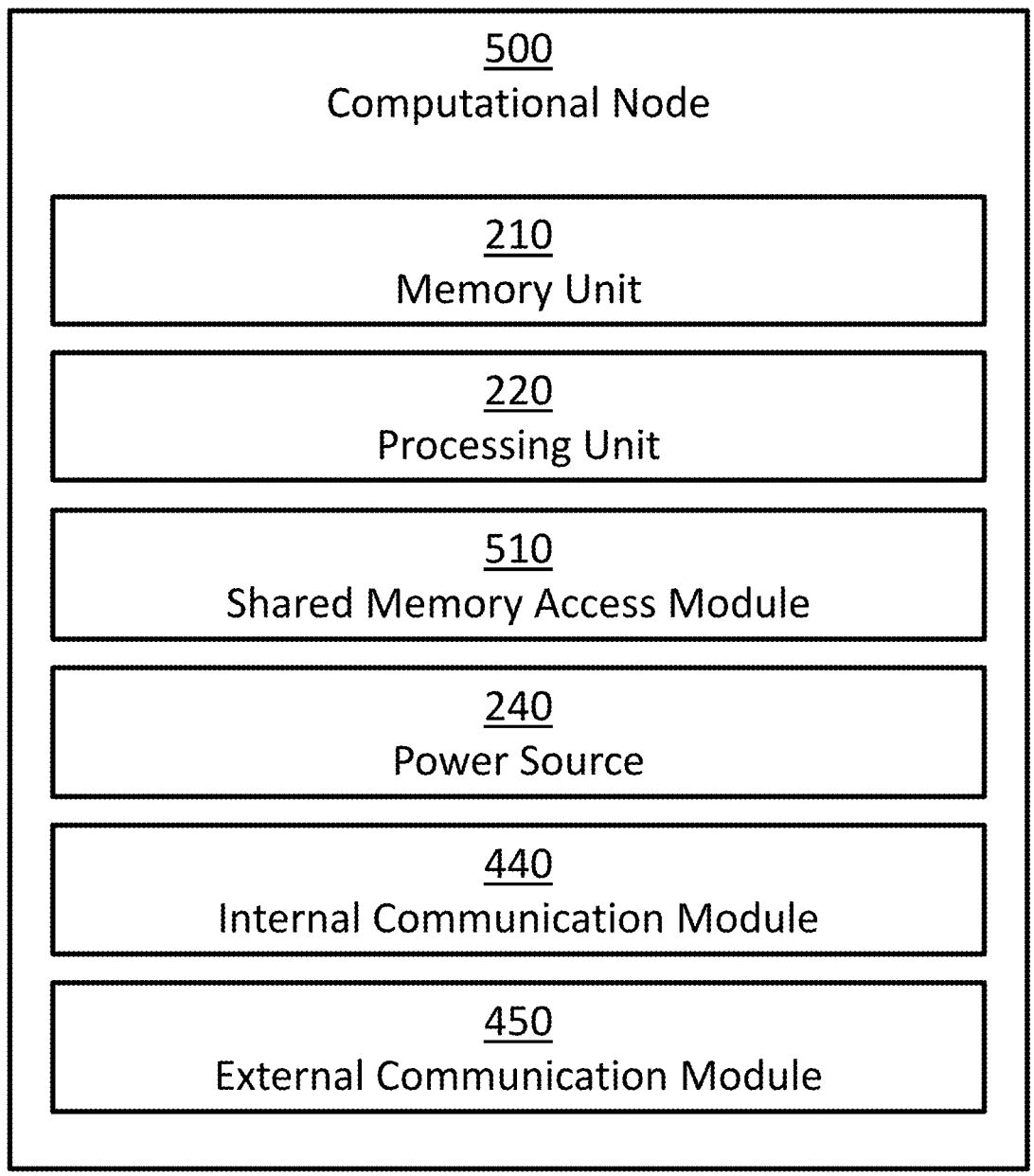
FIG. 5 is a block diagram illustrating a possible implementation of a computational node.

FIG. 5 is a block diagram illustrating a possible implementation of computational node 500. In this example, computational node 500 may comprise: one or more memory units 210, one or more processing units 220, one or more shared memory access modules 510, one or more power sources 240, one or more internal communication modules 440, and one or more external communication modules 450. In some implementations, computational node 500 may comprise additional components, while some components listed above may be excluded. For example, in some implementations computational node 500 may also comprise at least one of the following: one or more user input devices; one or more output devices; and so forth. In another example, in some implementations at least one of the following may be excluded from computational node 500: memory units 210, shared memory access modules 510, power sources 240, internal communication modules 440, and external communication modules 450.

In some embodiments, internal communication modules 440 and external communication modules 450 may be implemented as a combined communication module, such as communication modules 230. In some embodiments, one possible implementation of cloud platform 400 may comprise server 300. In some embodiments, one possible implementation of computational node 500 may comprise server 300. In some embodiments, one possible implementation of shared memory access modules 510 may comprise using internal communication modules 440 to send information to shared memory modules 410 and/or receive information from shared memory modules 410. In some embodiments, node registration modules 420 and load balancing modules 430 may be implemented as a combined module.

In some embodiments, the one or more shared memory modules 410 may be accessed by more than one computational node. Therefore, shared memory modules 410 may allow information sharing among two or more computational nodes 500. In some embodiments, the one or more shared memory access modules 510 may be configured to enable access of computational nodes 500 and/or the one or more processing units 220 of computational nodes 500 to shared memory modules 410. In some examples, computational nodes 500 and/or the one or more processing units 220 of computational nodes 500, may access shared memory modules 410, for example using shared memory access modules 510, in order to perform at least one of: executing software programs stored on shared memory modules 410, store information in shared memory modules 410, retrieve information from the shared memory modules 410.

In some embodiments, the one or more node registration modules 420 may be configured to track the availability of the computational nodes 500. In some examples, node registration modules 420 may be implemented as: a software program, such as a software program executed by one or more of the computational nodes 500; a hardware solution; a combined software and hardware solution; and so forth. In some implementations, node registration modules 420 may communicate with computational nodes 500, for example using internal communication modules 440. In some examples, computational nodes 500 may notify node registration modules 420 of their status, for example by sending messages: at computational node 500 startup; at computational node 500 shutdowns; at constant intervals; at selected times; in response to queries received from node registration modules 420; and so forth. In some examples, node registration modules 420 may query about computational nodes 500 status, for example by sending messages: at node registration module 420 startup; at constant intervals; at selected times; and so forth.

In some embodiments, the one or more load balancing modules 430 may be configured to divide the work load among computational nodes 500. In some examples, load balancing modules 430 may be implemented as: a software program, such as a software program executed by one or more of the computational nodes 500; a hardware solution; a combined software and hardware solution; and so forth. In some implementations, load balancing modules 430 may interact with node registration modules 420 in order to obtain information regarding the availability of the computational nodes 500. In some implementations, load balancing modules 430 may communicate with computational nodes 500, for example using internal communication modules 440. In some examples, computational nodes 500 may notify load balancing modules 430 of their status, for example by sending messages: at computational node 500 startup; at computational node 500 shutdowns; at constant intervals; at selected times; in response to queries received from load balancing modules 430; and so forth. In some examples, load balancing modules 430 may query about computational nodes 500 status, for example by sending messages: at load balancing module 430 startup; at constant intervals; at selected times; and so forth.

In some embodiments, the one or more internal communication modules 440 may be configured to receive information from one or more components of cloud platform 400, and/or to transmit information to one or more components of cloud platform 400. For example, control signals and/or synchronization signals may be sent and/or received through internal communication modules 440. In another example, input information for computer programs, output information of computer programs, and/or intermediate information of computer programs, may be sent and/or received through internal communication modules 440. In another example, information received though internal communication modules 440 may be stored in memory units 210, in shared memory units 410, and so forth. In an additional example, information retrieved from memory units 210 and/or shared memory units 410 may be transmitted using internal communication modules 440. In another example, input data may be transmitted and/or received using internal communication modules 440. Examples of such input data may include input data inputted by a user using user input devices.

In some embodiments, the one or more external communication modules 450 may be configured to receive and/or to transmit information. For example, control signals may be sent and/or received through external communication modules 450. In another example, information received though external communication modules 450 may be stored in memory units 210, in shared memory units 410, and so forth. In an additional example, information retrieved from memory units 210 and/or shared memory units 410 may be transmitted using external communication modules 450. In another example, input data may be transmitted and/or received using external communication modules 450. Examples of such input data may include: input data inputted by a user using user input devices; information captured from the environment of apparatus 200 using one or more sensors; and so forth. Examples of such sensors may include: audio sensors 250; image sensors 260; motion sensors 270; positioning sensors 275; chemical sensors; temperature sensors; barometers; pressure sensors; proximity sensors; electrical impedance sensors; electrical voltage sensors; electrical current sensors; and so forth.

Figure 6:
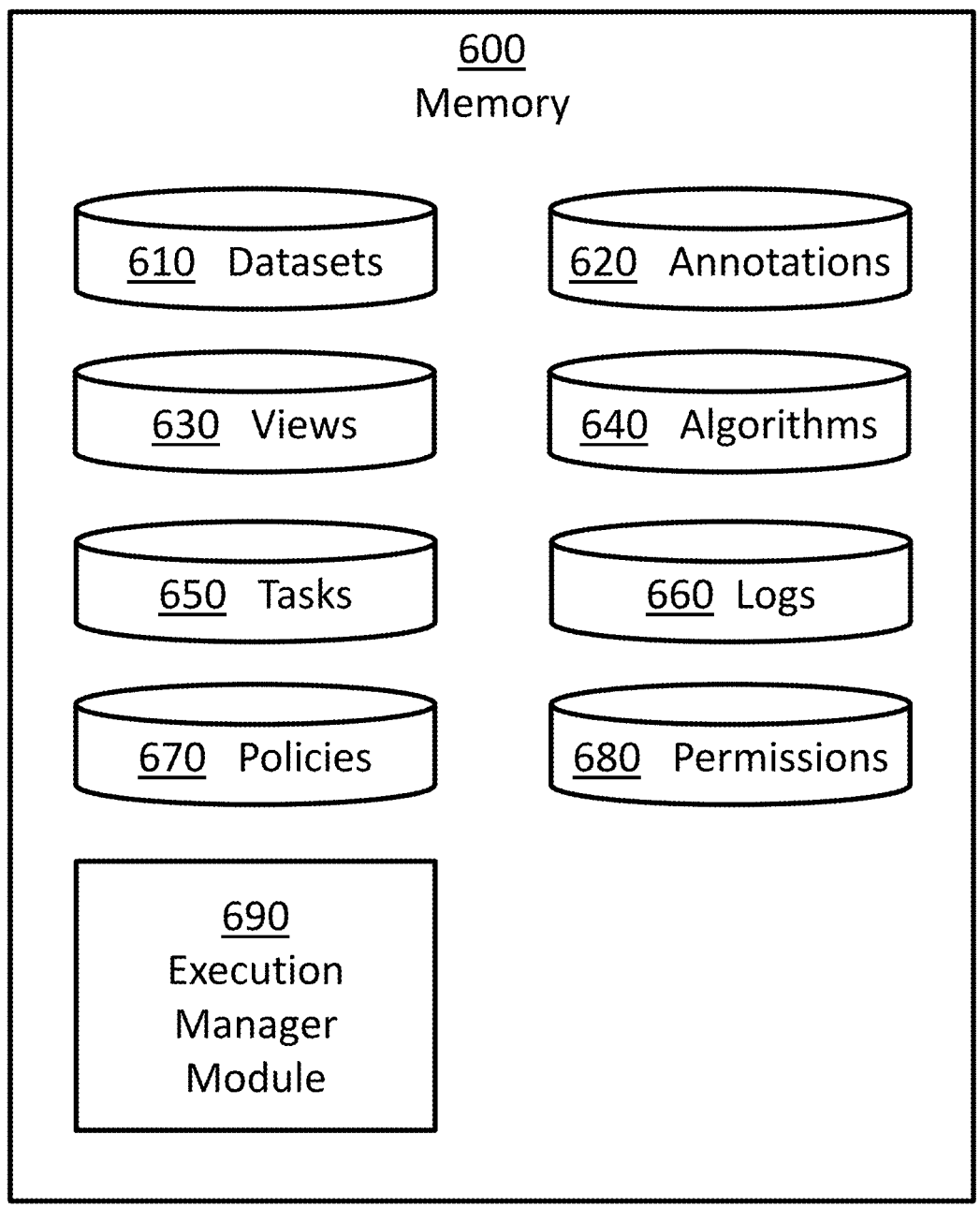
FIG. 6 illustrates an exemplary embodiment of a memory storing a plurality of modules.

FIG. 6 illustrates an exemplary embodiment of memory 600 storing a plurality of modules. In some examples, memory 600 may be separate from and/or integrated with memory units 210, separate from and/or integrated with memory units 410, and so forth. In some examples, memory 600 may be included in a single device, for example in apparatus 200, in server 300, in cloud platform 400, in computational node 500, and so forth. In some examples, memory 600 may be distributed across several devices. Memory 600 may store more or fewer modules than those shown in FIG. 6. In this example, memory 600 may comprise: one or more datasets 610, one or more annotations 620, one or more views 630, one or more algorithms 640, one or more tasks 650, one or more logs 660, one or more policies 670, one or more permissions 680, and an execution manager module 690. Execution manager module 690 may be implemented in software, hardware, firmware, a mix of any of those, or the like. For example, if the modules are implemented in software, they may contain software instructions for execution by at least one processing device, such as processing unit 220, by apparatus 200, by server 300, by cloud platform 400, by computational node 500, and so forth. In some examples, execution manager module 690 may be configured to perform at least one of processes 700, 900, 1100, 1300, 1500, 1700, and so forth.

In some embodiments, dataset 610 may comprise data and information. For example, dataset 610 may comprise information pertinent to a subject, an issue, a topic, a problem, a task, and so forth. In some embodiments, dataset 610 may comprise one or more tables, such as database tables, spreadsheets, matrixes, and so forth. In some examples, dataset 610 may comprise one or more n-dimensional tables, such as tensors. In some embodiments, dataset 610 may comprise information about relations among items, for example in a form of graphs, hyper-graphs, lists of connections, matrices holding similarities, n-dimensional tables holding similarities, matrices holding distances, n-dimensional tables holding dissimilarities, and so forth. In some embodiments, dataset 610 may comprise hierarchical information, for example in the form a tree, hierarchical database, and so forth. In some embodiments, dataset 610 may comprise textual information, for example in the form of strings of characters, textual documents, documents in a markup language (such as HTML and XML), and so forth. In some embodiments, dataset 610 may comprise visual information, such as images, videos, graphical content, and so forth. In some embodiments, dataset 610 may comprise audio data, such as sound recordings, audio recordings, synthesized audio, and so forth.

In some embodiments, dataset 610 may comprise sensor readings, such as audio captured using audio sensors 250, images captured using image sensors 260, motion information captured using motion sensors 270, positioning information captured using positioning sensors 275, atmospheric pressure information captured using barometers, pressure information captured using pressure sensors, proximity information captured using proximity sensors, electrical impedance information captured using electrical impedance sensors, electrical voltage information captured using electrical voltage sensors, electrical current information captured using electrical current sensors, user input obtained using user input devices, and so forth.

In some embodiments, dataset 610 may comprise data and information arranged in data-points. For example, a data-point may correspond to an individual, to an object, to a geographical location, to a geographical region, to a species, and so forth. For example, dataset 610 may comprise a table, and each row or slice may represent a data-point. For example, dataset 610 may comprise several tables, and each data-point may correspond to entries in one or more tables. For example, a data-point may comprise a text document, a portion of a text document, a corpus of text documents, and so forth. For example, a data-point may comprise an image, a portion of an image, a video clip, a portion of a video clip, a group of images, a group of video clips, a time span within a video recording, a sound recording, a time span within a sound recording, and so forth. For example, a data-point may comprise to a group of sensor readings. In some examples, dataset 610 may further comprise information about relations among data-points, for example a data-point may correspond to a node in a graph or in a hypergraph, and an edge or a hyperedge may correspond to a relation among data-points and may be labeled with properties of the relation. In some examples, data-points may be arranged in hierarchies, for example a data-point may correspond to a node in a tree.

In some embodiments, a dataset 610 may be produced and/or maintain by a single user, by multiple users collaborating to produce and/or maintain dataset 610, by an automatic process, by multiple automatic processes collaborating to produce and/or maintain dataset 610, by one or more users and one or more automatic processes collaborating to produce and/or maintain dataset 610, and so forth. In some examples, a user and/or an automatic process may produce and/or maintain no dataset 610, a single dataset 610, multiple datasets 610, and so forth.

In some embodiments, annotations 620 may comprise information related to datasets 610 and/or to elements within datasets 610. In some examples, a single annotation 620 may comprise information related to one dataset or to multiple datasets, and a single dataset 610 may have no, a single, or multiple annotations related to it. For example, dataset 610 may have multiple annotations 620 that complement each other, multiple annotations 620 that are inconsistent or contradict each other, and so forth.

In some embodiments, annotation 620 may be produced and/or maintain by a single user, by multiple users collaborating to produce and/or maintain annotation 620, by an automatic process, by multiple automatic processes collaborating to produce and/or maintain annotation 620, by one or more users and one or more automatic processes collaborating to produce and/or maintain annotation 620, and so forth. In some examples, a user and/or an automatic process may produce and/or maintain no annotation 620, a single annotation 620, multiple annotations 620, and so forth.

In some examples, annotation 620 may comprise auxiliary information related to datasets 610. In some examples, annotation 620 may comprise historic information related to dataset 610. Such historic information may include information related to the source of the dataset and/or of parts of the dataset, historic usages of the dataset and/or of parts of the dataset, and so forth. In some examples, annotation 620 may comprise information about the dataset and/or about items (such as data-points) in the dataset that is not included in the dataset.

In some embodiments, annotation 620 may comprise labels and/or tags corresponding to data-points of dataset 610. In some examples, a label may comprise an assignment of one value from a list of possible values to a data-point. In some examples, a tag may comprise an assignment of any number of values (including zero, one, two, three, etc.) from a list of possible values to a data-point. For example, the list of possible values may contain types (such as mammal, fish, amphibian, reptile and bird), and a label may assign a single type to a data-point (for example, fish label may indicate that the data-point describes an animal that is a fish), while a tag may assign multiple types to a data-point (for example, bird and mammal tags may indicate that the data-point comprise a picture of two animals, one bird and one mammal). In some examples, a label may comprise an assignment of a value from a range of possible values to a data-point. For example, a label with a value of 195.3 may indicate that the data-point describes a subject weighing 195.3 pounds. In some examples, a tag may comprise an assignment of any number of values (including zero, one, two, three, etc.) from a range of possible values to a data-point. For example, tags with values of 74, 73.8 and 74.6 may indicate varying results produced by repeated measurements.

In some embodiments, annotation 620 may comprise desired output corresponding to data-points of dataset 610. In some examples, the desired output may include a picture and/or a video clip. For example, a data-point may include a picture and/or a video clip, and the desired output may include the picture and/or video clip after some processing, such as noise removal, super-resolution, and so forth. In some examples, the desired output may include a mapping. For example, a data-point may include a picture and/or a video clip, and the desired output may include a mapping of pixels and/or regions of the picture and/or video clip to desired segments. In another example, a data-point may include audio data, and the desired output may include a mapping of portions of the audio data to segments. In some examples, the desired output may include audio data. For example, a data-point may include audio data, and the desired output may include the audio data after some processing, such as noise removal, source separation, and so forth. In some examples, the desired output may include processed data. For example, a data-point may include data captured using one or more sensors, and the desired output may include the data after some processing, such as noise removal, convolution, down-sampling, interpolation, and so forth. In some examples, the desired output may include textual information. For example, a data-point may include a picture and/or a video clip, and the desired output may comprise a textual description of the picture and/or video clip. In another example, a data-point may include audio data, and the desired output may comprise a transcription of the audio data. In yet another example, a data-point may include textual information, and the desired output may comprise a synopsis of the textual information.

In some examples, annotation 620 may comprise information arranged in vectors and/or tables. For example, each entry in the vector and/or row in a table and/or column in the table may correspond to a data-point of dataset 610, and the entry may comprise annotation related to that data-point. In some examples, annotation 620 may comprise information arranged in one or more matrixes. For example, each entry in the matrix may correspond to two data-points of dataset 610 according to the row and column of the entry, and the entry may comprise information related to these data-points. In some examples, annotation 620 may comprise information arranged in one or more tensors. For example, each entry in the tensor may correspond to a number of data-points of dataset 610 according to the indices of the entry, and the entry may comprise information related to these data-points. In some examples, annotation 620 may comprise information arranged in one or more graphs and/or one or more hypergraphs. For example, each node in the graph may correspond to a data-point of dataset 610, and an edge of the graph and/or hyperedge of the hypergraph may comprise information related to the data-points connected by the edges and/or hyperedge.

In some embodiments, view 630 may comprise data and information related to datasets 610 and/or annotations 620. In some examples, view 630 may comprise modified versions of one or more datasets of datasets 610 and/or modify versions of one or more annotations of annotations 620. Unless otherwise stated, it is appreciated that any operation discussed with reference to datasets 610 and/or annotations 620, may also be implemented in a similar manner with respect to views 630.

In some examples, view 630 may comprise a unification of one or more datasets of datasets 610. For example, view 630 may comprise a merging rule for merging two or more datasets. In another example, datasets 610 may comprise database tables, and view 630 may comprise SQL expressions for generating a new table out of the original tables and/or generated table. In yet another example, datasets 610 may comprise data-points, and view 630 may comprise a rule for merging data-points, a rule for selecting a subset of the data-points, and so forth.

In some embodiments, view 630 may comprise a unification of one or more annotations of annotations 620. For example, view 630 may comprise a merging rule for merging two or more annotations. In another example, annotations 620 may comprise database tables containing annotation information, and view 630 may comprise SQL expressions for generating a new annotation table out of the original tables and/or generated table. In yet another example, annotations 620 may comprise information corresponding to data-points, and view 630 may comprise a rule for merging the information corresponding to a data-point to obtain new annotation information. Such rule may prioritize information from one annotation source over others, may include a decision mechanism to produce new annotation and/or select an annotation out of the original annotations, and so forth. In another example, annotation 620 may comprise information corresponding to data-points, and view 630 may comprise a rule for selecting information corresponding to a subset of the data-points.

In some embodiments, view 630 may comprise a selection of one or more datasets of datasets 610 and one or more annotations of annotations 620. In some examples, view 630 may comprise a selection of one or more datasets 610 and of a unification of one or more annotations 620, as described above. In some examples, view 630 may comprise a selection of a unification of one or more datasets of datasets 610 (as described above) and of one or more annotations of annotations 620. In some examples, view 630 may comprise a selection of a unification of one or more datasets of datasets 610 and of a unification of one or more annotations of annotations 620. In some examples, view 630 may comprise a selection of one or more other views of views 630.

In some embodiments, algorithms 640 may comprise algorithms for processing information, such as the information contained in datasets 610 and/or annotations 620 and/or views 630 and/or tasks 650 and/or logs 660 and/or policies 670 and/or permissions 680. In some cases, algorithms 640 may further comprise parameters and/or hyper-parameters of the algorithms. For example, algorithms 640 may comprise a plurality of versions of the same core algorithm with different sets of parameters and/or hyper-parameters.

In some embodiments, algorithm 640 may comprise one or more decision rules. For example, a decision rule may compare a computed value to a threshold, and in some cases the threshold may be set based on a parameter and/or a hyper-parameter. In some embodiments, algorithm 640 may be preprogrammed manually. For example, a manually preprogrammed algorithm may implement a heuristic algorithm that has zero or more parameters and/or hyper-parameters. In some embodiments, algorithm 640 may comprise a machine learning algorithm configured to train on training examples, such as training examples included in datasets 610 and/or views 630, to estimate labels and/or tags and/or desired results, such as labels and/or tags and/or desired results included in annotations 620 and/or views 630. For example, algorithm 640 may comprise a kernel based algorithm, such as support vector machine and/or kernel principal component analysis, and the selection of a kernel may be according to a hyper-parameter. For example, algorithm 640 may comprise an artificial neural network, and the structure and/or other characteristics of the artificial neural network may be selected according to hyper-parameters. For example, algorithm 640 may comprise a clustering and/or a segmentation algorithm, and the number of desired clusters and/or segments may be selected according to a hyper-parameter. For example, algorithm 640 may comprise a factorization algorithm, and the number of desired factors may be determined according to a hyper-parameter. For example, a stopping condition of algorithm 640 may be based on hyper-parameters. In some examples, algorithm 640 may comprise a regression algorithm, a classification algorithm, a clustering algorithm, a segmentation algorithm, a factorization algorithm, a source separation algorithm, a dimensional reduction algorithm, a feature selection algorithm, and so forth. In some examples, algorithms 640 may comprise an algorithm that combines two or more other algorithms into a single algorithm.

In some embodiments, algorithms 640 may comprise algorithms for processing information and data from an external source. In some examples, the external data source may include a sensor (such as audio sensor, image sensor, motion sensor, positioning sensor, etc.), a user, an external device, an automatic process, external data repository, and so forth. Some examples of external data repositories may include a public database, a blockchain, a web crawler, and so forth.

In some embodiments, algorithms 640 may process information and data from an external source to update datasets 610 and/or annotations 620 and/or views 630 and/or algorithms 640 and/or tasks 650 and/or logs 660 and/or policies 670 and/or permissions 680. In some examples, based on the data from the external source, the algorithm may add information to one or more datasets, remove information from one or more datasets, modify information of one or more datasets, and so forth. For example, the algorithm may add new data-points containing the data from the external source to a dataset, update existing data-points according to the data from the external source, remove data-points that were made obsolete according to data from the external source, and so forth. In some examples, based on the data from the external source, the algorithm may add information to one or more annotations, remove information from one or more annotations, modify information of one or more annotations, and so forth. For example, the algorithm may add new labels and/or tags and/or desired results containing data from the external source to an annotation, update existing labels and/or tags and/or desired results according to the data from the external source, remove labels and/or tags and/or desired results that were made obsolete according to data from the external source, and so forth. In some examples, algorithms 640 may process information and data from an external source to update one or more data-points of datasets 610 and one or more corresponding labels and/or tags and/or desired results of annotations 620. In some examples, based on the data from the external source, the algorithm may create a new view, delete a view, modify a view, and so forth. In some examples, the algorithm may create a new view to match an observed phenomenon and/or environment. In some examples, the algorithm may maintain views of items relevant to an environment, device, user, problem, and so forth. Some examples of such items may include objects, people, faces, gestures, voices, sounds, and so forth. For example, observing an environment with some types of objects may cause the algorithm to create a view containing examples of the observed types, which may later be used to train an object detector. Furthermore, detecting a change in said environment, such as an introduction of a new type of objects to the environment or removal of a certain type of objects from the environment, may cause the algorithm to modify the view to match the change. Furthermore, when a situation change in a way that makes the environment expendable, the algorithm may delete the corresponding view. For example, observing a conversation of two speakers may cause the algorithm to create a view containing voice samples of the two speakers. Furthermore, detecting a change in the conversation, for example an introduction of a new speaker to the conversation, may cause the algorithm to add voice samples of the new speaker to the view. Furthermore, end of the conversation may cause the algorithm to delete the corresponding view. In another example, when the data from the external source describes a household containing a child and a dog, the algorithm may create a view containing image examples of children and of dogs by merging datasets and/or annotations of image examples of children with datasets and/or annotations of image examples of dogs. When the data from the external source indicates an addition of a cat to the household, image examples of cats may be added to the view by merging additional datasets and/or annotations of image examples of cats into the view. Furthermore, when the data from the external source indicates that the dog left the household, information related to the image examples of dogs may be removed from the view.

In some embodiments, algorithms 640 may process information and data from datasets 610 and/or annotations 620 and/or views 630 and/or algorithms 640 and/or tasks 650 and/or logs 660 and/or policies 670 and/or permissions 680 to update datasets 610 and/or annotations 620 and/or views 630 and/or algorithms 640 and/or tasks 650 and/or logs 660 and/or policies 670 and/or permissions 680. For example, based on data from some source datasets of datasets 610, the algorithm may update the source datasets, update other datasets, update annotations associated with the source datasets, update other annotations, update views based on the source datasets, update other views, and so forth. Similarly, based on data from some source annotations of annotations 620, the algorithm may update the source annotations, update other annotations, update datasets associated with the source annotations, update other datasets, update views based on the source annotations, update other views, and so forth. Furthermore, based on data from some source views of views 630, the algorithm may update the source views, update other views, update datasets and/or annotations that the source views are based on, update other datasets and/or annotations, and so forth.

In some examples, updating datasets 610, for example by an algorithm processing data from datasets 610 and/or annotations 620 and/or views 630 as described above, may comprise adding new datasets to datasets 610 (for example where a new dataset may comprise data-points containing results of calculations based on the processed information, data-points selected from other datasets based on the results of the calculations, etc.), removing datasets from datasets 610 (for example removing datasets that were made obsolete according to a calculation based on the processed information), modifying some of the datasets of datasets 610, and so forth. In some examples, modifying a dataset, for example by an algorithm processing data from datasets 610 and/or annotations 620 and/or views 630 as described above, may comprise adding new data-points to the dataset (for example where a new data-point contains a result of a calculation based on the processed information), modifying data-points of the dataset (for example changing a value of a data-point according to a calculation based on the processed information), removing data-points from the dataset (for example removing data-points that were made obsolete according to a calculation based on the processed information), and so forth.

In some examples, updating an annotation, for example by an algorithm processing data from datasets 610 and/or annotations 620 and/or views 630 as described above, may comprise adding new annotations to annotations 620 (for example where a new annotation may comprise tags and/or labels and/or desired results containing results of calculations based on the processed information, tags and/or labels and/or desired results selected from other annotations based on the results of the calculations, etc.), removing annotations from annotations 620 (for example removing annotations that were made obsolete according to a calculation based on the processed information), modifying some of the annotations of annotations 620, and so forth. In some examples, modifying an annotation may comprise adding tags and/or labels and/or desired results to the annotation (for example where the value of the label and/or tag and/or desired result is according to a result of a calculation based on the processed information), removing tags and/or labels and/or desired results from the annotation (for example removing labels and/or tags and/or desired results that were made obsolete according to the calculation's result), modifying tags and/or labels and/or desired results in the annotation (for example according to the calculation's result), and so forth. For example, the algorithm may add and/or modify and/or remove labels and/or tags and/or desired results of the annotation that corresponds to data-points of datasets 610 based on a result of a calculation that is based on values of said data-points. In another example, the algorithm may produce a new annotation based on several other source annotations that deal with the same dataset, for example using a voting mechanism. In some examples, the algorithm may update the produced annotation in response to a change in the source annotations, may delete the produced annotation in response a deletion of one of the source annotations, and so forth.

In some examples, updating a view, for example by an algorithm processing data from datasets 610 and/or annotations 620 and/or views 630 as described above, may comprise adding new views to views 630, removing views from views 630, modifying some of the views of views 630, and so forth. For example, observing a dataset and/or an annotation with some distribution of elements may cause the algorithm to create a view containing a sample of the elements with a different distribution. Furthermore, detecting a change of the dataset and/or annotation that caused a change of said distribution may lead the algorithm to modify the view to match the change. Furthermore, when changes to the dataset and/or the annotation cause the said distribution to reach a certain desired property, the algorithm may remove the view.

In some embodiments, algorithms 640 may process information and data from datasets 610 and/or one or more annotations 620 and/or one or more views 630 and/or algorithms 640 and/or tasks 650 and/or logs 660 and/or policies 670 and/or permissions 680 to update one or more algorithms 640. In some examples, based on the processed information, the algorithm may create a new algorithm, delete an algorithm, modify an algorithm, and so forth. For example, observing a dataset and/or an annotation and/or a view with some distribution of elements may cause the algorithm to create a new algorithm with a set of hyper-parameters matching the distribution. Furthermore, detecting a change to the dataset and/or annotation and/or view that caused a change in said distribution may cause the algorithm to modify the set of hyper-parameters to match the changed distribution. Furthermore, when changes to the dataset and/or the annotation and/or the view cause the said distribution to reach a certain desired property, the algorithm may delete the created algorithm.

In some embodiments, tasks 650 may comprise one or more tasks waiting for execution. In some examples, a task may comprise a selection of one or more datasets of datasets 610, of one or more annotations of annotations 620, of one or more views of views 630, of one or more algorithms of algorithms 640, and so forth. For example, a task may comprise a selection of a dataset and an algorithm, and the execution of the task may comprise applying the selected algorithm to the data of the selected dataset. In another example, a task may comprise a selection of a dataset, an annotation and an algorithm, and the execution of the task may comprise applying the selected algorithm to the data of the selected dataset and the selected annotation. In yet another example, a task may comprise a selection of an annotation and an algorithm, and the execution of the task may comprise applying the selected algorithm to information included in the selected annotation. In another example, a task may comprise a selection of a view and an algorithm, and execution of the task may comprise applying the selected algorithm to the selected view.

In some embodiments, tasks 650 may comprise scheduling information. For example, the scheduling information may specify priorities assigned to the tasks, in the form of a priority values assigned to the tasks (such as high, medium, low, numerical priority values, etc.), in the form of an ordering of the tasks according to ascending or descending priority, and so forth. In some examples, the scheduling information may specify preferred execution times, constraints on execution times, preferred execution frequencies, constraints on execution frequencies, and so forth.

In some embodiments, tasks 650 may comprise execution requirements. In some examples, the execution requirements may comprise details about preferred execution conditions and/or settings of the tasks. For example, execution requirements may comprise a specification of hardware requirements (such as memory size, processing power, etc.) of a task. In another example, execution requirements may comprise an indication of specific devices and/or specific device types required to execute the task (such as apparatus 200, server 300, cloud platform 400, computational node 500, and so forth). In yet another example, execution requirements may comprise a specification of software requirements of a task (such as operation system, software libraries, software modules, and so forth).

In some embodiments, tasks 650 may comprise tasks for manual execution. In some examples, tasks for manual execution may include indications of specific persons required to execute the task, of types of persons required to execute the task, of skills required to execute the task, and so forth.

In some embodiments, algorithms 640 may process information and data from an external source to update one or more tasks of tasks 650. In some examples, based on the data from the external source, the algorithm may create a new task, delete a task, modify a task, and so forth. For example, in response to an observed change in an environment, the algorithm may create a new task dealing with datasets and/or annotations and/or views related to the environment and/or the observed change, may update a task related to the environment and/or the observed change, may delete a task that became obsolete by the observed change, and so forth.

In some embodiments, algorithms 640 may process information and data from datasets 610 and/or annotations 620 and/or views 630 and/or algorithms 640 and/or tasks 650 and/or logs 660 and/or policies 670 and/or permissions 680 to update tasks 650. In some examples, based on the data from datasets 610 and/or annotations 620 and/or views 630 and/or algorithms 640 and/or tasks 650 and/or logs 660 and/or policies 670 and/or permissions 680, the algorithm may create a new task, delete a task, modify a task, and so forth. For example, observing an update to a dataset and/or to an annotation and/or to a view and/or to an algorithm may cause the algorithm to create a new task dealing with the updated items, may cause the algorithm to modify a task dealing with the updated items, may cause the algorithm to remove a task that was made obsolete by the update, and so forth.

In some embodiments, logs 660 may comprise historic information related to datasets 610, annotations 620, views 630, algorithms 640, tasks 650, logs 660, policies 670, permissions 680, and so forth. In some examples, a log may comprise historic information about creations and/or deletions and/or modifications of datasets 610, elements of a dataset, annotations 620, elements of an annotation, views 630, elements of a view, algorithms 640, core algorithms of an algorithm, parameters and/or hyper-parameters of an algorithm, tasks 650, details of a task, logs 660, a log, entries of a log, policies 670, a policy, an element of a policy, permissions 680, a permission record, and so forth.

In some examples, a log may comprise historic information about past execution details of algorithms 640 and/or tasks 650. For example, such execution details may include the execution time, the execution duration, the executing device, the executing person, the actual resource requirement, software versions of software used in the execution, and so forth. For example, such execution details may comprise errors and/or results of the execution and/or statistics based on the results of the execution. Furthermore, such execution details may comprise versions of datasets 610, annotations 620, views 630, algorithms 640, tasks 650, logs 660, policies 670, permissions 680, etc., used in the execution.

In some embodiments, policies 670 may comprise a specification of what actions need to be taken, for example periodically and/or in response to a change. In some examples, execution manager module 690 may act according to policies 670. In some examples, based on policies 670, execution manager module 690 may create and/or delete and/or modify datasets 610, a dataset, elements of a dataset, annotations 620, an annotation, elements of an annotation, views 630, a view, elements of a view, algorithms 640, an algorithm, core algorithms of an algorithm, parameters and/or hyper-parameters of an algorithm, tasks 650, a task, details of a task, logs 660, elements of a log, policies 670, a policy, a detail of a policy, permissions 680, a permission record, and so forth.

In some embodiments, permissions 680 may specify which user and/or automatic process and/or algorithm (such as an algorithm of algorithms 640) and/or task (such as a task of tasks 650) may access and/or create and/or modify and/or delete which item (such as datasets 610, a dataset, elements of a dataset, annotations 620, an annotation, elements of an annotation, views 630, a view, elements of a view, algorithms 640, an algorithm, core algorithms of an algorithm, parameters and/or hyper-parameters of an algorithm, tasks 650, a task, details of a task, logs 660, a log, elements of a log, policies 670, a policy, a detail of a policy, permissions 680, a permission record, details of a permission record, and so forth).

In some embodiments, datasets 610 and/or annotations 620 and/or views 630 and/or algorithms 640 and/or tasks 650 and/or logs 660 and/or policies 670 and/or permissions 680 may be created and/or deleted and/or modified manually and/or automatically.

In some embodiments, a method, such as methods 700, 900, 1100, 1300, 1500 and 1700, may comprise of one or more steps. In some examples, a method, as well as all individual steps therein, may be performed by various aspects of apparatus 200, server 300, cloud platform 400, computational node 500, and so forth. For example, the method may be performed by processing units 220 executing software instructions stored within memory units 210 and/or within shared memory modules 410. In some examples, a method, as well as all individual steps therein, may be performed by a dedicated hardware. In some examples, computer readable medium (such as a non-transitory computer readable medium) may store data and/or computer implementable instructions for carrying out a method. Some examples of possible execution manners of a method may include continuous execution (for example, returning to the beginning of the method once the method normal execution ends), periodically execution, executing the method at selected times, execution upon the detection of a trigger (some examples of such trigger may include a trigger from a user, a trigger from another method, a trigger from an external device, etc.), and so forth.

In some embodiments, machine learning algorithms (also referred to as machine learning models in the present disclosure) may be trained using training examples, for example in the cases described below. Some examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear algorithms, non-linear algorithms, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by an process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some embodiments, trained machine learning algorithms (also referred to as trained machine learning models in the present disclosure) may be used to analyze inputs and generates outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the an artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network, for example as described below in relation to FIGS. 100, 10D, 10E, 10F and 10G.

Figure 7:
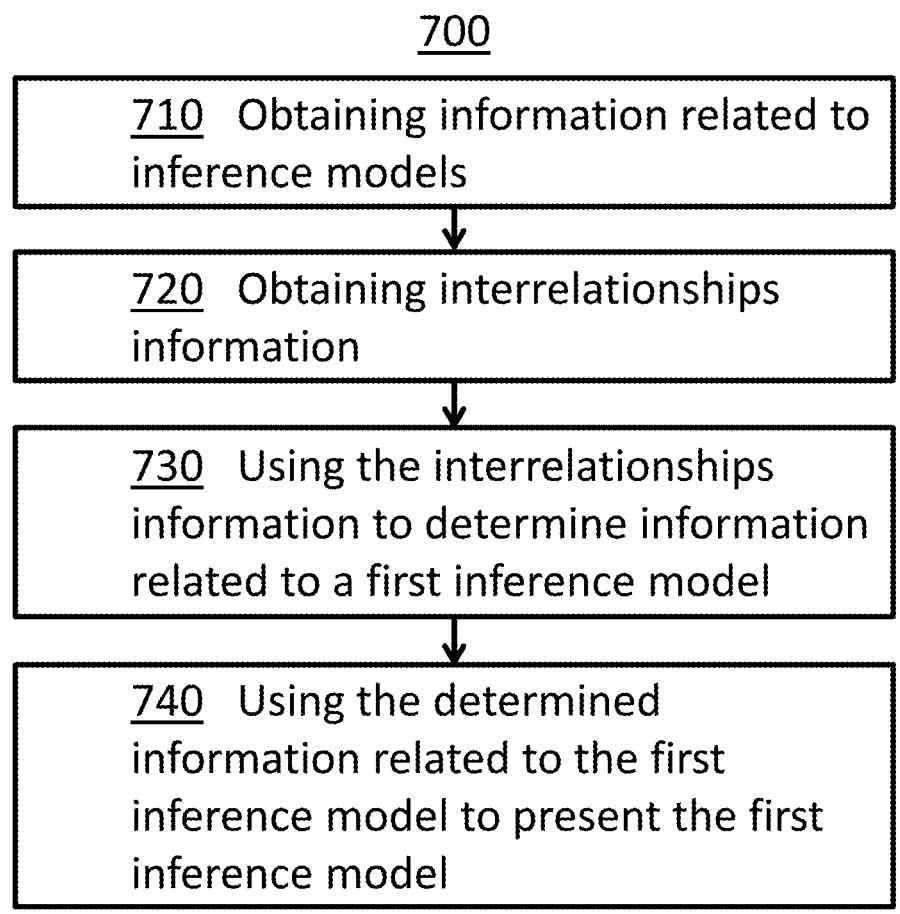
FIG. 7 illustrates an example of a method for presenting inference models based on interrelationships among inference models.

FIG. 7 illustrates an example of a method 700 for presenting inference models based on interrelationships among inference models. In this example, method 700 may comprise: obtaining information related to inference models (Step 710); obtaining interrelationships information (Step 720); using the interrelationships information to determine information related to a first inference model (Step 730); and using the determined information related to the first inference model to present the first inference model (Step 740). In some implementations, method 700 may comprise one or more additional steps, while some of the steps listed above may be modified or excluded. For example, in some cases Step 710 and/or Step 740 may be excluded from method 700. In some implementations, one or more steps illustrated in FIG. 7 may be executed in a different order and/or one or more groups of steps may be executed simultaneously and/or a plurality of steps may be combined into single step and/or a single step may be broken down to a plurality of steps.

In some embodiments, in Step 710 information related to a group of at least three inference models may be obtained. For example, the information related to the group of at least three inference models may be read from memory (for example from memory unit 210, shared memory module 410, etc.), received through a communication network (such as communication network 130) using a communication device (such as communication module 230), received from an external device (such as mobile phone 111, tablet 112, PC 113, remote storage 140, NAS 150, server 300, cloud platform 400, etc.), and so forth. In some examples, information related to a group of at least three inference models obtained by Step 710 may include and/or be based on parameters and/or hyper-parameters of the inference models. In some examples, in Step 710 the information related to the group of at least three inference models may be generated. For example, inference models may be used to generate outputs corresponding to one or more selected inputs, and the generated outputs may be analyzed to determine the information related to the group of at least three inference models. Some examples of such analysis of the generated outputs may include statistical analysis of the outputs, comparison of the generated outputs with desired outputs, and so forth. In another example, information related to the inference model may be analyzed to determine the information related to the group of at least three inference models. For example, each inference model may include an artificial neural network, and properties of the structure of the artificial neural network (such as number of layers, number of artificial neurons in selected layers, type of artificial neurons, activation functions, etc.) may be used to determine the information related to the group of at least three inference models. In some examples, in Step 710 the information related to the group of at least three inference models may be obtained from a single source or from multiple sources. For example, information related to one or more inference models of the group of at least three inference models may be received from a first external device, and information related to one or more other inference models of the group of at least three inference models may be received from a second external device. In another example, information related to one or more inference models of the group of at least three inference models may be received from an external device, and information related to one or more other inference models of the group of at least three inference models may be read from memory. In yet another example, information related to one or more inference models of the group of at least three inference models may be received from an external device and/or read from memory, and information related to one or more other inference models of the group of at least three inference models may be generated as described above.

In some embodiments, in Step 720 a plurality of interrelationship records may be obtained. For example, each interrelationship record may correspond to one subgroup of the group of at least three inference models of Step 710, and in some examples each such subgroup may comprise at least two inference models. Some examples of such subgroups may include subgroups of exactly two inference models, of exactly three inference models, of at least two inference models, of at least three inference models, of at least six inference models, and so forth. For example, one or more interrelationship records may be read from memory (for example from memory unit 210, shared memory module 410, etc.), received through a communication network (such as communication network 130) using a communication device (such as communication module 230), received from an external device (such as mobile phone 111, tablet 112, PC 113, remote storage 140, NAS 150, server 300, cloud platform 400, etc.), generated by analyzing the corresponding subgroup of inference models, and so forth. In some examples, one or more interrelationship records may be generated. For example, a machine learning model may be trained using training examples to generate interrelationship records from two or more inference models, and the trained machine learning model may be used to analyze a subgroup of the group of at least three inference models of Step 710 and generate a corresponding interrelationship record. Such training example may include a plurality of inference models together with a desired interrelationship record for the plurality of inference models. In another example, an artificial neural network may be configured to generate interrelationship records from two or more inference models, and the artificial neural network may be used to analyze a subgroup of the group of at least three inference models of Step 710 and generate a corresponding interrelationship record. In yet another example, Step 720 may obtain an interrelationship record corresponding to a subgroup of the group of at least three inference models of Step 710 comprising a measure of similarity (or a measure of dissimilarity) among the inference models of the subgroup. For example, the measure of similarity (or the measure of dissimilarity) may comprise a measure of similarity (or a measure of dissimilarity) among properties of the inference models of the subgroup. In an additional example, Step 720 may obtain an interrelationship record corresponding to a subgroup of the group of at least three inference models of Step 710 comprising a statistical measure (such as mean, median, mode, standard deviation, variance, function of an histogram, and so forth) of a property of the inference models. Some examples of such properties are described throughout this disclosure.

In some examples, in Step 720 structures associated with a plurality of inference models may be compared, for example using an inexact graph matching algorithm, to determine a matching score related to the plurality of inference models. For example, in Step 720 a structure associated with the first inference model and a structure associated with a second inference model may be compared, for example using an inexact graph matching algorithm, to determine a matching score related to the first inference model and the second inference model. Further, in some examples, the determined matching score may be used to determine the information related to the first inference model, for example by Step 730 as described below. For example, each inference model may comprise an artificial neural network, and the network graphs of the artificial neural networks of a plurality of inference models may be compared by Step 720 using an inexact graph matching algorithm to determine a matching score related to the plurality of inference models. In another example, each inference model may comprise an hierarchical model (such as hierarchical clustering model, hierarchical classification model, etc.), and the tree graphs of the hierarchical models of a plurality of inference models may be compared by Step 720 using an inexact tree matching algorithm to determine a matching score related to the plurality of inference models.

In some examples, in Step 720 a first subgroup of the group of at least three inference models may be analyzed to generate the interrelationship record corresponding to the first subgroup, for example as described above. Further, in some examples, the generated interrelationship record corresponding to the first subgroup may be used to determine the information related to the first inference model, for example by Step 730 as described below.

In some embodiments, in Step 730 the plurality of interrelationship records obtained by Step 720 may be used to determine information related to a first inference model of the group of at least three inference models. For example, a machine learning model may be trained using training examples to determine information related to a single inference model from a plurality of interrelationship records, and the trained machine learning model may be used to analyze the plurality of interrelationship records obtained by Step 720 and determine information related to the first inference model. Such training example may include a plurality of interrelationship records, possibly with information about the first inference model, together with desired determined information related to the first inference model. In another example, an artificial neural network may be configured to determine information related to a single inference model from a plurality of interrelationship records, and the artificial neural network may be used to analyze the plurality of interrelationship records obtained by Step 720 and determine information related to the first inference model. In some examples, in Step 730 an interrelationship record corresponding to a subgroup of the group of at least three inference models of Step 710, where the subgroup may comprise exactly two inference models, may be used to determine the information related to the first inference model, for example as described above. In some examples, in Step 730 an interrelationship record corresponding to a subgroup of the group of at least three inference models of Step 710, where the subgroup may comprise at least three inference models (for example, exactly three, exactly four, exactly five, exactly six, more than six, etc.), may be used to determine the information related to the first inference model, for example as described above. In some examples, in Step 730 an interrelationship record corresponding to a subgroup of the group of at least three inference models of Step 710 may comprise a measure of similarity (or a measure of dissimilarity) as described above, and the measure of similarity (or the measure of dissimilarity) may be used to determine the information related to the first inference model. In some examples, in Step 730 an interrelationship record corresponding to a subgroup of the group of at least three inference models of Step 710 may comprise a statistical measure of a property of the inference models as described above, and the statistical measure may be used to determine the information related to the first inference model, for example as described above.

In some examples, in Step 730 interrelationship information based on one or more commonalities among at least two inference models may be used to determine the information related to the first inference model. For example, the at least two inference models may comprise identical parameters and/or hyper-parameters, the values of the parameters and/or hyper-parameters may be compared to find commonalities among the at least two inference models in the form of parameters and/or hyper-parameters with identical or substantially identical values. In another example, each of the at least two inference models may comprise structure, and the structures may be compared to find commonalities among the structures. For example, each of the at least two inference models may comprise an artificial neural network, and the network graphs of the artificial neural networks of the at least two inference models may be compared using an exact graph matching algorithm to find commonalities among the graphs. In another example, each of the at least two inference models may comprise a hierarchical model (such as hierarchical clustering model, hierarchical classification model, etc.), and the tree graphs of the hierarchical models of the at least two inference models may be compared using an exact tree matching algorithm to find commonalities among the trees. Further, in some examples, a measure of similarity among the at least two inference models may be calculated based on the found commonalities among the at least two inference models. For example, number and/or amount and/or size of the commonalities may be used (for example, after normalization, after a comparison with number and/or amount and/or size of distinct features of the at least two inference models, etc.) to determine a measure of similarity of the at least two inference models. Further, in some examples, the measure of similarity of the at least two inference models may be used to determine the information related to the first inference model, for example as described below.

In some examples, in Step 730 interrelationship information related to a measure of similarity among at least two inference models may be used to determine the information related to the first inference model. For example, a machine learning model may be trained using training examples to determine information related to a single inference model from measures of similarities, and the trained machine learning model may be used to analyze at least the measure of similarity among at least two inference models and determine information related to the first inference model. Such training example may include one or more measures of similarities, together with desired determined information related to the first inference model. In another example, an artificial neural network may be configured to determine information related to a single inference model from measures of similarities, and the artificial neural network may be used to analyze at least the measure of similarity among at least two inference models and determine information related to the first inference model.

In some examples, in Step 730 interrelationship information related to a measure based on an interrelationship between a second inference model and a third inference model may be used to determine the information related to the first inference model (for example as described above), wherein both the second inference model and the third inference model may differ from the first inference model.

In some examples, in Step 730 interrelationship information based on a number of layers associated with the first inference model and a number of layers associated with a second inference model may be used to determine the information related to the first inference model. For example, a similarity measure between the first inference model and the second inference model may be calculated based on the number of layers associated with the first inference model and the number of layers associated with the second inference model, and the information related to the first inference model may be determined using the calculated similarity measure as described above. In another example, a statistical measure (such as mean, median, mode, standard deviation, variance, function of an histogram, and so forth) of at least the number of layers associated with the first inference model and the number of layers associated with the second inference model may be calculated, and the information related to the first inference model may be determined using the calculated statistical measure as described above.

In some examples, in Step 730 interrelationship information based on a type of at least one layer of the first inference model and a type of at least one layer of a second inference model may be used to determine the information related to the first inference model. For example, a similarity measure between the first inference model and the second inference model may be determined based on the type of at least one layer of the first inference model and the type of at least one layer of the second inference model (for example using the two types to select an entry in a matrix that holds the determined similarity measure), and the information related to the first inference model may be determined using the determined similarity measure as described above.

In some examples, in Step 730 interrelationship information based on a number of artificial neurons associated with the first inference model and a number of artificial neurons associated with a second inference model may be used to determine the information related to the first inference model. For example, a similarity measure between the first inference model and the second inference model may be calculated based on the number of artificial neurons associated with the first inference model and the number of artificial neurons associated with the second inference model, and the information related to the first inference model may be determined using the calculated similarity measure as described above. In another example, a statistical measure (such as mean, median, mode, standard deviation, variance, function of an histogram, and so forth) of at least the number of artificial neurons associated with the first inference model and the number of artificial neurons associated with the second inference model may be calculated, and the information related to the first inference model may be determined using the calculated statistical measure as described above.

In some examples, in Step 730 interrelationship information based on a type of at least one activation function of the first inference model and a type of at least one activation function of a second inference model may be used to determine the information related to the first inference model. For example, a similarity measure between the first inference model and the second inference model may be determined based on the type of at least one activation function of the first inference model and the type of at least one activation function of the second inference model (for example using the two types to select an entry in a matrix that holds the determined similarity measure), and the information related to the first inference model may be determined using the determined similarity measure as described above.

In some examples, in Step 730 interrelationship information based on a measure of non-linearity associated with the first inference model and a measure of non-linearity associated with a second inference model may be used to determine the information related to the first inference model. For example, an inference model may use a polynomial kernel function, and the measure of non-linearity may be the degree of the polynomial kernel function. In another example, an inference model may use a function, a nonlinearity measure of the function may be sampled at selected points, for example using $|tf(x)+(1-t)f(y)-f(tx+(1-t)y)|$ for some select x, y and t triples, and a function of the sampled nonlinearity measure (such as mean, median, max, min, etc.) may be used as the measure of non-linearity. In one example, a similarity measure between the first inference model and the second inference model may be calculated based on the measure of non-linearity associated with the first inference model and the measure of non-linearity associated with the second inference model, and the information related to the first inference model may be determined using the calculated similarity measure as described above. In another example, a statistical measure (such as mean, median, mode, standard deviation, variance, function of an histogram, and so forth) of at least the measure of non-linearity associated with the first inference model and the measure of non-linearity associated with the second inference model may be calculated, and the information related to the first inference model may be determined using the calculated statistical measure as described above.

In some examples, in Step 730 interrelationship information based on a plurality of results produced using the first inference model and a plurality of results produced using a second inference model may be used to determine the information related to the first inference model. For example, the two pluralities of results may be compared to calculated a similarity measure between the first inference model and the second inference model, and the information related to the first inference model may be determined using the calculated similarity measure as described above. In another example, each plurality of results may be compared with desired results to obtain values related to the results associated with the corresponding inference model (such as numbers and/or ratios of false positives and/or false negatives and/or true positives and/or true negatives, accuracy, precision, F score, confusion matrix, other statistics about classification errors, sum of absolute errors, sum of square errors, other statistics about regression errors, etc.), a statistical measure (such as mean, median, mode, standard deviation, variance, function of an histogram, and so forth) of the values related to the results associated with the first inference model and the values related to the results associated with the second inference model may be calculated, and the information related to the first inference model may be determined using the calculated statistical measure as described above.

In some examples, in Step 730 interrelationship information based on a plurality of confidence levels associated with results produced using the first inference model and a plurality of confidence levels associated with results produced using a second inference model may be used to determine the information related to the first inference model. For example, the two pluralities of confidence levels may be compared to calculated a similarity measure between the first inference model and the second inference model, and the information related to the first inference model may be determined using the calculated similarity measure as described above.

In some examples, in Step 730 the plurality of interrelationship records obtained by Step 720 may be used to determine an embedding of inference models (such as the inference models of Step 710) in a mathematical space (for example in a one dimensional space, in a two dimensional space, in a three dimensional space, in a space with a dimension higher than three, and so forth). For example, an embedding of at least two inference models may be determined, of at least three inference models may be determined, of at least five inference models may be determined, of at least ten inference models may be determined, and so forth. In some examples, a mathematical vector corresponding to an inference model may be obtained, and the mathematical vectors corresponding to the inference models of Step 710 may be used to determine the embedding in the mathematical space of the inference models of Step 710, for example using principal component analysis (PCA), using Fisher's (linear discriminant analysis) LDA, using minor component analysis (MCA), using t-distributed stochastic neighbor embedding (t-SNE), and so forth. For example, an inference model may comprise a matrix, and the mathematical vector corresponding to the inference model may be generated by a mathematical vectorization of the matrix. In another example, an inference model may comprise a number of parameters, and the values of the parameters may be used to construct the mathematical vector corresponding to the inference model. Further, in some examples, the determined embedding of the inference models (in the two dimensional space, in the three dimensional space, and so forth) may be visually presented to a user. For example, determined embedding of the inference models may be presented to the user using a display screen, an augmented reality display system, a printer, and so forth. In another example, the determined embedding of the inference models may be presented to the user using output 800 described below.

In some examples, in Step 730 the plurality of interrelationship records obtained by Step 720 may be used to determine a hierarchical graph of inference models (such as the inference models of Step 710). For example, a hierarchical graph of at least two inference models may be determined, of at least three inference models may be determined, of at least five inference models may be determined, at least ten inference models may be determined, and so forth. For example, the interrelationship records may indicate that a particular inference model is comprise of a composition of one or more other inference models (for example as described below in relation to FIGS. 10C, 10D, 10E, 10F and 10G), and as a result the determined hierarchical graph may have the particular inference model as a parent to the one or more other inference models. In another example, a hierarchical clustering algorithm may be used to analyze the inference models and construct the hierarchical graph. Further, in some examples, the hierarchical graph of the at least three inference models may be visually presented to a user. For example, the hierarchical graph of the at least three inference models may be presented to the user using a display screen, an augmented reality display system, a printer, and so forth.

In some examples, the information related to the first inference model determined by Step 730 may include textual information describing the first inference model. For example, the first inference model may be embedded in a mathematical space as described above, and the textual information may describe the location of the first inference model in the mathematical space, the neighboring inference model to the first inference model in the mathematical space, and so forth. In another example, the first inference model may be included in an hierarchical graph of inference models as described above, and the textual information may describe the location of the first inference model in the hierarchical graph, the parent and/or siblings of the first inference model in the hierarchical graph, and so forth. In yet another example, similar inference models to the first inference model may be identified by Step 730 based on the plurality of interrelationship records obtained by Step 720, and the textual information may describe the identified similar inference models.

In some embodiments, in Step 740 the information determined by Step 730 may be used to present the first inference model to a user. For example, the information determined by Step 730 may be presented to the user using a display screen, an augmented reality display system, a printer, and so forth. In another example, the information determined by Step 730 may be presented to the user using output 800 described below. In yet another example, the information determined by Step 730 may comprise textual information as described above, and the textual information may be provided to the user (for example, visually, audibly, and so forth). In an additional example, the information determined by Step 730 may comprise an embedding of the inference models in an embedded space, and the embedded space may be presented to the user. In yet another example, the information determined by Step 730 may comprise a hierarchical graph of inference models, and the hierarchical graph of inference models may be presented to the user.

Figure 8:
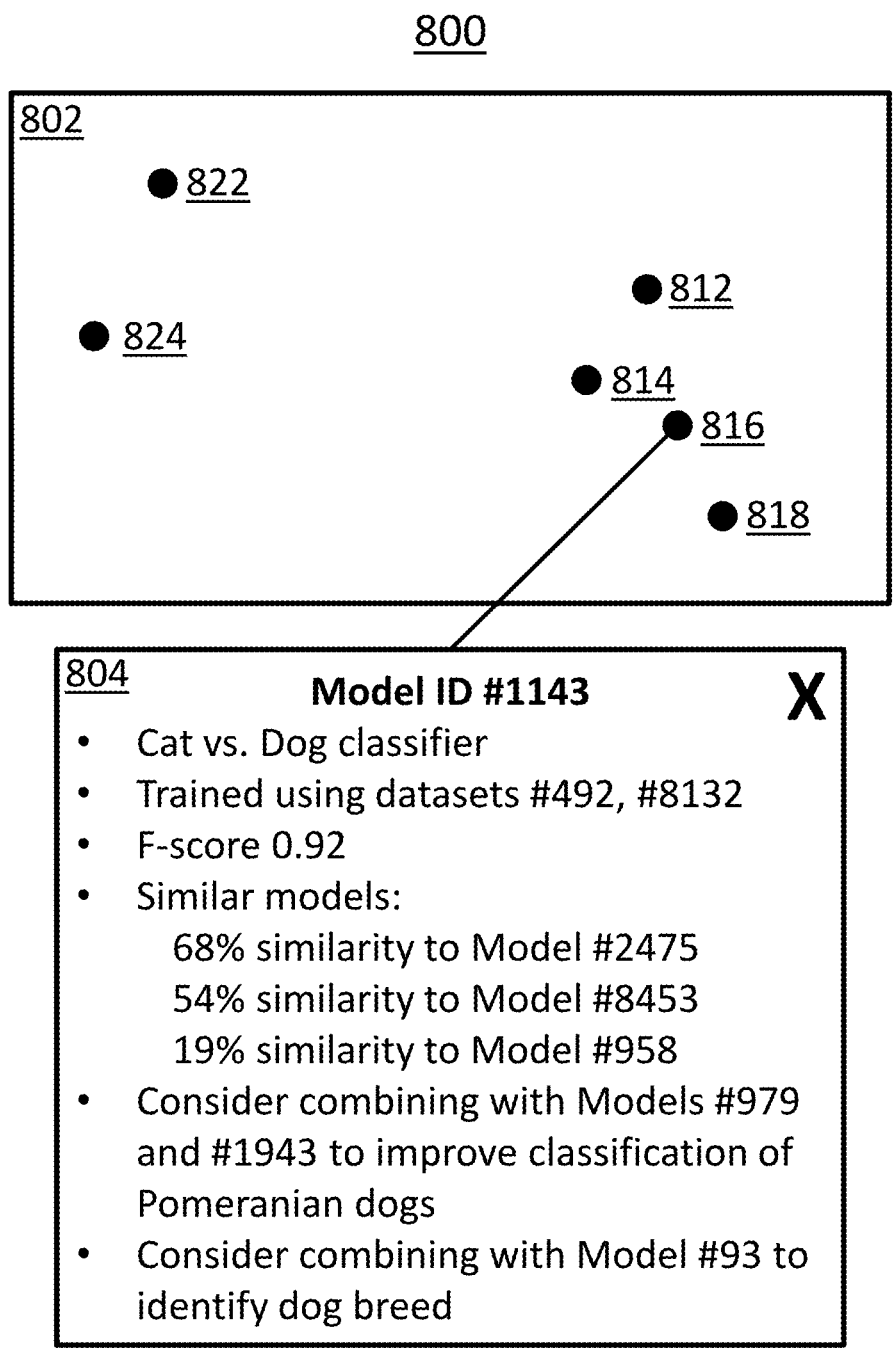
FIG. 8 is a schematic illustration of an example output consistent with an embodiment of the present disclosure.

FIG. 8 is a schematic illustration of an example output 800 consistent with an embodiment of the present disclosure. In this example, output 800 may include output region 802 and output region 804. In this example, output region 802 may include a visual representation of an embedding of six inference models 812, 814, 816, 818, 822 and 824 in a two dimensional space, and output region 804 may include textual information related to inference model 816. In some examples, a user may provide an indication of one or more of the inference models represented in output region 802, and textual details for the indicated inference models may be presented. In some examples, textual details of an inference model, such as the textual details presented in 804 for inference model 816, may include indications of other inference models, and in some implementations the user may select to view more details of one or more of the other inference models, for example by pressing on an indication of the one or more of the other inference models in output region 804. In this example, the textual details presented in output region 804 for inference model 816 may include a name of the model ("Model ID #1143"), a textual description of the model ("Cat vs. Dog classifier"), details about the creation of the model ("Trained using datasets #492, #8132"), measures of the quality of the model ("F score 0.92"), list of similar models together with indications of a degree of similarity ("68% similarity to Model #2475", "54% similarity to Model #8453", "19% similarity to Model #958"), suggestions for improvement of the model ("Consider combining with Models #979 and #1943 to improve classification of Pomeranian dogs"), and suggestions for usages of the model ("Consider combining with Model #93 to identify dog breed"). In other examples, other details about the model may be presented, such as details based on information determined using method 700 as described above.

Figure 9:
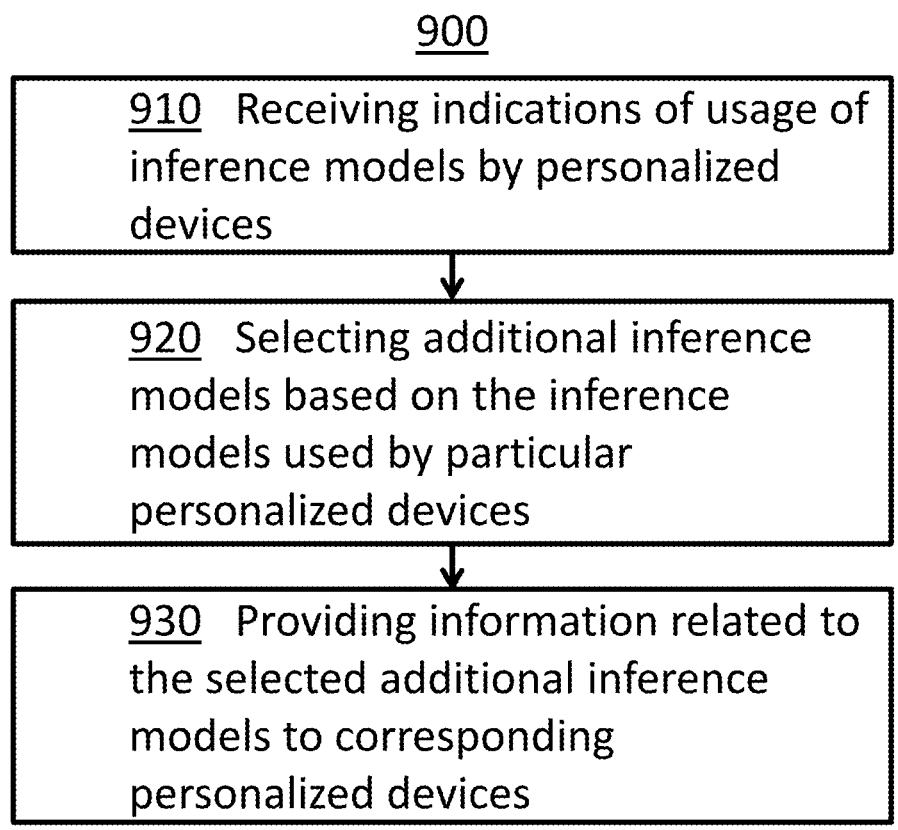
FIG. 9 illustrates an example of a method for personalized selection of inference models based on usage of other inference models.

FIG. 9 illustrates an example of a method 900 for personalized selection of inference models based on usage of other inference models. In this example, method 900 may comprise: receiving indications of usage of inference models by personalized devices (Step 910); selecting additional inference models based the inference models used by particular personalized devices (Step 920); and providing information related to the selected additional inference models to the corresponding personalized devices (Step 930). In some implementations, method 900 may comprise one or more additional steps, while some of the steps listed above may be modified or excluded. For example, in some cases Step 910 and/or Step 930 may be excluded from method 900. In some implementations, one or more steps illustrated in FIG. 9 may be executed in a different order and/or one or more groups of steps may be executed simultaneously and/or a plurality of steps may be combined into single step and/or a single step may be broken down to a plurality of steps.

In some embodiments, in Step 910 indications of usage of inference models by personalized devices may be received. For example, an indication of a usage of a first inference model by a first personalized device may be received, and an indication of a usage of a second inference model by a second personalized device may be also received. Some examples of such personalized devices may include mobile phone 111, tablet 112, PC 113, virtual machine operating using server 300 and/or cloud platform 400, and so forth. For example, the indications of usage of inference models may be read from memory (for example from memory unit 210, shared memory module 410, etc.), read from a blockchain, received through a communication network (such as communication network 130) using a communication device (such as communication module 230), received from an external device (such as mobile phone 111, tablet 112, PC 113, remote storage 140, NAS 150, server 300, cloud platform 400, etc.), and so forth. In another example, the indications of usage of inference models may be generated, for example by a process and/or a device using the inference models. In yet another example, the indications of usage of inference models may be extracted from a log (such as logs 660).

In some embodiments, in Step 920 additional inference models may be selected for particular personalized devices based on the inference models used by the particular personalized devices. For example, a first additional inference model may be selected based on the first inference model used by the first personalized device, and a second additional inference model may be selected based on the second inference model used by the second personalized device, wherein the second additional inference model may differ from the first additional inference model. For example, a table (such as a database table, a data-structure in memory, etc.) may link the inference models being used to selected additional inference models. In another example, a machine learning algorithm may be trained using training examples to select additional inference models based on inference models being used, and the trained machine learning algorithm may be used to select additional inference models based on the inference models being used by a particular personalized device. Some examples of such training examples may include pairs of lists, where each pair may comprise one list of the inference models being used and one list of the desired selection of additional inference models in that training example. In yet another example, an artificial neural network may be configured to select additional inference models based on inference models being used, and the artificial neural network may be used to select additional inference models based on the inference models being used by a particular personalized device.

In some examples, the selection of the additional inference model by Step 920 may be based on a compatibility of an output of the inference model used by a particular personalized device and an input of the additional inference model. In some examples, a particular personalized device may be configured to use the output of the inference model currently used by the particular personalized device as input to the additional inference model. For example, the selection of the first additional inference model by Step 920 may be based on a compatibility of an output of the first inference model used by the first personalized device and an input of the first additional inference model, and the selection of the second additional inference model by Step 920 may be based on a compatibility of an output of the second inference model used by the second personalized device and an input of the second additional inference model. In some examples, the output of the inference model may be compatible with an input of another inference model when the type of the output and the type of the input are identical (for example, both integers, both numerical, both strings, both images, etc.), when properties of the output matches properties of the input (for example, when the range of the possible outputs is included in the range of the valid inputs, when the size in bits of the two are identical, when the components of the output image are identical to the components of the input image, when the size of an output image is a valid size for input image, etc.), any combination of the above, and so forth. For example, a data-structure and/or a database storing information about the types and/or properties of the inputs and/or outputs of inference models may be accessed to determine whether the output of the inference model used by a particular personalized device and an input of another inference model are compatible. In another example, such data-structure and/or database may be accessed to obtain a list of alternative inference models with input that is compatible to the output of the inference model used by a particular personalized device, and the additional inference model for the particular personalized device may be selected of the obtained list of alternative inference models.

In some examples, the selection of the additional inference model by Step 920 may be based on a compatibility of an input of the inference model used by a particular personalized device and an output of the additional inference model. In some examples, a particular personalized device may be configured to use the output of the additional inference model as input to the inference model currently used by the particular personalized device. For example, the selection of the first additional inference model by Step 920 may be based on a compatibility of an input of the first inference model used by the first personalized device and an output of the first additional inference model, and the selection of the second additional inference model by Step 920 may be based on a compatibility of an input of the second inference model used by the second personalized device and an output of the second additional inference model. For example, a data-structure and/or a database storing information about the types and/or properties of the inputs and/or outputs of inference models may be accessed to determine whether the input of the inference model used by a particular personalized device and an output of another inference model are compatible. In another example, such data-structure and/or database may be accessed to obtain a list of alternative inference models with output that is compatible to the input of the inference model used by a particular personalized device, and the additional inference model for the particular personalized device may be selected of the obtained list of alternative inference models.

In some examples, the selection of the additional inference model by Step 920 may be based on a compatibility of an input of the inference model used by a particular personalized device and an input of the additional inference model. In some examples, a particular personalized device may be configured to replace the inference model currently used by the particular personalized device with the additional inference model, may be configured to start handling some of the inputs previously handled by the currently used inference model with the additional inference model (for example as described below), to use the currently used inference model and the additional inference model in an ensemble model, and so forth. For example, the selection of the first additional inference model by Step 920 may be based on a compatibility of an input of the first inference model used by the first personalized device and an input of the first additional inference model, and the selection of the second additional inference model by Step 920 may be based on a compatibility of an input of the second inference model used by the second personalized device and an input of the second additional inference model. For example, a data-structure and/or a database storing information about the types and/or properties of the inputs of inference models may be accessed to determine whether the input of the inference model used by a particular personalized device and an input of another inference model are compatible. In another example, such data-structure and/or database may be accessed to obtain a list of alternative inference models with input that is compatible to the input of the inference model used by a particular personalized device, and the additional inference model for the particular personalized device may be selected of the obtained list of alternative inference models.

In some examples, the selection of the additional inference model by Step 920 may be based on a compatibility of an output of the inference model used by a particular personalized device and an output of the additional inference model. In some examples, a particular personalized device may be configured to replace the inference model currently used by the particular personalized device with the additional inference model, may be configured to start performing some of the functions previously performed by the currently used inference model with the additional inference model (for example as described below), to use the currently used inference model and the additional inference model in an ensemble model, and so forth. For example, the selection of the first additional inference model by Step 920 may be based on a compatibility of an output of the first inference model used by the first personalized device and an output of the first additional inference model, and the selection of the second additional inference model by Step 920 may be based on a compatibility of an output of the second inference model used by the second personalized device and an output of the second additional inference model. For example, a data-structure and/or a database storing information about the types and/or properties of the outputs of inference models may be accessed to determine whether the output of the inference model used by a particular personalized device and an output of another inference model are compatible. In another example, such data-structure and/or database may be accessed to obtain a list of alternative inference models with output that is compatible to the output of the inference model used by a particular personalized device, and the additional inference model for the particular personalized device may be selected of the obtained list of alternative inference models.

In some examples, the indication of the usage of the inference models by the personalized devices received by Step 910 may comprise information related to outputs produced by the inference models when used by the personalized devices. For example, the indication of the usage of the first inference model by the first personalized device received by Step 910 may comprise information related to outputs produced by the first inference model when used by the first personalized device, and the indication of the usage of the second inference model by the second personalized device received by Step 910 may comprise information related to outputs produced by the second inference model when used by the second personalized device. Further, in some examples, the selection of the additional inference models by Step 920 may be based on the information related to the outputs produced by the inference models when used by the personalized devices. For example, the selection of the first additional inference model by Step 920 may be based on the information related to the outputs produced by the first inference model when used by the first personalized device, and the selection of the second additional inference model by Step 920 may be based on the information related to the outputs produced by the second inference model when used by the second personalized device. For example, the information related to outputs produced by an inference model may comprise the actual outputs, sample of the outputs, statistical information about the outputs (such as histogram of outputs, mean value and/or median value and/or mode value of the outputs, variance of the outputs, standard deviation of the outputs, etc.), information about a comparison of the outputs with desired outputs (such as numbers and/or ratios of false positives and/or false negatives and/or true positives and/or true negatives, accuracy, precision, F score, confusion matrix, other statistics about classification errors, sum of absolute errors, sum of square errors, other statistics about regression errors, etc.), and so forth. Further, in some examples, in response to a first information related to the outputs produced by an inference model when used by a personalized device (such as a first set of actual outputs, a first sample of the outputs, a first statistical information about the outputs, a first information about a comparison of the outputs with desired outputs, etc.), a first additional inference model may be selected, and in response to a second information related to the outputs produced by an inference model when used by a personalized device (such as a second set of actual outputs, a second sample of the outputs, a second statistical information about the outputs, a second information about a comparison of the outputs with desired outputs, etc.), a second additional inference model may be selected. For example, a machine learning algorithm may be trained using training examples to select additional inference models based on information related to outputs, and the trained machine learning algorithm may be used by Step 920 to select the additional inference models according to the information related to the outputs produced by the inference models when used by the personalized devices. In another example, an artificial neural network may be configured to select additional inference models based on information related to outputs, and the artificial neural network may be used by Step 920 to select the additional inference models according to the information related to the outputs produced by the inference models when used by the personalized devices.

In some examples, the indication of the usage of the first inference model by the first personalized device received by Step 910 may comprise information related to classification errors of the first inference model when used by the first personalized device, the indication of the usage of the second inference model by the second personalized device received by Step 910 may comprise information related to classification errors of the second inference model when used by the second personalized device, the selection of the first additional inference model by Step 920 may be based on the information related to the classification errors of the first inference model when used by the first personalized device, and the selection of the second additional inference model by Step 920 may be based on the information related to the classification errors of the second inference model when used by the second personalized device, for example as described above.

In some examples, the indication of the usage of the inference models by the personalized devices received by Step 910 may comprise information related to confidence levels associated with outputs produced by the inference models when used by the personalized devices. For example, the indication of the usage of the first inference model by the first personalized device received by Step 910 may comprise information related to confidence levels associated with outputs produced by the first inference model when used by the first personalized device, the indication of the usage of the second inference model by the second personalized device received by Step 910 may comprise information related to confidence levels associated with outputs produced by the second inference model when used by the second personalized device, and so forth. Further, in some examples, the selection of the additional inference models by Step 920 may be based on the information related to the confidence levels associated with the outputs produced by the inference models when used by the personalized devices. For example, the selection of the first additional inference model by Step 920 may be based on the information related to the confidence levels associated with the outputs produced by the first inference model when used by the first personalized device, and the selection of the second additional inference model by Step 920 may be based on the information related to the confidence levels associated with the outputs produced by the second inference model when used by the second personalized device. For example, the information related to confidence levels associated with the outputs produced by an inference model may comprise the actual confidence levels, sample of the confidence levels, statistical information about the confidence levels (such as histogram of confidence levels, mean value and/or median value and/or mode value of the confidence levels, variance of the confidence levels, standard deviation of the confidence levels, etc.), and so forth. Further, in some examples, in response to a first information related to the confidence levels associated with the outputs produced by an inference model when used by a personalized device (such as a first set of actual confidence levels, a first sample of the confidence levels, a first statistical information about the confidence levels, etc.), a first additional inference model may be selected, and in response to a second information related to the confidence levels associated with the outputs produced by an inference model when used by a personalized device (such as a second set of actual confidence levels, a second sample of the confidence levels, a second statistical information about the confidence levels, etc.), a second additional inference model may be selected. For example, a machine learning algorithm may be trained using training examples to select additional inference models based on information related to confidence levels, and the trained machine learning algorithm may be used by Step 920 to select the additional inference models according to the information related to the confidence levels associated with the outputs produced by the inference models when used by the personalized devices. In another example, an artificial neural network may be configured to select additional inference models based on information related to confidence levels, and the artificial neural network may be used by Step 920 to select the additional inference models according to the information related to the confidence levels associated with the outputs produced by the inference models when used by the personalized devices.

In some examples, the indication of the usage of the inference models by the personalized devices received by Step 910 may comprise information related to usage time of the inference models by the personalized devices. For example, the indication of the usage of the first inference model by the first personalized device received by Step 910 may comprise information related to usage time of the first inference model by the first personalized device, the indication of the usage of the second inference model by the second personalized device received by Step 910 may comprise information related to usage time of the second inference model by the second personalized device, and so forth. For example, the information related to usage time of the inference models by the personalized devices may comprise at least one of overall usage time, number of usages, particular time of usage, statistical information about the particular times of usage, and so forth. Further, in some examples, the selection of the additional inference models by Step 920 may be based on the information related to the usage time of the inference models by the personalized devices. For example, the selection of the first additional inference model by Step 920 may be based on the information related to the usage time of the first inference model by the first personalized device, and the selection of the second additional inference model by Step 920 may be based on the information related to the usage time of the second inference model by the second personalized device, and so forth. For example, in response to a first information related to the usage time of an inference model by a personalized device (such as a first overall usage time, a first number of usages, first particular times of usage, first statistical information about the particular times of usage, etc.), a first additional inference model may be selected, and in response to a second information related to the usage time of an inference model by a personalized device (such as a second overall usage time, a second number of usages, second particular time of usage, second statistical information about the particular times of usage, etc.), a second additional inference model may be selected. For example, a machine learning algorithm may be trained using training examples to select additional inference models based on information related to usage time, and the trained machine learning algorithm may be used by Step 920 to select the additional inference models according to the information related to usage time of the inference models by the personalized devices. In another example, an artificial neural network may be configured to select additional inference models based on information related to usage time, and the artificial neural network may be used by Step 920 to select the additional inference models according to the information related to usage time of the inference models by the personalized devices.

In some examples, the indication of the usage of the inference models by the personalized devices received by Step 910 may comprise information related to locations of usage of the inference models by the personalized devices. For example, the indication of the usage of the first inference model by the first personalized device received by Step 910 may comprise information related to locations of usage of the first inference model by the first personalized device, the indication of the usage of the second inference model by the second personalized device received by Step 910 may comprise information related to location of usage of the second inference model by the second personalized device. For example, the information related to location of usage of the inference models by the personalized devices may comprise at least one of particular locations of usage, statistical information about the particular locations of usage, and so forth. Further, in some examples, the selection of the additional inference models by Step 920 may be based on the information related to the location of usage of the inference models by the personalized devices. For example, the selection of the first additional inference model by Step 920 may be based on the information related to the location of usage of the first inference model by the first personalized device, and the selection of the second additional inference model by Step 920 may be based on the information related to the location of usage of the second inference model by the second personalized device. For example, in response to first information related to the location of usage of an inference model by a personalized device, a first additional inference model may be selected, and in response to second information related to the location of usage of an inference model by a personalized device, a second additional inference model may be selected. For example, a machine learning algorithm may be trained using training examples to select additional inference models based on information related to locations, and the trained machine learning algorithm may be used by Step 920 to select the additional inference models according to the information related to location of usage of the inference models by the personalized devices. In another example, an artificial neural network may be configured to select additional inference models based on information related to locations, and the artificial neural network may be used by Step 920 to select the additional inference models according to the information related to location of usage of the inference models by the personalized devices.

In some examples, the indication of the usage of the inference models by the personalized devices received by Step 910 may comprise information related to inputs provided to the inference models by the personalized devices. For example, the indication of the usage of the first inference model by the first personalized device received by Step 910 may comprise information related to inputs provided to the first inference model by the first personalized device, the indication of the usage of the second inference model by the second personalized device received by Step 910 may comprise information related to inputs provided to the second inference model by the second personalized device. For example, the information related to inputs produced by an inference model may comprise the actual inputs, sample of the inputs, statistical information about the inputs (such as histogram of inputs, mean value and/or median value and/or mode value of the inputs, variance of the inputs, standard deviation of the inputs, etc.), and so forth. Further, in some examples, the selection of the additional inference models by Step 920 may be based on the information related to the inputs provided to the inference models by the personalized devices. For example, the selection of the first additional inference model by Step 920 may be based on the information related to the inputs provided to the first inference model by the first personalized device, and the selection of the second additional inference model by Step 920 may be based on the information related to the inputs provided to the second inference model by the second personalized device. For example, in response to a first information related to the inputs produced by an inference model when used by a personalized device (such as a first set of actual inputs, a first sample of the inputs, a first statistical information about the inputs, etc.), a first additional inference model may be selected, and in response to a second information related to the inputs produced by an inference model when used by a personalized device (such as a second set of actual inputs, a second sample of the inputs, a second statistical information about the inputs, etc.), a second additional inference model may be selected. For example, a machine learning algorithm may be trained using training examples to select additional inference models based on information related to inputs, and the trained machine learning algorithm may be used by Step 920 to select the additional inference models according to the information related to the inputs produced by the inference models when used by the personalized devices. In another example, an artificial neural network may be configured to select additional inference models based on information related to inputs, and the artificial neural network may be used by Step 920 to select the additional inference models according to the information related to the inputs produced by the inference models when used by the personalized devices.

In some examples, the indication of the usage of the inference models by the personalized devices received by Step 910 may comprise indications of properties of inference models used by the personalized devices. In some examples, in Step 920 properties of inference models used by the personalized devices may be used to select the additional inference models for the personalized devices. For example, properties of the first inference model used by the first personalized device may be used to select the first additional inference model, properties of the second inference model used by the second personalized device may be used to select the second additional inference model, and so forth. Some examples of such properties may include type of input, type of output, complexity, memory requirements, runtime requirements, information related to outputs produced by the inference models when used by the personalized devices (for example as described above), information related to errors of the inference models when used by the personalized devices (for example as described above), information related to confidence levels associated with outputs produced by the inference models when used by the personalized devices (for example as described above), information related to confidence levels associated with outputs produced by the inference models when used by the personalized devices (as described above), and so forth. For example, at least one property of the first inference model may be used to access a database of inference model relations to select the first additional inference model, at least one property of the second inference model may be used to access a database of inference model relations to select the second additional inference model, and so forth. For example, a hash value may be calculated for the properties using a hash function, and the calculated hash value may be used to access the database. In another example, a value of a property may be used to access the database directly.

In some examples, the additional inference models selected by Step 920 based on the inference models used by the personalized devices may be suggested to users of the personalized devices. For example, the first additional inference model selected by Step 920 based on the first inference model used by the first personalized device may be suggested to a user of the first personalized device, the second additional inference model selected by Step 920 based on the second inference model used by the second personalized device may be suggested to a user of the second personalized device, and so forth. In some examples, information related to the selected additional inference model may be provided to the users of the personalized devices. For example, the information related to the selected additional inference model may be displayed to the user, may be provided audibly, may be provided textually, may be provided through the corresponding personalized device, may be provided through another device (such as another personalized device associated with the user, a public device, etc.), and so forth. For example, the information related to the selected additional inference model may be transmitted to an external device (for example through a communication network, such as communication network 130, using a communication device, such as communication module 230), and in some examples the transmitted information may be configured to cause the external device to provide the information to a user. In another example, the information related to the selected additional inference model may be stored in memory, and in some examples the stored information may be read from memory (for example by another process, another device, etc.) and used to provide information related to the selected additional inference model to a user.

In some examples, the first personalized device may be caused to use a cascade of the first inference model and the first additional inference model selected by Step 920 based on the first inference model, for example as described below in relation to FIG. 10C and FIG. 10D.

In some examples, the first personalized device may be caused to use an aggregate of outputs of the first inference model corresponding to an input and of outputs of the first additional inference model corresponding to the input to determine an overall output corresponding to the input, for example as described below in relation to FIG. 10G and Component 1008.

In some examples, the first personalized device may be caused to provide a first input to the first inference model to determine a first output and/or to provide a second input to the first additional inference model selected by Step 920 based on the first inference model to determine a second output, where the second input differs from the first input. Further, in some examples, the first personalized device may be caused to combine the first output and the second output to determine an overall output corresponding to a combination of the first input and the second input. For example, the first personalized device may be caused to use Component 1006 (for example as illustrated in FIG. 10F) to determine which input and/or which portion of which input to provide to which inference model, for example as described below (for example in relation to FIG. 10E, FIG. 10F and Component 1006).

In some examples, the indication of the usage of the first inference model by the first personalized device received by Step 910 may comprise an indication that the first personalized device uses the first inference model to handle at least a first type of input and a second type of input. Further, in some examples, for example in response to the received indication of usage of the first inference model by the first personalized device, the first personalized device may be caused to use the first inference model to handle at least the first type of input, and use the first additional inference model selected based on the first inference model to handle at least the second type of input, for example as illustrated in FIG. 10F and as described below in relation to FIG. 10F and Component 1006. Some examples of such types of input may include images of a particular range of pixel resolution, videos of a particular range of frame rate, data in a particular format, data from particular sources, and so forth.

In some examples, the indication of the usage of the first inference model by the first personalized device received by Step 910 may comprise an indication that the first personalized device uses the first inference model to handle at least inputs received at a first time window and inputs received at a second time window. Further, in some examples, for example in response to the received indication of usage of the first inference model by the first personalized device, the first personalized device may be caused to use the first inference model to handle at least inputs received at the first time window, and use the first additional inference model selected based on the first inference model to handle at least inputs received at the second time window, for example as illustrated in FIG. 10F and as described below in relation to FIG. 10F and Component 1006. Some examples of time windows may include selected range of time in day (such as morning hours, afternoon hours, evening hours, night hours, between 8 AM to 10 AM, etc.), selected range of time in week (such as Monday, Monday between 8 AM and 10 AM, weekdays, weekend, etc.), selected range of time in month (first Monday of each month, second day of the month, etc.), holidays, and so forth.

In some examples, the indication of the usage of the first inference model by the first personalized device received by Step 910 may comprise an indication that the first personalized device uses the first inference model to handle at least inputs associated with a first geographical area and inputs associated with a second geographical area. Further, in some examples, for example in response to the received indication of usage of the first inference model by the first personalized device, the first personalized device may be caused to use the first inference model to handle at least inputs associated with the first geographical area, and use the first additional inference model selected based on the first inference model to handle at least inputs associated with the second geographical area, for example as illustrated in FIG. 10F and as described below in relation to FIG. 10F and Component 1006. Some examples of such geographical areas may include home of a user, workplace of a user, indoor, outdoor, particular building, particular part of a building, particular street, particular neighborhood, particular city, and so forth.

In some examples, the indication of the usage of the first inference model by the first personalized device received by Step 910 may comprise an indication that the first personalized device uses the first inference model to handle at least inputs associated with a first entity and inputs associated with a second entity. Further, in some examples, for example in response to the received indication of usage of the first inference model by the first personalized device, the first personalized device may be caused to use the first inference model to handle at least inputs associated with the first entity, and use the first additional inference model selected based on the first inference model to handle at least inputs associated with the second entity, for example as illustrated in FIG. 10F and as described below in relation to FIG. 10F and Component 1006. Some examples of such entities may include users, family members of a user, friends of a user, coworkers of a user, colleges of a user, robots, legal entities, and so forth.

In some examples, the indication of the usage of the first inference model by the first personalized device received by Step 910 may comprise an indication that the first personalized device uses the first inference model to handle at least inputs associated with a first contextual situation and inputs associated with a second contextual situation. Further, in some examples, for example in response to the received indication of usage of the first inference model by the first personalized device, the first personalized device may be caused to use the first inference model to handle at least inputs associated with the first contextual situation, and use the first additional inference model selected based on the first inference model to handle at least inputs associated with the second contextual situation, for example as illustrated in FIG. 10F and as described below in relation to FIG. 10F and Component 1006. Some examples of such contextual situations may include association with one or more of selected locations, selected times, selected topics, selected persons, selected items, selected scenes, and so forth.

In some embodiments, in Step 930 information related to the additional inference models selected by Step 920 may be provided to the corresponding personalized devices, for example in response to the indications of usage of inference models by personalized devices received by Step 910. For example, in response to the indication of usage of the first inference model by the first personalized device received by Step 910, information related to the first additional inference model selected by Step 920 based on the first inference model may be provided to the first personalized device, and in response to the indication of usage of the second inference model by the second personalized device received by Step 910, information related to the second additional inference model selected by Step 920 based on the second inference model may be provided to the second personalized device. In some example, Step 930 and providence of the information related to the additional inference models selected by Step 920 may be triggered by the indications of usage of inference models by personalized devices received by Step 910, by the selection of the additional inference models selected by Step 920, at a selected update time, and so forth. In some examples, information related to the additional inference models selected by Step 920 may be stored in memory (for example in memory unit 210, in shared memory module 410, etc.) for the corresponding personalized devices to access it, posted on a blockchain for the corresponding personalized devices to access it, transmitted through a communication network (such as communication network 130) using a communication device (such as communication module 230) to the corresponding personalized devices, provided to an external device (such as mobile phone 111, tablet 112, PC 113, remote storage 140, NAS 150, server 300, cloud platform 400, etc.) for the corresponding personalized devices to access it through the external devices, and so forth.

FIGS. 10A, 10B, 10C, 10D, 10E, 10F and 10G are schematic illustrations of different configurations for using inference models consistent with embodiments of the present disclosure. In some embodiments, different devices may use different configurations of inference models. In some embodiments, a device may use different configurations of inference models at different times, at different locations, in different contexts, and so forth.

In some embodiments, inference model 1002 may be used to generate output based on provided input, as illustrated in FIG. 10A. In some embodiments additional inference models 1004 may be selected based on the usage of inference model 1002, for example using method 900 as described above. In some embodiments, after a selection of additional inference model 1004, inference model 1002 may be replaced by the selected additional inference model 1004, and the selected additional inference model 1004 may be used to generate output based on provided input, as illustrated in FIG. 10B.

In some embodiments, after a selection of additional inference model 1004, outputs of inference model 1002 may be provided to the selected additional inference model 1004, and the selected additional inference model 1004 may generate output based on the outputs of inference model 1002, as illustrated in FIG. 10C. In some examples, inference model 1002 and the selected additional inference model 1004 may be used in a cascade configuration. For example, before providing the outputs of inference model 1002 to the selected additional inference model 1004, the outputs of inference model 1002 may be analyzed to determine whether to provide the outputs of inference model 1002 to the selected additional inference model 1004 or not. Further, in response to a determination not to provide the outputs of inference model 1002 to the selected additional inference model 1004, an output may be generated based on that determination and/or the outputs of inference model 1002, and in in response to a determination to provide the outputs of inference model 1002 to the selected additional inference model 1004, an output may be generated by the selected additional inference model 1004 based on the outputs of inference model 1002.

In some embodiments, after a selection of additional inference model 1004, the selected additional inference model 1004 may be used to generate outputs based on provided inputs, the outputs of the selected additional inference model 1004 may be provided to inference model 1002, and inference model 1002 may generate output based on the outputs of the selected additional inference model 1004, as illustrated in FIG. 10D. In some examples, inference model 1002 and the selected additional inference model 1004 may be used in a cascade configuration. For example, before providing the outputs of the selected additional inference model 1004 to inference model 1002, the outputs of the selected additional inference model 1004 may be analyzed to determine whether to provide the outputs of the selected additional inference model 1004 to inference model 1002 or not. Further, in response to a determination not to provide the outputs of the selected additional inference model 1004 to inference model 1002, an output may be generated based on that determination and/or the outputs of the selected additional inference model 1004, and in in response to a determination to provide the outputs of the selected additional inference model 1004 to inference model 1002, an output may be generated by inference model 1002 based on the outputs of the selected additional inference model 1004.

In some embodiments, after a selection of additional inference model 1004, common inputs may be provided to both inference model 1002 and the selected additional inference model 1004, inference model 1002 may generate a first output ("Output1" in FIG. 10E) based on the provided input, and the selected additional inference model 1004 may generate a second output ("Output2" in FIG. 10E) based on the provided input, as illustrated in FIG. 10E. In some embodiments, after a selection of additional inference model 1004, a first portion of a common input may be provided to inference model 1002 and a second portion of the common input may be provided to the selected additional inference model 1004, inference model 1002 may generate a first output ("Output1" in FIG. 10E) based on the provided first portion of the common input, and the selected additional inference model 1004 may generate a second output ("Output2" in FIG. 10E) based on the provided second portion of the common input, as illustrated in FIG. 10E. For example, the first portion and second portion of the common input may be selected based on the structure of the common input, based on the content of the common input, based on geographical area associated with the common input, based on time associated with the common input, based on context associated with the common input, based on an entity associated with the common input, and so forth. For example, a machine learning algorithm may be trained using training examples to select portions of the common input based on the information listed above, and the trained machine learning algorithm may be used to select the first portion and second portion of the common input based on the information listed above. Some examples of such training examples may include example common inputs and/or example information related to the example common inputs together with a desired selection of portions. In another example, an artificial neural network may be configured to select portions of the common input based on the information listed above, and the artificial neural network may be used to select the first portion and second portion of the common input based on the information listed above.

In some embodiments, after a selection of additional inference model 1004, Component 1006 may determine (for example as described below) whether to provide the input (or selected portions of the input) to inference model 1002, to inference model 1004, to both inference models 1002 and 1004, to none of the two inference models, etc., and in some examples, the inference models that were provided with the input by Component 1006 may generate outputs based on the provided input, for example when an input is provided to inference model 1002 by Component 1006, inference model 1002 may generate a first output ("Output1" in FIG. 10F) based on the provided input, and when an input is provided to the selected additional inference model 1004 by Component 1006, the selected additional inference model 1004 may generate a second output ("Output2" in FIG. 10F) based on the provided input, for example as illustrated in FIG. 10F.

In some embodiments, after a selection of additional inference model 1004, common inputs (or portions of the common inputs selected as described above) may be provided to both inference model 1002 and the selected additional inference model 1004, inference model 1002 may generate a first output ("Output1" in FIG. 10G) based on the provided input, the selected additional inference model 1004 may generate a second output ("Output2" in FIG. 10G) based on the provided input, and the first output ("Output1") and the second output ("Output2") may be merged into a unified output by Component 1008 (for example as described below), for example as illustrated in FIG. 10G.

In some embodiments, Component 1006 and/or Component 1008 may be performed by various aspects of apparatus 200, server 300, cloud platform 400, computational node 500, and so forth. For example, processing units 220 may execute software instructions stored within memory units 210 and/or within shared memory modules 410, and the software instructions may be configured to cause processing units 220 to perform the function of Component 1006 and/or Component 1008. In another example, Component 1006 and/or Component 1008 may be implemented by a dedicated hardware. In yet another example, computer readable medium (such as a non-transitory computer readable medium) may store data and/or computer implementable instructions for carrying out the functions of Component 1006 and/or Component 1008.

In some embodiments, Component 1006 may determine to which inference models to provide the input (or selected portions of the input), for example as illustrated in FIG. 10F. In some examples, the determination to which inference models to provide the input (or selected portions of the input) may be based on a type of the input (for example as described above), may be based on a time associated with the input (for example as described above), may be based on a geographical area associated with the input (for example as described above), may be based on a contextual situation associated with the input (for example as described above), may be based on an entity associated with the input (for example as described above), and so forth. In some examples, Component 1006 may analyze the input (or selected parts of the input) to determine to which inference models to provide the input (or selected portions of the input), and/or to select which portions of the input to provide to which inference model. For example, a machine learning algorithm may be trained using training examples to determine which inference models should be provided with which portions of an input based on the content of the input and/or information associated with the input (such as type of the input, time associated with the input, geographical area associated with the input, contextual situation associated with the input, entity associated with the input, etc.), and the trained machine learning algorithm may be used to determine to which portion of the input to provide to which inference models based on the input and/or information associated with the input. For example, such training example may comprise an example of an input and/or of information associated with the example input, together with desired selection of inference models to provide the example input to and/or desired selection of portions of the example input. In another example, an artificial neural network may be configured to determine which inference models should be provided with which portions of an input based on the content of the input and/or information associated with the input (such as type of the input, time associated with the input, geographical area associated with the input, contextual situation associated with the input, entity associated with the input, etc.), and the artificial neural network may be used to determine to which inference models to provide which portions of the input based on the input and/or information associated with the input.

In some embodiments, Component 1008 may merge a plurality of outputs into a unified output, for example as illustrated in FIG. 10G. In some examples, Component 1008 may use a voting mechanism to select one output of the plurality of outputs. For example, such voting mechanism may select the most prevalence output of the plurality of outputs. In some examples, Component 1008 may calculate a statistical measure of the plurality of outputs, and the unified output may be based on the calculated statistical measure. Some examples of such statistical measure may include mean, median, mode, variance, standard deviation, and so forth. In some examples, each output of the plurality of outputs may be associated with a confidence level (for example, with a confidence level produced by the inference model that generated the output, with a confidence level that was calculated for the output, etc.), and Component 1008 may use the confidence levels associated with the outputs to merge the plurality of outputs into a unified output. For example, the output corresponding to the highest confidence level may be selected, a weighted average of the plurality of outputs may be calculated using weights based on the confidence levels, a statistical measure of a subgroup of the plurality of outputs selected based on the confidence levels may be calculated (for example, the subgroup may correspond to outputs associated with the highest confidence levels, to outputs associated with confidence levels higher than a selected threshold, etc.), and so forth.

Figure 11:
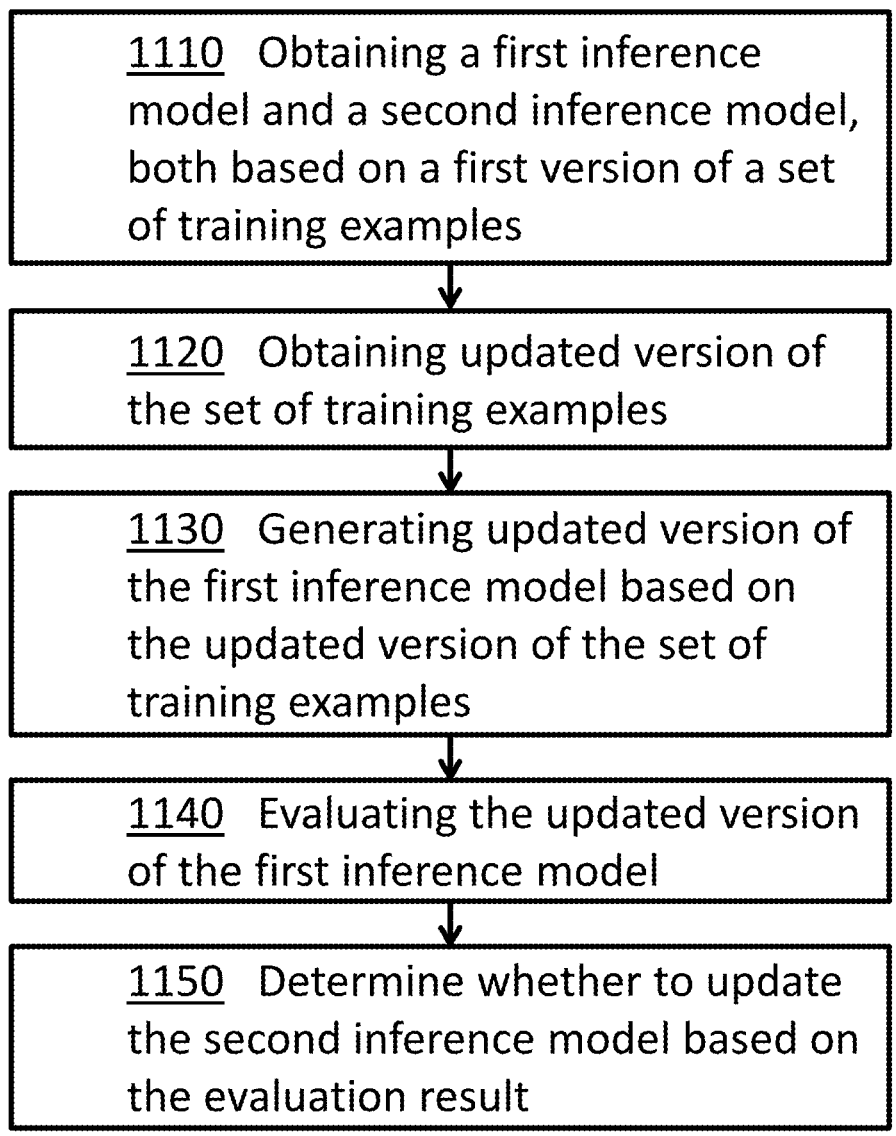
FIG. 11 illustrates an example of a method for selective update of inference models.

FIG. 11 illustrates an example of a method 1100 for selective update of inference models. In this example, method 1100 may comprise: obtaining a first inference model and a second inference model based on a first version of a set of training examples (Step 1110); obtaining updated version of the set of training examples (Step 1120); generating updated version of the first inference model based on the updated version of the set of training examples (Step 1130); evaluating the updated version of the first inference model (Step 1140); and determining whether to update the second inference model based on the evaluation result (Step 1150). In some implementations, method 1100 may comprise one or more additional steps, while some of the steps listed above may be modified or excluded. For example, in some cases Step 1110 and/or Step 1120 and/or Step 1130 may be excluded from method 1100. In some implementations, one or more steps illustrated in FIG. 11 may be executed in a different order and/or one or more groups of steps may be executed simultaneously and/or a plurality of steps may be combined into single step and/or a single step may be broken down to a plurality of steps.

In some embodiments, in Step 1110 inference models based on a first version of a set of training examples may be obtained. For example, a first inference model and a second inference model may be obtained, where the first inference model and the second inference model may be based on the first version of the set of training examples. For example, the inference models may be a result of training one or more machine learning algorithms using the first version of the set of training examples. In another example, the inference models may be selected of a plurality of alternative inference models based on the first version of the set of training examples. In some examples, the inference models and/or information related to the inference models may be read from memory (for example from memory unit 210, shared memory module 410, etc.), read from a blockchain, received through a communication network (such as communication network 130) using a communication device (such as communication module 230), received from an external device (such as mobile phone 111, tablet 112, PC 113, remote storage 140, NAS 150, server 300, cloud platform 400, etc.), generated (for example by training one or more machine learning algorithms using one or more hyper-parameters and/or the first version of the set of training examples), selected (for example as described above), and so forth.

In some embodiments, in Step 1120 an updated version of the set of training examples may be obtained. For example, the first version of the set of training examples of Step 1110 may include at least one example not included in the updated version of the set of training examples obtained by Step 1120. In another example, the updated version of the set of training examples obtained by Step 1120 may include at least one example not included in the first version of the set of training examples of Step 1110. In yet another example, the updated version of the set of training examples obtained by Step 1120 may include at least one modified version of at least one example included in the first version of the set of training examples of Step 1110. In some examples, in Step 1120 update information may be obtained, and in some examples the set of training examples of Step 1110 may be updated according to the obtained update information. For example, the update information may comprise a delta between the first version of the set of training examples and the updated version of the set of training examples, may comprise training examples to be added to the first version of the set of training examples, may comprise indication of training examples to be removed from the first version of the set of training examples, may include indication of training examples to be modified, and so forth. In some examples, in Step 1120 the updated version of the set of training examples may be read from memory (for example from memory unit 210, shared memory module 410, etc.), read from a blockchain, received through a communication network (such as communication network 130) using a communication device (such as communication module 230), received from an external device (such as mobile phone 111, tablet 112, PC 113, remote storage 140, NAS 150, server 300, cloud platform 400, etc.), generated (for example as described above), and so forth.

In some embodiments, in Step 1130 an updated version of the first inference model obtained by Step 1110 may be generated based on the updated version of the set of training examples obtained by Step 1120. In some examples, a machine learning algorithm may be trained using the updated version of the set of training examples obtained by Step 1120 to generate the updated version of the first inference model. For example, the machine learning algorithm used to generate the first inference model (for example as described above) may be trained using the updated version of the set of training examples obtained by Step 1120 to generate the updated version of the first inference model. In another example, an additional inference model may be generated and/or obtained based on the updated version of the set of training examples obtained by Step 1120 (for example, in a similar fashion as described above in relation to Step 1110), and the additional inference model may be combined with the first inference model to generate the updated version of the first inference model, for example as described above and illustrated in FIG. 10C and/or FIG. 10D and/or FIG. 10E and/or FIG. 10F and/or FIG. 10G. In some examples, the additional inference model and/or the updated version of the first inference model may be selected of a plurality of alternative inference models based on the updated version of the set of training examples obtained by Step 1120. For example, in response to a first updated version of the set of training examples, one inference model may be selected, and in response to a second updated version of the set of training examples, another inference model may be selected.

In some examples, the first version of the set of training examples of Step 1110 may include at least one example not included in the updated version of the set of training examples obtained by Step 1120, and the at least one example not included in the updated version of the set of training examples may be used by Step 1130 to generate the updated version of the first inference model. For example, in response to a first example included in the first version of the set of training examples and not in the updated version of the set of training examples, Step 1130 may generate a first updated version of the first inference model, and in response to a second example included in the first version of the set of training examples and not in the updated version of the set of training examples, Step 1130 may generate a second updated version of the first inference model different from the first updated version of the first inference model.

In some examples, the updated version of the set of training examples obtained by Step 1120 may include at least one example not included in the first version of the set of training examples of Step 1110, and the at least one example not included in the first version of the set of training examples may be used to generate the updated version of the first inference model. For example, in response to a first example included in the updated version of the set of training examples and not in the first version of the set of training examples, Step 1130 may generate a first updated version of the first inference model, and in response to a second example included in the updated version of the set of training examples and not in the first version of the set of training examples, Step 1130 may generate a second updated version of the first inference model different from the first updated version of the first inference model.

In some embodiments, in Step 1140 the updated version of the first inference model generated by Step 1130 may be evaluated to obtain an evaluation result. In some examples, parameters of the updated version of the first inference model generated by Step 1130 (such as parameters determined by training a machine learning model using hyperparameters and/or training examples as described above) may be analyzed to evaluate the updated version of the first inference model generated by Step 1130. For example, a statistical measure of the parameters may be calculated, and the statistical measure may be used to evaluate the updated version of the first inference model generated by Step 1130. In another example, a machine learning model may be trained using training examples to generate evaluations of inference models based on parameters of the inference models, and the trained machine learning model may be used to analyze the parameters of the updated version of the first inference model to evaluate the updated version of the first inference model generated by Step 1130. Some examples of such training example may include a set of parameters together with a corresponding desired evaluation. In yet another example, an artificial neural network may be configured to generate evaluations of inference models based on parameters of the inference models, and the artificial neural network may be used to analyze the parameters of the updated version of the first inference model to evaluate the updated version of the first inference model generated by Step 1130. In some examples, the updated version of the first inference model generated by Step 1130 may be evaluated using validation examples and/or test examples to obtain the evaluation result, for example as described above. For example, the updated version of the first inference model generated by Step 1130 may be used to estimate outputs for the example inputs of the validation examples and/or test examples, the estimated outputs may be compared to the corresponding desired outputs, and the evaluation result may be based on the comparison of the estimated outputs and the desired outputs. For example, the evaluation result may be based on a function of one or more of the numbers and/or ratios of false positives and/or false negatives and/or true positives and/or true negatives, accuracy, precision, F score, confusion matrix, other statistics about classification errors, sum of absolute errors, sum of square errors, other statistics about regression errors, and so forth. In some examples, the updated version of the first inference model generated by Step 1130 may be evaluated based on entities and/or tools involved in the generation of the updated version of the first inference model generated by Step 1130. For example, an inference model generated by a first engineer may be evaluated as better than an inference model generated by a second engineer. In another example, an inference model generated using a first tool may be evaluated as better than an inference model generated using a second tool. Some examples of such tools may include hardware (such as computing devices, memory devices, etc.), algorithms (such as machine learning algorithms, data preparation algorithms, etc.), hyper-parameters, and so forth. In some examples, the updated version of the first inference model generated by Step 1130 may be evaluated based on usage of the updated version of the first inference model. For example, the evaluation may be based on amount of usage, time of usage, location of usage, type of usage, and so forth. For example, an inference model that is used more often may be evaluated as better than an inference model that is used less often. In another example, an inference model that is used during selected time intervals may be evaluated as better than an inference model that is used in other time intervals. In yet another example, an inference model that is used at selected locations may be evaluated as better than an inference model that is used at other locations. In an additional example, an inference model that is used in particulate fashion may be evaluated as better than an inference model that is used in a different fashion. In some examples, the updated version of the first inference model generated by Step 1130 may be evaluated based on feedbacks from users. For example, information based on outputs of the updated version of the first inference model generated by Step 1130 may be provided to one or more users, the one or more users may provide feedbacks relating to the provided information, and the updated version of the first inference model generated by Step 1130 may be evaluated based on those feedbacks.

In some embodiments, in Step 1150 the evaluation result obtained by Step 1140 may be used to determine whether to update the second inference model obtained by Step 1110. For example, in response to a first evaluation result (for example, a positive evaluation result, an evaluation result above a selected threshold, an evaluation result within a selected range, etc.), it may be determined to update the second inference model obtained by Step 1110, and in response to a second evaluation result (for example, a negative evaluation result, an evaluation result below a selected threshold, an evaluation result within a selected range, etc.), it may be determined not to update the second inference model obtained by Step 1110.

In some embodiments, the update to the second inference model obtained by Step 1110 may be based on the evaluation result obtained by Step 1140. For example, in response to a first evaluation result (for example, a positive evaluation result, an evaluation result above a selected threshold, an evaluation result within a selected range, etc.), a first update to the second inference model obtained by Step 1110 may be selected, and in response to a second evaluation result (for example, a negative evaluation result, an evaluation result below a selected threshold, an evaluation result within a selected range, etc.), a second update to the second inference model obtained by Step 1110 may be selected.

In some examples, the first inference model obtained by Step 1110 may be a result of training a machine learning algorithm using a first training set (for example as described above), the second inference model obtained by Step 1110 may be a result of training the same or a different machine learning algorithm using a second training set (for example as described above), and both the first training set and the second training set may comprise the set of training examples of Step 1110. For example, the second training set may differ from the first training set. In another example, the second training set may be identical to the first training set.

In some examples, the first inference model obtained by Step 1110 may be a result of training a first machine learning algorithm using the set of training examples of Step 1110 (for example as described above), the second inference model obtained by Step 1110 may be a result of training a second machine learning algorithm using the set of training examples of Step 1110 (for example as described above), the updated version of the first inference model generated by Step 1130 may be a result of training the first machine learning algorithm using the updated version of the set of training examples obtained by Step 1120 (for example as described above), and updating the second inference model may comprise training the second machine learning algorithm using the updated version of the set of training examples obtained by Step 1120 (for example as described above).

In some examples, the first inference model obtained by Step 1110 may be a result of training a machine learning algorithm using the set of training examples of Step 1110 and a first hyper-parameter of the machine learning algorithm (for example as described above), the second inference model obtained by Step 1110 may be a result of training the machine learning algorithm using the set of training examples of Step 1110 and a second hyper-parameter of the machine learning algorithm (for example as described above), the updated version of the first inference model generated by Step 1130 may be a result of training the machine learning algorithm using the updated version of the set of training examples obtained by Step 1120 and the first hyper-parameter of the machine learning algorithm (for example as described above), and updating the second inference model may comprise training the machine learning algorithm using the updated version of the set of training examples obtained by Step 1120 and the second hyper-parameter of the machine learning algorithm (for example as described above).

In some examples, the first inference model obtained by Step 1110 may be used by a first personalized device, and the second inference model obtained by Step 1110 may be used by a second personalized device. Further, in some examples, in response to a first evaluation result (for example, a positive evaluation result, an evaluation result above a selected threshold, an evaluation result within a selected range, etc.), the second personalized device may be caused to use an updated version of the second inference model (for example as described below), and in response to a second evaluation result (for example, a negative evaluation result, an evaluation result below a selected threshold, an evaluation result within a selected range, etc.), causing the second personalized device to use the updated version of the second inference model may be withheld and/or forwent.

In some examples, the first inference model obtained by Step 1110 may be used by a first personalized device, the second inference model obtained by Step 1110 may be used by a second personalized device. Further, in some examples, the first personalized device may be caused to use the updated version of the first inference model generated by Step 1130 (for example as described below). Further, in some examples, results of the usage of the updated version of the first inference model by the first personalized device may be received (for example from the first personalized device, from a third device, through a communication network using a communication device, through digital memory, and so forth). Further, in some examples, in Step 1140 the received results of the usage of the updated version of the first inference model by the first personalized device may be used to evaluate the updated version of the first inference model and obtain the evaluation result, for example as described above.

In some examples, the first inference model and the second inference model obtained by Step 1110 may be used by a first personalized device. Further, in some examples, a second personalized device may be caused to use the updated version of the first inference model generated by Step 1130 and/or an updated version of the second inference model, for example as described below. In some examples, the updated version of the set of training examples obtained by Step 1120 may include training examples that are compatible with the second personalized device, and as a result the updated version of the first inference model generated by Step 1130 and/or an updated version of the second inference model may be compatible with the second personalized device. For example, examples that are compatible with the second personalized device may be selected by Step 1120 of the first version of the set of training examples of Step 1110, and the updated version of the set of training examples may include the selected examples. In another example, examples that are compatible with the second personalized device may be added to the first version of the set of training examples of Step 1110 by Step 1120 to generate the updated version of the set of training examples. In yet another example, examples that are incompatible with the second personalized device may be removed from the first version of the set of training examples of Step 1110 by Step 1120 to generate the updated version of the set of training examples. In an additional example, one or more examples of the first version of the set of training examples of Step 1110 may be transformed by Step 1120 to be more compatible with the second personalized device, and the updated version of the set of training examples may include the transformed training examples. In some examples, the first personalized device may include a first set of sensors and the second personalized device may include a second set of sensors, examples in the first version of the set of training examples of Step 1110 may be compatible with the first set of sensors, and examples in the updated version of the set of training examples may be selected and/or transformed to be compatible with the second set of sensors. For example, the first set of sensors may include sensors of a first type and the second set of sensors may include sensors of a second type different from the first type (for example, the first type may be an image sensor and the second type may include an audio sensor, the first type may be an 2D image sensor and the second type may be a 3D image sensor, and so forth). In another example, the first set of sensors and the second set of sensors may include sensors of the same type but with different configurations (for example, different capturing parameters). In yet another example, the first set of sensors and the second set of sensors may include sensors of the same type with similar configurations that are positioned in different environments and/or different locations within the same environment and/or in different directions.

In some embodiments, causing a personalized device (such as the first personalized device mentioned above, the second personalized device mentioned above, etc.) to use an inference model (such as the updated version of the first inference model generated by Step 1130, the updated version of the second inference model mentioned above, and so forth) may comprise providing information configured to cause the personalized device to use the inference model. For example, such provided information may comprise an indication of the inference model, may comprise an indication of one or more properties of the inference model, may comprise information related to the inference model, may comprise at least a part of the inference model, may comprise an indication of a time to use the inference model at, may comprise an indication of a location to use the inference model at, may comprise an indication of a context to use the inference model at, and so forth. For example, the provided information may be stored in memory (for example in memory unit 210, in shared memory module 410, etc.) for the personalized device to access it, posted on a blockchain for the personalized device to access it, transmitted through a communication network (such as communication network 130) using a communication device (such as communication module 230) to the personalized device, provided to an external device (such as mobile phone 111, tablet 112, PC 113, remote storage 140, NAS 150, server 300, cloud platform 400, etc.) for the personalized device to access it through the external devices, and so forth.

In some examples, the first inference model obtained by Step 1110 may be used to analyze a plurality of inputs and produce a first plurality of outputs corresponding to the inputs. Further, in some examples, the updated version of the first inference model generated by Step 1130 may be used to analyze the plurality of inputs and produce a second plurality of outputs corresponding to the inputs. Further, in some examples, in Step 1140 the first plurality of outputs produced using the first inference model and/or the second plurality of outputs produced using the updated version of the first inference model may be used to evaluate the updated version of the first inference model and obtain the evaluation result. For example, the first plurality of outputs produced using the first inference model may be compared with the second plurality of outputs produced using the updated version of the first inference model, and the evaluation of the updated version of the first inference model by Step 1140 may be based on a result of the comparison. In another example, the plurality of inputs may be associated with corresponding desired outputs, the first plurality of outputs produced using the first inference model may be compared with the corresponding desired outputs to obtain an intermediate evaluation result of the first inference model, the second plurality of outputs produced using the updated version of the first inference model may be compared with the corresponding desired outputs to obtain an intermediate evaluation result of the updated version of the first inference model, and the evaluation result may be based on the comparison of the intermediate evaluation result of the first inference model and the intermediate evaluation result of the updated version of the first inference model. Some examples of such intermediate evaluation results may include a function of one or more of the numbers and/or ratios of false positives and/or false negatives and/or true positives and/or true negatives, accuracy, precision, F score, confusion matrix, other statistics about classification errors, sum of absolute errors, sum of square errors, other statistics about regression errors, and so forth. In some examples, a first evaluation may be assigned to an updated version of the first inference model in response to a first comparison result, and a second evaluation may be assigned to the updated version of the first inference model in response to a second comparison result, where the first evaluation may be better than the second evaluation.

In some examples, the updated version of the first inference model generated by Step 1130 may be used to analyze a plurality of inputs and produce a plurality of outputs corresponding to the inputs. Further, in some examples, information based on the plurality of outputs may be provided to at least one user. Further, in some examples, one or more feedbacks related to the information based on the plurality of outputs and provided to the at least one user may be received from the at least one user. Further, in some examples, the one or more feedbacks related to the information based on the plurality of outputs may be used to evaluate the updated version of the first inference model and obtain the evaluation result. For example, the inputs may comprise images, the corresponding outputs may comprise segmentation results of the images, the images and the resulting segments may be presented to the at least one user, the feedbacks may include an indication of the correctness of the segmentation, and the evaluation result may be based on the indication of the correctness of the segmentation. In another example, the inputs may comprise images, the corresponding outputs may comprise classification of objects depicted in the images, the images and the produced classifications may be presented to the at least one user, the feedbacks may include an indication of the correctness of the produced classifications, and the evaluation result may be based on the indication of the correctness of the produced classifications. In yet another example, the inputs may comprise images, the corresponding outputs may comprise localization of objects in the images, the images and the estimated locations may be presented to the at least one user, the feedbacks may include an indication of the correctness of the estimated locations, and the evaluation result may be based on the indication of the correctness of the estimated locations. In an additional example, the inputs may comprise audio segments, the corresponding outputs may comprise identification of speakers in the audio segments, the audio segments and/or the identification of speakers may be presented to the at least one user, the feedbacks may include an indication of the correctness of the identification of speakers, and the evaluation result may be based on the indication of the correctness of the identification of speakers. In yet another example, the inputs may comprise textual information, the corresponding outputs may comprise estimated properties of the textual information, the textual information and/or the estimated properties of the textual information may be presented to the at least one user, the feedbacks may include an indication of the correctness of the estimated properties of the textual information, and the evaluation result may be based on the indication of the correctness of the estimated properties of the textual information.

In some examples, the first inference model obtained by Step 1110 may be configured to analyze visual data (for example visual data captured from an environment), and the second inference model obtained by Step 1110 may be configured to analyze audio data (for example audio data captured in conjunction with the visual data). For example, training examples of the first version of a set of training examples of Step 1110 and/or of the updated version of the set of training examples of Step 1120 may comprise video data comprising both image frames and corresponding audio (for example video data captured from an environment), the first inference model obtained by Step 1110 and/or the updated version of the first inference model generated by Step 1130 may be trained using at least part of the image frames and configured to analyze images, and the second inference model obtained by Step 1110 and/or an updated version of the second inference model may be trained using at least part of the audio data and configured to analyze audio. In another example, training examples of the first version of a set of training examples of Step 1110 and/or of the updated version of the set of training examples of Step 1120 may comprise image data and corresponding audio data related to the image data (for example, audio data captured in conjunction with the image data, audio data comprising a description of the image data, and so forth), the first inference model obtained by Step 1110 and/or the updated version of the first inference model generated by Step 1130 may be trained using at least part of the image data and configured to analyze images, and the second inference model obtained by Step 1110 and/or an updated version of the second inference model may be trained using at least part of the audio data and configured to analyze audio.

In some examples, the first inference model obtained by Step 1110 may be configured to analyze audio data (for example audio data captured from an environment), and the second inference model obtained by Step 1110 may be configured to analyze visual data (for example visual data captured in conjunction with the audio data). For example, training examples of the first version of a set of training examples of Step 1110 and/or of the updated version of the set of training examples of Step 1120 may comprise video data comprising both image frames and corresponding audio (for example video data captured from an environment), the second inference model obtained by Step 1110 and/or an updated version of the second inference model may be trained using at least part of the image frames and configured to analyze images, and the first inference model obtained by Step 1110 and/or the updated version of the first inference model generated by Step 1130 may be trained using at least part of the audio data and configured to analyze audio. In another example, training examples of the first version of a set of training examples of Step 1110 and/or of the updated version of the set of training examples of Step 1120 may comprise image data and corresponding audio data related to the image data (for example, audio data captured in conjunction with the image data, audio data comprising a description of the image data, and so forth), the second inference model obtained by Step 1110 and/or an updated version of the second inference model may be trained using at least part of the image data and configured to analyze images, and the first inference model obtained by Step 1110 and/or the updated version of the first inference model generated by Step 1130 may be trained using at least part of the audio data and configured to analyze audio.

In some examples, the first inference model obtained by Step 1110 may be configured to analyze audio data (for example audio data captured from an environment), and the second inference model obtained by Step 1110 may be configured to analyze textual information associated with the audio data. For example, the audio data may be analyzed by the first inference model to generate the textual information (for example, transcribed, summarized, analyzed to identify keywords, and so forth), and the second inference model may analyze the textual information to generate additional information (for example, the second inference model may include natural language processing model, may analyze the textual information to identify topics, may analyze the textual information to identify conversations, may analyze the textual information to identify sentiment, and so forth). In another example, the textual information may include contextual information related to the audio data (such as names of speakers, name of location in which the audio data was captured, agenda and/or a written summary of a meeting that the audio captured from, and so forth), the first inference model may be used to analyze the audio data to obtain first information (such as sentiment, speech prosody, loudness, etc.), the second inference model may be used to analyze the textual information to obtain context (name of speaker, location, topic, etc.), and in some examples the first information and the context may be analyzed to identify inter-correlations.

In some examples, the first inference model obtained by Step 1110 may be configured to analyze textual information associated with audio data, and the second inference model obtained by Step 1110 may be configured to analyze the associated audio data. For example, the audio data may be analyzed by the second inference model to generate the textual information (for example, transcribed, summarized, analyzed to identify keywords, and so forth), and the first inference model may analyze the textual information to generate additional information (for example, the first inference model may include natural language processing model, may analyze the textual information to identify topics, may analyze the textual information to identify conversations, may analyze the textual information to identify sentiment, and so forth). In another example, the textual information may include contextual information related to the audio data (such as names of speakers, name of location in which the audio data was captured, agenda and/or a written summary of a meeting that the audio captured from, and so forth), the first inference model may be used to analyze the textual information to obtain context (name of speaker, location, topic, etc.), the second inference model may be used to analyze the audio data to obtain first information (such as sentiment, speech prosody, loudness, etc.), and in some examples the first information and the context may be analyzed to identify inter-correlations.

In some examples, the first inference model obtained by Step 1110 may be configured to analyze image data (for example image data captured from an environment), and the second inference model obtained by Step 1110 may be configured to analyze textual information (for example textual information associated with the image data). For example, the image data may be analyzed by the first inference model to generate the textual information (for example, extracting text depicted in the image data, textually describing objects detected in the image data, textually describing a scene depicted in the image data, and so forth), and the second inference model may analyze the generated textual information to generate additional information (for example, the second inference model may include natural language processing model, may analyze the textual information to identify contextual information, and so forth). In another example, the textual information may include contextual information related to the image data (such as names of objects depicted in the image data, name of a location depicted in the image data, name of a person that captured the image data, agenda and/or a written summary of a meeting depicted in the image data, and so forth), the first inference model may be used to analyze the image data to obtain first information (such as text depicted in the image data, textual description of the image data, etc.), the second inference model may be used to analyze the textual information to obtain context, and in some examples the first information and the context may be analyzed to identify inter-correlations.

In some examples, the first inference model obtained by Step 1110 may be configured to analyze textual information (for example textual information associated with image data), and the second inference model obtained by Step 1110 may be configured to analyze image data (for example image data associated with the textual information). For example, the image data may be analyzed by the second inference model to generate the textual information (for example, extracting text depicted in the image data, textually describing objects detected in the image data, textually describing a scene depicted in the image data, and so forth), and the first inference model may analyze the generated textual information to generate additional information (for example, the second inference model may include natural language processing model, may analyze the textual information to identify contextual information, and so forth). In another example, the textual information may include contextual information related to the image data (such as names of objects depicted in the image data, name of a location depicted in the image data, name of a person that captured the image data, agenda and/or a written summary of a meeting depicted in the image data, and so forth), the second inference model may be used to analyze the image data to obtain first information (such as text depicted in the image data, textual description of the image data, etc.), the first inference model may be used to analyze the textual information to obtain context, and in some examples the first information and the context may be analyzed to identify inter-correlations.

In some examples, the first inference model obtained by Step 1110 may be configured to detect a first type of items in image data captured from an environment, and the second inference model obtained by Step 1110 may be configured to determine properties of the detected items by analyzing the image data. For example, the first type of items may include faces, the first inference model may include a face detector, and the second inference model may be configured to estimate properties of the detected faces, such as age, gender, hair color, and so forth. In another example, the first type of items may include objects of selected types, the first inference model may include an object detector, and the second inference model may be configured to estimate properties of the detected objects, such as size, volume, color, and so forth.

Figure 12:
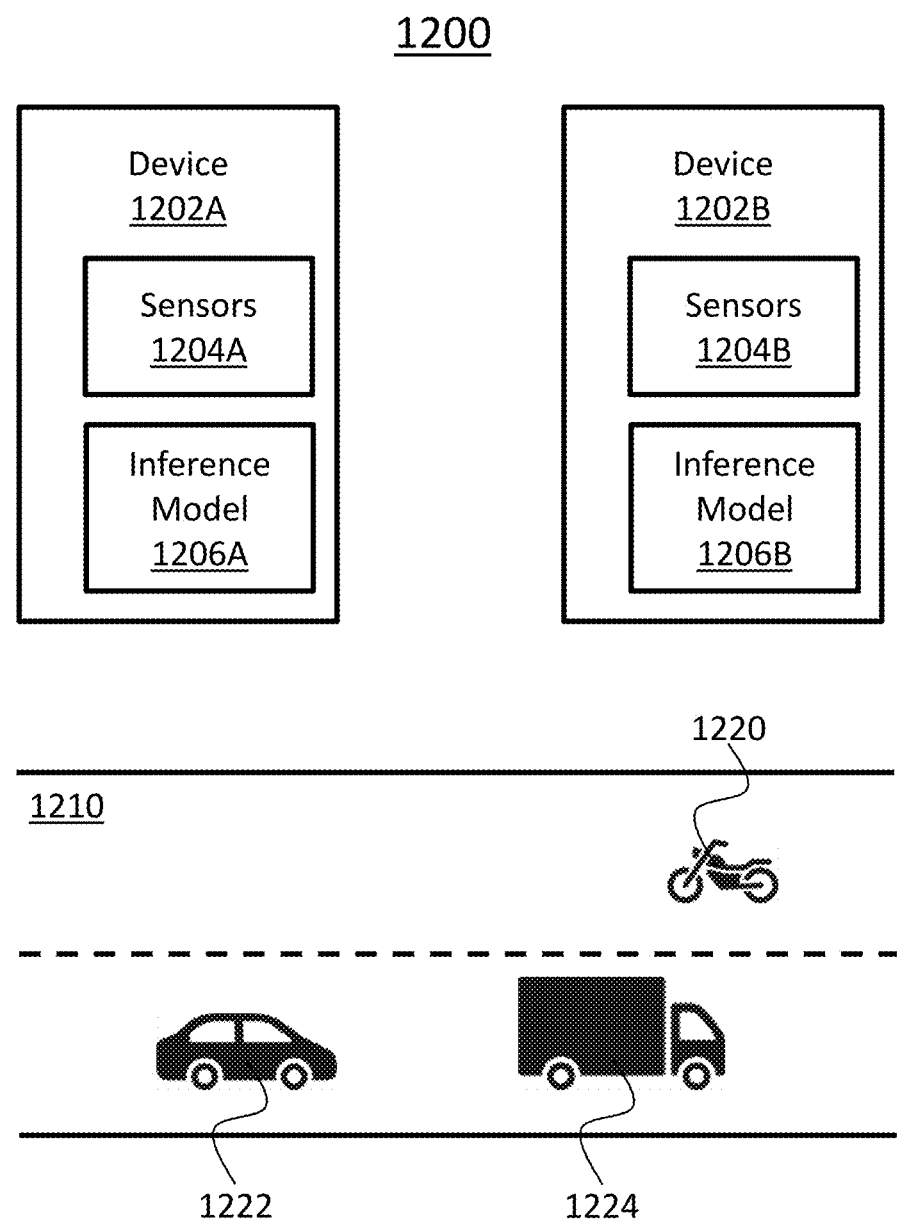
FIG. 12 is a schematic illustration of example an environment consistent with an embodiment of the present disclosure.

FIG. 12 is a schematic illustration of example an environment 1200 consistent with an embodiment of the present disclosure. In this example, environment 1200 may comprise device 1202A and device 1202B. Further, in this example, device 1202A may comprise at least sensors 1204A and inference models 1206A, and device 1202B may comprise at least sensors 1204B and inference models 1206B. Some examples of such devices may include personalized devices (such as smartphone, tablets, PCs, etc.), computing devices (such as apparatus 200, server 300, cloud platform 400, etc.), and so forth. Some examples of sensors 1204A and 1204B may include any of the sensors described in the present disclosure. Some examples of inference models 1206A and 1206B may include any of the inference models described in the present disclosure. In this example, environment 1200 may further comprise road 1210 and vehicles 1220, 1222 and 1224. In some examples, device 1202A may use inference models 1206A to analyze data captured using sensors 1204A, and device 1202B may use inference models 1206B to analyze data captured using sensors 1204B. In some examples, both device 1202A and device 1202B may use their sensors to capture data from the same portion of environment 1200 and use their inference models to analyze the captured data and monitor the same portion of environment 1200. For example, both devices may monitor the same vehicle, such as vehicle 1222. In some examples, device 1202A may use sensors 1204A to capture data from a portion of environment 1200 that is not monitored by sensors 1204B and/or may use inference models 1206A to analyze data captured from a portion of environment 1200 that is not monitored by inference models 1206B. For example, device 1202A may monitor vehicle 1224 that is not monitored by device 1202B. In some examples, method 1100 may be used to selectively update inference models 1206A and/or inference models 1206B. For example, the first inference model and the second inference model of Step 1110 may be included in inference models 1206A, the updated version of the set of training examples of Step 1120 may include training examples compatible with sensors 1204B, in Step 1130 an updated version of the first inference model may be generated based on the updated version of the set of training examples, the updated version of the first inference model may be included in inference models 1206B and/or used to analyze data captured by sensors 1204B, the updated version of the first inference model may be evaluated by Step 1140, and in Step 1150 the evaluation result may be used to determine whether to update the second inference model and/or whether to include the updated version of the second inference model in inference models 1206B and/or whether to use the updated version of the second inference model to analyze data captured by sensors 1204B. In another example, the first inference model of Step 1110 may be included in inference models 1206A and the second inference model of Step 1110 may be included in inference models 1206B, in Step 1130 an updated version of the first inference model may be generated based on the updated version of the set of training examples, the updated version of the first inference model may be included in inference models 1206A and/or used to analyze data captured by sensors 1204A, the updated version of the first inference model may be evaluated by Step 1140, and in Step 1150 the evaluation result may be used to determine whether to update the second inference model and/or whether to include the updated version of the second inference model in inference models 1206B and/or whether to use the updated version of the second inference model to analyze data captured by sensors 1204B. In yet another example, the first inference model and the second inference model of Step 1110 may be included in inference models 1206A, in Step 1130 an updated version of the first inference model may be generated based on the updated version of the set of training examples, the updated version of the first inference model may be included in inference models 1206A and/or used to analyze data captured by sensors 1204A, the updated version of the first inference model may be evaluated by Step 1140, and in Step 1150 the evaluation result may be used to determine whether to update the second inference model and/or whether to include the updated version of the second inference model in inference models 1206A and/or whether to use the updated version of the second inference model to analyze data captured by sensors 1204A.

Figure 13:
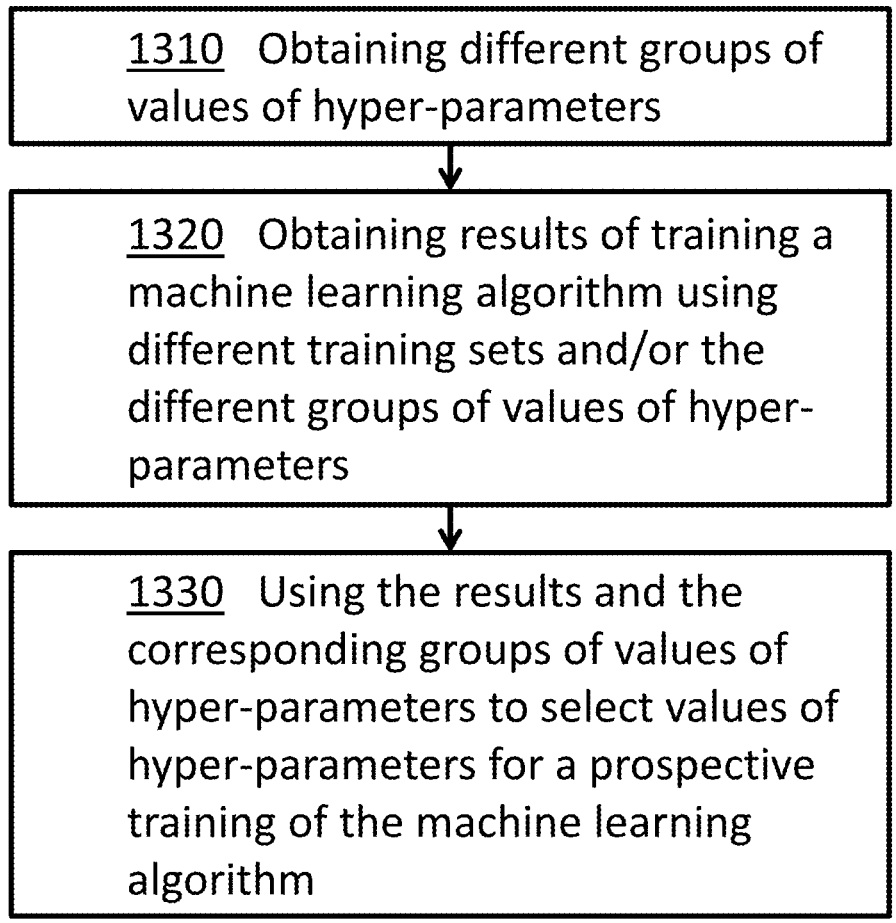
FIG. 13 illustrates an example of a method for selecting hyper parameters for machine learning algorithms based on past training results.

FIG. 13 illustrates an example of a method 1300 for selecting hyper parameters for machine learning algorithms based on past training results. In this example, method 1300 may comprise: obtaining different groups of values of hyper-parameters (Step 1310); obtaining results of training a machine learning algorithm using different training sets and/or the different groups of values of hyper-parameters (Step 1320); and using the results and the corresponding groups of values of hyper-parameters to select values of hyper-parameters for a prospective training of the machine learning algorithm (Step 1330). In some implementations, method 1300 may comprise one or more additional steps, while some of the steps listed above may be modified or excluded. In some implementations, one or more steps illustrated in FIG. 13 may be executed in a different order and/or one or more groups of steps may be executed simultaneously and/or a plurality of steps may be combined into single step and/or a single step may be broken down to a plurality of steps.

In some embodiments, in Step 1310 different groups of values of hyper parameters of a machine learning algorithm may be obtained. For example, in Step 1310 a first group of values of hyper parameters, a second group of values of hyper parameters and a third group of values of hyper parameters may be obtained, where the second group of values of hyper parameters may be identical to or different from the first group of values of hyper parameters, and the third group of values of hyper parameters may be identical to or different from the first group of values of hyper parameters and the second group of values of hyper parameters. For example, at least part of the groups of values of hyper parameters may be may be read from memory (for example from memory unit 210, shared memory module 410, etc.), read from a blockchain, received through a communication network (such as communication network 130) using a communication device (such as communication module 230), received from an external device (such as mobile phone 111, tablet 112, PC 113, remote storage 140, NAS 150, server 300, cloud platform 400, etc.), generated (for example using another instance of method 1300), selected (for example of a plurality of alternative groups of values of hyper parameters), and so forth. Some examples of such hyper parameters may include optimization criterion, optimization method, hyper parameters of the optimization method, stopping condition, initial guess, and so forth. In one example, the machine learning algorithm may include an artificial neural network (such as a deep neural network, a convolutional neural network, a recursive neural network, etc.) and some examples of such hyper parameters may include type of artificial neural network, number of layers, types of layers, number of artificial neurons (for example, in a layer), types of artificial neurons, types of activation functions, hyper parameters of activation functions, learning rate, learning rate update method, hyper parameters of learning rate update method, batch size, initialization method, hyper parameters of the initialization method, dropout rate, and so forth. In another example, the machine learning algorithm may include a random forest, and some additional examples of hyper parameters may include maximal depth, number of trees, hyper parameters for controlling splits, and so forth. In yet another example, the machine learning algorithm may include a support vector machine, and some additional examples of hyper parameters may include penalty parameter, kernel type, hyper parameters of the kernel, and so forth. In an additional example, the machine learning algorithm may include a classification algorithm, and some additional examples of hyper parameters may include number of classes, selection of classes of a plurality of alternative classes, weights for classes, weights for training examples, normalization method, and so forth. In yet another example, the machine learning algorithm may include a regression algorithm, and some additional examples of hyper parameters may include error function, hyper parameters of the error function, and so forth. In an additional example, the machine learning algorithm may include a clustering algorithm (and/or a segmentation algorithm), and some additional examples of hyper parameters may include number of desired clusters (and/or number of desired segments), minimal cluster size (and/or minimal segment size), maximal cluster size (and/or maximal segment size), and so forth. In yet another example, the machine learning algorithm may include an ensemble algorithm, and some additional examples of hyper parameters may include number of base models, hyper parameters for one or more of the base models, and so forth.

In some embodiments, in Step 1320 results of training a machine learning algorithm using one or more pluralities of training examples and one or more groups of values of hyper parameters may be obtained. In some examples, in Step 1320 results of training the machine learning algorithm using a plurality of training examples and the different groups of values of hyper parameters obtained by Step 1310 may be obtained. In some example, in Step 1320 results of training the machine learning algorithm using different pluralities of training examples and a group of values of hyper parameters may be obtained. For example, in Step 1320 a first result of training the machine learning algorithm using a first plurality of training examples and the first group of values of hyper parameters obtained by Step 1310 may be obtained, a second result of training the machine learning algorithm using a second plurality of training examples and the second group of values of hyper parameters obtained by Step 1310 may be obtained, a third result of training the machine learning algorithm using a third plurality of training examples and the third group of values of hyper parameters obtained by Step 1310 may be obtained, and so forth. In another example, in Step 1320 a first result of training the machine learning algorithm using a first plurality of training examples and the first group of values of hyper parameters obtained by Step 1310 may be obtained, a second result of training the machine learning algorithm using the first plurality of training examples and the second group of values of hyper parameters obtained by Step 1310 may be obtained, a third result of training the machine learning algorithm using the first plurality of training examples and the third group of values of hyper parameters obtained by Step 1310 may be obtained, and so forth. For example, in Step 1320 the results of training a machine learning algorithm using the one or more pluralities of training examples and/or the one or more groups of values of hyper parameters may be read from memory (for example from memory unit 210, shared memory module 410, etc.), read from a blockchain, received through a communication network (such as communication network 130) using a communication device (such as communication module 230), received from an external device (such as mobile phone 111, tablet 112, PC 113, remote storage 140, NAS 150, server 300, cloud platform 400, etc.), generated (for example by training the machine learning algorithm using the one or more pluralities of training examples and/or the one or more groups of values of hyper parameters as described above, by using an inference model generated by training the machine learning algorithm using the one or more pluralities of training examples and/or the one or more groups of values of hyper parameters as described above to generate outputs corresponding to example inputs, by generating statistics using these outputs, etc.), selected (for example using a data structure holding a plurality of alternative results corresponding to one or more pluralities of training examples and/or to one or more groups of values of hyper parameters), and so forth. For example, the results of training a machine learning algorithm using the one or more pluralities of training examples and/or the one or more groups of values of hyper parameters may comprise an inference model that is a result of training the machine learning algorithm, such as a predictive model, a classification model, a regression model, a clustering model, a segmentation model, an artificial neural network (such as a deep neural network, a convolutional neural network, a recursive neural network, etc.), a random forest, a support vector machine, and so forth. In another example, the results of training a machine learning algorithm using the one or more pluralities of training examples and/or the one or more groups of values of hyper parameters may comprise outputs generated using example inputs and such inference model. In yet another example, the results of training a machine learning algorithm using the one or more pluralities of training examples and/or the one or more groups of values of hyper parameters may comprise information about a comparison of such outputs with desired outputs, such as numbers and/or ratios of false positives and/or false negatives and/or true positives and/or true negatives, accuracy, precision, F score, confusion matrix, other statistics about classification errors, sum of absolute errors, sum of square errors, other statistics about regression errors, intersection over union scores, segmentation error scores, clustering error scores, and so forth.

In some embodiments, in Step 1330 the results obtained by Step 1320 and/or the corresponding groups of values of hyper parameters obtained by Step 1310 may be used to select at least one value of a hyper parameter for a prospective training of a machine learning algorithm (for example, for a prospective training of the machine learning algorithm of Step 1320, for a prospective training of a different machine learning algorithm, and so forth). For example, in Step 1330 the first result, the second result and the third result obtained by Step 1320, and the first group of values of hyper parameters, the second group of values of hyper parameters and the third group of values of hyper parameters obtained by Step 1310 may be used to select at least one value of a hyper parameter for a prospective training of the machine learning algorithm. For example, a machine learning model may be trained using training examples to select hyper parameters for prospective trainings of machine learning algorithms based on results of training machine learning algorithms and corresponding groups of values of hyper parameters, and the trained machine learning algorithm may be used to analyze the results obtained by Step 1320 and the corresponding groups of values of hyper parameters obtained by Step 1310 to select the at least one value of the hyper parameter for the prospective training of a machine learning algorithm. Such training example may include a plurality of results of training machine learning algorithms with the corresponding groups of values of hyper parameters, together with a desired selection of at least one value of the hyper parameter for the prospective training of the machine learning algorithm. In another example, an artificial neural network may be configured to select hyper parameters for prospective trainings of machine learning algorithms based on results of training machine learning algorithms and corresponding groups of values of hyper parameters, and the artificial neural network may be used to analyze the results obtained by Step 1320 and the corresponding groups of values of hyper parameters obtained by Step 1310 to select the at least one value of the hyper parameter for the prospective training of a machine learning algorithm. In yet another example, a weight may be assigned to groups of values of hyper parameters obtained by Step 1310 according to results obtained by Step 1320, a weighted average of the values of hyper parameters may be calculated using the assigned weights, and the selection of the at least one value of the hyper parameter for the prospective training of a machine learning algorithm may be based on the calculated weighted average. In an additional example, a weight may be assigned to groups of values of hyper parameters obtained by Step 1310 according to results obtained by Step 1320, weighted voting among the values of hyper parameters may be calculated using the assigned weights, and the at least one value of the hyper parameter for the prospective training of a machine learning algorithm may be selected to be similar or identical to the values of hyper parameters selected through voting. For example, the higher weights may be assigned to values of hyper parameters corresponding to better results, higher weights may be assigned to values of hyper parameters corresponding to lesser results, and so forth.

In some examples, the first group of values of hyper parameters obtained by Step 1310 may comprise a first learning rate value, the second group of values of hyper parameters obtained by Step 1310 may comprise a second learning rate value, the third group of values of hyper parameters obtained by Step 1310 may comprise a third learning rate value. Further, in some examples, in Step 1330 the first result, the second result and the third result obtained by Step 1320, and the first learning rate value, the second learning rate value and the third learning rate value obtained by Step 1310 may be used to select a learning rate value for the prospective training of the machine learning algorithm, for example as described above using a trained machine learning model, using an artificial neural network, using weighted average of the learning rate values, using weighted voting of the learning rate values, and so forth.

In some examples, the first group of values of hyper parameters obtained by Step 1310 may comprise a first selection of a learning rate update method, the second group of values of hyper parameters obtained by Step 1310 may comprise a second selection of a learning rate update method, the third group of values of hyper parameters obtained by Step 1310 may comprise a third selection of a learning rate update method. Further, in some examples, in Step 1330 the first result, the second result and the third result obtained by Step 1320, and the first selection of a learning rate update method, the second selection of a learning rate update method and the third selection of a learning rate update method obtained by Step 1310 may be used to select a learning rate update method for the prospective training of the machine learning algorithm, for example as described above using a trained machine learning model, using an artificial neural network, using weighted voting of the learning rate update methods, and so forth.

In some examples, the first group of values of hyper parameters obtained by Step 1310 may comprise a first batch size, the second group of values of hyper parameters obtained by Step 1310 may comprise a second batch size, the third group of values of hyper parameters obtained by Step 1310 may comprise a third batch size. Further, in some examples, in Step 1330 the first result, the second result and the third result obtained by Step 1320, and the first batch size, the second batch size and the third batch size obtained by Step 1310 may be used to select a batch size for the prospective training of the machine learning algorithm, for example as described above using a trained machine learning model, using an artificial neural network, using weighted average of the batch sizes, using weighted voting of the batch sizes, and so forth.

In some examples, the first group of values of hyper parameters obtained by Step 1310 may comprise a first network structure, the second group of values of hyper parameters obtained by Step 1310 may comprise a second network structure, the third group of values of hyper parameters obtained by Step 1310 may comprise a third network structure. Further, in some examples, in Step 1330 the first result, the second result and the third result obtained by Step 1320, and the first network structure, the second network structure and the third network structure obtained by Step 1310 may be used to select a network structure for the prospective training of the machine learning algorithm, for example as described above using a trained machine learning model, using an artificial neural network, using weighted voting of the network structure, and so forth.

In some examples, the first group of values of hyper parameters obtained by Step 1310 may comprise a first number of layers, the second group of values of hyper parameters obtained by Step 1310 may comprise a second number of layers, the third group of values of hyper parameters obtained by Step 1310 may comprise a third number of layers. Further, in some examples, in Step 1330 the first result, the second result and the third result obtained by Step 1320, and the first number of layers, the second number of layers and the third number of layers obtained by Step 1310 may be used to select a number of layers for the prospective training of the machine learning algorithm, for example as described above using a trained machine learning model, using an artificial neural network, using weighted average of the numbers of layers, using weighted voting of the numbers of layers, and so forth.

In some examples, the first group of values of hyper parameters obtained by Step 1310 may comprise a first number of artificial neurons, the second group of values of hyper parameters obtained by Step 1310 may comprise a second number of artificial neurons, the third group of values of hyper parameters obtained by Step 1310 may comprise a third number of artificial neurons. Further, in some examples, in Step 1330 the first result, the second result and the third result obtained by Step 1320, and the first number of artificial neurons, the second number of artificial neurons and the third number of artificial neurons obtained by Step 1310 may be used to select a number of artificial neurons for the prospective training of the machine learning algorithm, for example as described above using a trained machine learning model, using an artificial neural network, using weighted average of the numbers of artificial neurons, using weighted voting of the numbers of artificial neurons, and so forth.

In some examples, the first group of values of hyper parameters obtained by Step 1310 may comprise a first selection of an activation function, the second group of values of hyper parameters obtained by Step 1310 may comprise a second selection of an activation function, the third group of values of hyper parameters obtained by Step 1310 may comprise a third selection of an activation function. Further, in some examples, in Step 1330 the first result, the second result and the third result obtained by Step 1320, and the first selection of an activation function, the second selection of an activation function and the third selection of an activation function obtained by Step 1310 may be used to select an activation function for the prospective training of the machine learning algorithm, for example as described above using a trained machine learning model, using an artificial neural network, using weighted voting of the activation functions, and so forth.

In some examples, the first group of values of hyper parameters obtained by Step 1310 may comprise a first selection of a loss function, the second group of values of hyper parameters obtained by Step 1310 may comprise a second selection of a loss function, the third group of values of hyper parameters obtained by Step 1310 may comprise a third selection of a loss function. Further, in some examples, in Step 1330 the first result, the second result and the third result obtained by Step 1320, and the first selection of a loss function, the second selection of a loss function and the third selection of a loss function obtained by Step 1310 may be used to select a loss function for the prospective training of the machine learning algorithm, for example as described above using a trained machine learning model, using an artificial neural network, using weighted voting of the loss functions, and so forth.

In some examples, the first group of values of hyper parameters obtained by Step 1310 may comprise a first selection of an initialization method, the second group of values of hyper parameters obtained by Step 1310 may comprise a second selection of an initialization method, the third group of values of hyper parameters obtained by Step 1310 may comprise a third selection of an initialization method. Further, in some examples, in Step 1330 the first result, the second result and the third result obtained by Step 1320, and the first selection of an initialization method, the second selection of an initialization method and the third selection of an initialization method obtained by Step 1310 may be used to select an initialization method for the prospective training of the machine learning algorithm, for example as described above using a trained machine learning model, using an artificial neural network, using weighted voting of the initialization methods, and so forth.

In some examples, the first group of values of hyper parameters obtained by Step 1310 may comprise a first selection of a kernel function, the second group of values of hyper parameters obtained by Step 1310 may comprise a second selection of a kernel function, the third group of values of hyper parameters obtained by Step 1310 may comprise a third selection of a kernel function. Further, in some examples, in Step 1330 the first result, the second result and the third result obtained by Step 1320, and the first selection of a kernel function, the second selection of a kernel function and the third selection of a kernel function obtained by Step 1310 may be used to select a kernel function for the prospective training of the machine learning algorithm, for example as described above using a trained machine learning model, using an artificial neural network, using weighted voting of the kernel functions, and so forth. In some examples, the first selection of a kernel function may include a selection of a polynomial kernel with a first degree, the second selection of a kernel function may include a selection of a polynomial kernel with a second degree (in some examples the second degree may be identical to the first degree while in other examples the second degree may be different from the first degree), and the third selection of a kernel function may include a selection of a Radial Basis Function (RBF) kernel with a first free parameter. Further, in one example, in response to a first group of results obtained by Step 1320, an RBF kernel may be selected for the prospective training of the machine learning algorithm, while in response to a second group of results obtained by Step 1320, a polynomial kernel may be selected for the prospective training of the machine learning algorithm. In another example, in response to a first group of results obtained by Step 1320, a polynomial kernel with a degree closer to the first degree than to the second degree may be selected for the prospective training of the machine learning algorithm, while in response to a second group of results obtained by Step 1320, a polynomial kernel with a degree closer to the second degree than to the first degree may be selected for the prospective training of the machine learning algorithm. In yet another example, in response to a first group of results obtained by Step 1320, an RBF kernel with a free parameter identical to the first free parameter may be selected for the prospective training of the machine learning algorithm, while in response to a second group of results obtained by Step 1320, an RBF kernel with a free parameter different from the first free parameter may be selected for the prospective training of the machine learning algorithm.

In some examples, the first group of values of hyper parameters obtained by Step 1310 may comprise a first selection of a similarity function, the second group of values of hyper parameters obtained by Step 1310 may comprise a second selection of a similarity function, the third group of values of hyper parameters obtained by Step 1310 may comprise a third selection of a similarity function. Further, in some examples, in Step 1330 the first result, the second result and the third result obtained by Step 1320, and the first selection of a similarity function, the second selection of a similarity function and the third selection of a similarity function obtained by Step 1310 may be used to select a similarity function for the prospective training of the machine learning algorithm, for example as described above using a trained machine learning model, using an artificial neural network, using weighted voting of the similarity functions, and so forth.

In some examples, the first group of values of hyper parameters obtained by Step 1310 may comprise a first selection of a distance measure, the second group of values of hyper parameters obtained by Step 1310 may comprise a second selection of a distance measure, the third group of values of hyper parameters obtained by Step 1310 may comprise a third selection of a distance measure. Further, in some examples, in Step 1330 the first result, the second result and the third result obtained by Step 1320, the first selection of a distance measure, the second selection of a distance measure and the third selection of a distance measure obtained by Step 1310 may be used to select a distance measure for the prospective training of the machine learning algorithm, for example as described above using a trained machine learning model, using an artificial neural network, using weighted voting of the distance measures, and so forth.

In some examples, the first group of values of hyper parameters obtained by Step 1310 may comprise a first selection of a stopping condition, the second group of values of hyper parameters obtained by Step 1310 may comprise a second selection of a stopping condition, the third group of values of hyper parameters obtained by Step 1310 may comprise a third selection of a stopping condition. Further, in some examples, in Step 1330 the first result, the second result and the third result obtained by Step 1320, and the first selection of a stopping condition, the second selection of a stopping condition and the third selection of a stopping condition obtained by Step 1310 may be used to select a stopping condition for the prospective training of the machine learning algorithm, for example as described above using a trained machine learning model, using an artificial neural network, using weighted voting of the stopping conditions, and so forth.

In some examples, the first group of values of hyper parameters obtained by Step 1310 may comprise a first sampling criterion used to sample the first plurality of training examples from a base group of training examples, the second group of values of hyper parameters obtained by Step 1310 may comprise a second sampling criterion used to sample the second plurality of training examples from the base group of training examples, the third group of values of hyper parameters obtained by Step 1310 may comprise a third sampling criterion used to sample the third plurality of training examples from a base group of training examples. Further, in some examples, in Step 1330 the first result, the second result and the third result obtained by Step 1320, and the first sampling criterion, the second sampling criterion and the third sampling criterion obtained by Step 1310 may be used to select a sampling criterion for sampling a plurality of training examples from the base group of training examples for the prospective training of the machine learning algorithm, for example as described above using a trained machine learning model, using an artificial neural network, using weighted voting of the sampling criteria, and so forth. Some examples of such sampling criteria may include desired ratios among different types of samples (for example among examples of different classes, of samples of different properties, etc.), desired amount of different types of samples (for example of different classes, of samples of different properties, etc.), sampling selection rules, and so forth. In some examples, the first sampling criterion may specify a first set of desired ratios among the different types of samples, the second sampling criterion may specify a second set of desired ratios among the different types of samples, and the third sampling criterion may specify a third set of desired ratios among the different types of samples. Further, in one example, in response to a first group of results obtained by Step 1320, a set of desired ratios among the different types of samples closer to the first set of ratios than to the second set may be selected for the prospective training of the machine learning algorithm, while in response to a second group of results obtained by Step 1320, a set of desired ratios among the different types of samples closer to the second set of ratios than to the first set may be selected for the prospective training of the machine learning algorithm. In another example, in response to a first value of the third result obtained by Step 1320, a set of desired ratios among the different types of samples closer to the first set of ratios than to the second set may be selected for the prospective training of the machine learning algorithm, while in response to a second value of the third result obtained by Step 1320, a set of desired ratios among the different types of samples closer to the second set of ratios than to the first set may be selected for the prospective training of the machine learning algorithm.

In some embodiments, the machine learning algorithm of Step 1320 may be trained using the first plurality of training examples of Step 1320 and the first group of values of hyper parameters obtained by Step 1310 to generate a first inference model, for example as described above. Further, in some examples, the first inference model and a plurality of testing examples may be used to generate a first plurality of outputs corresponding to the testing examples. Further, in some examples, the first plurality of outputs and a plurality of desired results may be compared to determine the first result obtained by Step 1320. For example, the first result obtained by Step 1320 may be based on a function of one or more of numbers and/or ratios of false positives and/or false negatives and/or true positives and/or true negatives, accuracy, precision, F score, confusion matrix, other statistics about classification errors, sum of absolute errors, sum of square errors, other statistics about regression errors, intersection over union scores, segmentation error scores, clustering error scores, and so forth.

In some embodiments, an embedding in a mathematical space of at least a value of the first group of values of hyper parameters, a value of the second group of values of hyper parameters and a value of the third group of values of hyper parameters may be determined. For example, the embedding in the mathematical space may be determined based on the value of the first group of values of hyper parameters, the value of the second group of values of hyper parameters and the value of the third group of values of hyper parameters. In another example, the embedding in the mathematical space may be determined based on the first result, the second result and the third result obtained by Step 1320. In yet another example, the embedding in the mathematical space may be determined using Principal Component Analysis procedure. In an additional example, the embedding in the mathematical space may be determined using an artificial neural network. In yet another example, the embedding in the mathematical space may be determined using a transformation function. Further, in some examples, in Step 1330 the determined embedding of the values in the mathematical space may be used to select the at least one value of the hyper parameter for the prospective training of the machine learning algorithm. For example, each point in the mathematical space may correspond to a value of the hyper parameter, a centroid of the embedded values in the mathematical space may be calculated, and the at least one value of the hyper parameter for the prospective training of the machine learning algorithm may be selected based on the value of the hyper parameter corresponding to the centroid. In another example, the embedding of the values in the mathematical space may be analyzed to select one of the embedded values, and the group of values of hyper parameters corresponding to the selected embedded value may be selected for the prospective training of the machine learning algorithm. For example, the embedded value with the maximal distance to the nearest other embedded value may be select. In another example, the embedded value with the minimal average distance to the k nearest other embedded values may be selected.

In some examples, it may be determined whether the first result is preferable to the second result and the third result. For example, each result may correspond to a score (such as a function of one or more of number of true positives, ratio of true positives, number of true negatives, ratio of true negatives, accuracy, precision, recall, F score, confusion matrix, number of false positives, ratio of false positives, number of false negatives, ratio of false negatives, statistics about classification errors, sum of absolute errors, sum of square errors, statistics about regression errors, intersection over union scores, segmentation error scores, clustering error scores, and so forth), and the result corresponding to the higher score may be determined to be preferable. Further, in some examples, in response to the determination that the first result is preferable to the second result and the third result, the at least one value of the hyper parameter for the prospective training of the machine learning algorithm may be selected to be closer to the first group of values of hyper parameters than to the second group of values of hyper parameters and to the third group of values of hyper parameters according to the embedding in the mathematical space, and in response to the determination that the first result is not preferable to the second result and the third result, the at least one value of the hyper parameter for the prospective training of the machine learning algorithm may be selected to be farther from the first group of values of hyper parameters than from at least one of the second group of values of hyper parameters and the third group of values of hyper parameters according to the embedding in the mathematical space.

In some embodiments, the machine learning algorithm of Step 1320 may be trained using the first plurality of training examples of Step 1320 and the first group of values of hyper parameters obtained by Step 1310 to generate a first inference model, for example as described above. Further, in some examples, the first inference model and a plurality of testing examples may be used to generate a first plurality of outputs corresponding to the testing examples. Further, in some examples, information based on the first plurality of outputs may be provided to at least one user. For example, the information may be provided visually, may be provided audibly, may be provided textually, may be provided through a personalized device associated with the user, may be provided through a public device, and so forth. Further, in some examples, one or more feedbacks related to the information based on the first plurality of outputs may be received from the at least one user. Further, in some examples, the one or more feedbacks related to the information based on the first plurality of outputs may be used to determine the first result. Some examples of possible implementations of a user interface for providing information based on at least one output to a user and receiving feedbacks related to the information are provided in FIGS. 14A and 14B as described below, and the such user interface may be used repeatedly to obtain feedbacks related to information based on the first plurality of outputs. For example, in response to a first feedback related to the information based on the first plurality of outputs, a first value of the first result may be determined, and in response to a second feedback related to the information based on the first plurality of outputs, a second value of the first result may be determined.

Figure 14A:
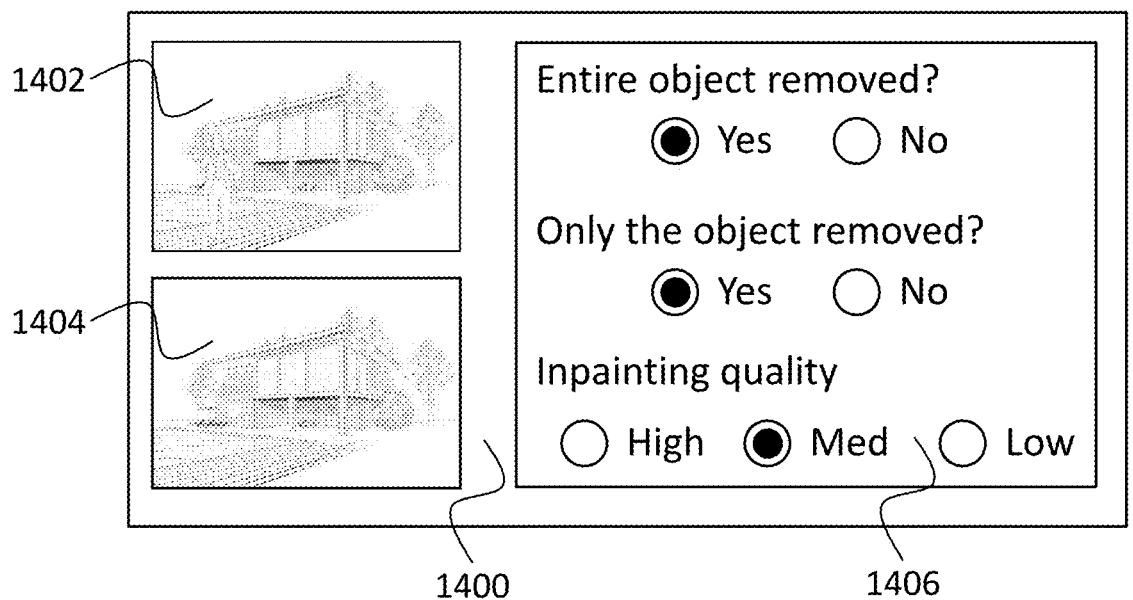
FIG. 14A is a schematic illustration of a user interface consistent with an embodiment of the present disclosure.

FIG. 14A is a schematic illustration of a user interface 1400 consistent with an embodiment of the present disclosure. In this example, user interface 1400 may comprise a presentation of input image 1402, a presentation of output image 1404, a presentation of queries 1406 to the user requesting the user to grade output image 1404. In this example, input image 1402 may comprise a depiction of a person in an environment of a yard, output image 1404 may comprise a depiction of the yard without the person generated by removing the person from image 1402 and inpainting the resulting image, for example automatically using one or more inference models. In this example, queries 1406 may request the user to indicate whether the entire object was removed, to indicate whether no parts of other objects were removed, to indicate the quality of the inpainting, and so forth.

Figure 14B:
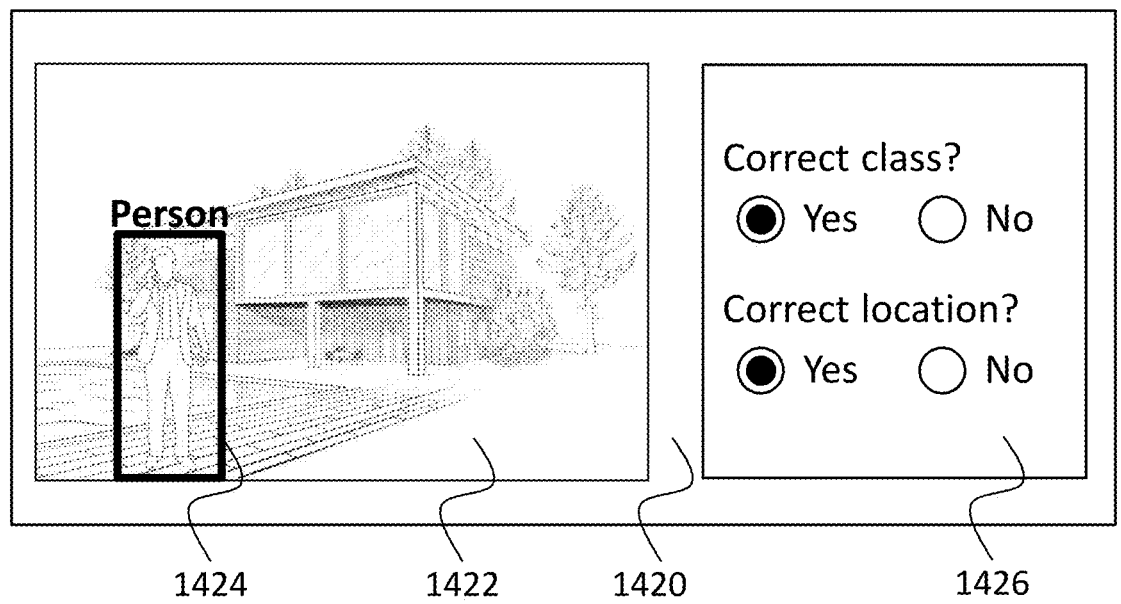
FIG. 14B is a schematic illustration of a user interface consistent with an embodiment of the present disclosure.

FIG. 14B is a schematic illustration of a user interface 1420 consistent with an embodiment of the present disclosure. In this example, user interface 1420 may comprise a presentation of input image 1422, a presentation of an overlay 1424 over input image 1422 providing output information, a presentation of queries 1426 to the user requesting the user to grade the provided output information. In this example, input image 1422 may comprise a depiction of a person in an environment of a yard, overlay 1424 may comprise a bounding box identifying a determined location of a detect item accompanied with a visual presentation of a textual description of the determined type of the detected item (in this example, "Person"), for example as determined automatically using one or more inference models. In this example, queries 1426 may request the user to indicate whether the determined class of the item is correct, to indicate whether the determined location of the item is correct, and so forth.

FIG. 15 illustrates an example of a method 1500 for class aware object marking. In this example, method 1500 may comprise: receiving an indication of a selected object type (Step 1510); presenting an image to a user (Step 1520); receiving an input to an object selection tool (Step 1530); and selecting a region of the image corresponding to an object of the selected object type in the image based on the selected object type and the input to the object selection tool (Step 1540). In some implementations, method 1500 may comprise one or more additional steps, while some of the steps listed above may be modified or excluded. For example, in some cases Step 1520 may be excluded from method 1500. In some implementations, one or more steps illustrated in FIG. 15 may be executed in a different order and/or one or more groups of steps may be executed simultaneously and/or a plurality of steps may be combined into single step and/or a single step may be broken down to a plurality of steps.

In some embodiments, in Step 1510 an indication of a selected object type of a plurality of alternative object types may be received. Some non-limiting examples of such object types may include object together with adjunct related objects, object without adjunct related objects, object together with occluded parts, object without occluded parts, single instance of an object of a specified type, one or more instances of objects of a specified type, person, person together with objects held by the person, person not including objects held by the person, person including occluded parts, person except for occluded parts, male, female, face, face including occluded parts, face excluding occluded parts, face including hair, face excluding hair, vehicle, specific types of vehicles (such as motorcycles, cars, trucks, bicycles, etc.), vehicle with occluded parts, vehicle without occluded parts, motorcycles including their rider, motorcycles not including their riders, and so forth. In some examples, the plurality of alternative object types may be presented to the user, and in Step 1510 the indication of the selected object type of the plurality of alternative object types may be received from the user. In some examples, the image may be analyzed to select the selected object type of the plurality of alternative object types. For example, a machine learning model may be trained using training examples to select object types based on images and/or videos, and the trained machine learning model may be used to analyze the image and select the selected object type. Some examples of such training example may include an image together with the desired selection of the object type. In another example, an artificial neural network may be configured to select object types based on images and/or videos, and the artificial neural network may be used to analyze the image and select the selected object type. In some examples, the selected object type may be selected of the plurality of alternative object types at random. In some examples, the selected object type may be received from the user using a user interface (for example, using a keyboard, using a computer mouse, using a touch screen, using gestures, etc.), read from memory (for example from memory unit 210, shared memory module 410, etc.), read from a blockchain, received through a communication network (such as communication network 130) using a communication device (such as communication module 230), received from an external device (such as mobile phone 111, tablet 112, PC 113, remote storage 140, NAS 150, server 300, cloud platform 400, etc.), and so forth.

In some embodiments, in Step 1520 an image may be presented to a user. For example, an image may be presented to a user using a display screen, an augmented reality display system, a printer, and so forth. For example, the image may comprise a depiction of one or more items.

In some embodiments, in Step 1530 an input to an object selection tool may be received, for example from the user. For example, the input to the object selection tool may be received from the user using a user interface (for example, using a keyboard, using a computer mouse, using a touch screen, using gestures, etc.), read from memory (for example from memory unit 210, shared memory module 410, etc.), read from a blockchain, received through a communication network (such as communication network 130) using a communication device (such as communication module 230), received from an external device (such as mobile phone 111, tablet 112, PC 113, remote storage 140, NAS 150, server 300, cloud platform 400, etc.), and so forth. Some non-limiting examples of such inputs to the object selection tool may include an indication of one or more positions within the image presented by Step 1520, an indication of one or more regions within the image presented by Step 1520, an indication of one or more contours within the image presented by Step 1520, an indication of one or more masks of the image presented by Step 1520, an indication of one or more subsets of the pixels of the image presented by Step 1520, and so forth.

In some embodiments, in Step 1540, a region of the image corresponding to an object of the selected object type of Step 1510 in the image presented by Step 1520 may be selected based on the input to the object selection tool received by Step 1530 and the selected object type of Step 1510. In some examples, in response to a first selected object type and the input to the object selection tool, a first region of the image corresponding to an object of the first selected object type in the image may be selected, and in response to a second selected object type and the input to the object selection tool, a second region of the image corresponding to an object of the second selected object type in the image may be selected, where the first region may differ from the second region. For example, a machine learning model may be trained using training examples to select regions of images according to inputs to object selection tools and object types, and the trained machine learning model may be used to analyze the image and select the region based on the input to the object selection tool received by Step 1530 and the selected object type of Step 1510. An example of such training example may include an image with an input to an object selection tool and a selection of object type, together with the desired selection of a region in the image. In another example, an artificial neural network may be configured to select regions of images according to inputs to object selection tools and selection of object types, and the artificial neural network may be used to analyze the image and select the region based on the input to the object selection tool received by Step 1530 and the selected object type of Step 1510. In yet another example, a plurality of alternative object selection tools may be available, where each one or the alternative object selection tools may correspond to a particular object type, an object selection tool corresponding to the selected object type of Step 1510 may be selected of the plurality of alternative object selection tools, the input to the object selection tool received by Step 1530 may be provided to the selected object selection tool corresponding to the selected object type of Step 1510, and selection of the region of the image by Step 1540 may be based on the output of the selected object selection tool corresponding to the selected object type of Step 1510.

For example, the first selected object type of Step 1510 may be a person together objects held by the person and the second selected object type of Step 1510 may be a person not including objects held by the person, in response to the first selected object type and the input to the object selection tool received by Step 1530, a first region of the image corresponding to a person and an object held by the person in the image may be selected by Step 1540, and in response to the second selected object type and the input to the object selection tool received by Step 1530, a second region of the image corresponding to the person without the object held by the person in the image may be selected by Step 1540, and therefore the first region may differ from the second region. Some examples of objects held by the person may include bags, cap, smartphone, jacket, and so forth. For example, Step 1520 may present an image of a person holding a bag in a room, and Step 1530 may receive a bounding box around the person holding the bag, as illustrated in FIG. 16A. Further, in this example, in response to an indication of a selected object type of a person together objects held by the person received by Step 1510 and the bounding box received by Step 1530, a region of the image corresponding to the person and the bag held by the person in the image may be selected by Step 1540 as illustrated in FIG. 16B. Further, in this example, in response to an indication of a selected object type of a person not including objects held by the person received by Step 1510 and the bounding box received by Step 1530, a region of the image corresponding to the person without the bag held by the person in the image may be selected by Step 1540 as illustrated in FIG. 16C.

In another example, the first selected object type of Step 1510 may be a person including occluded parts and the second selected object type of Step 1510 may be a person except for occluded parts. in response to the first selected object type and the input to the object selection tool received by Step 1530, a first region of the image corresponding to a person together with parts of the person that are occluded in the image may be selected by Step 1540, and in response to the second selected object type and the input to the object selection tool received by Step 1530, a second region of the image corresponding to the person without the parts of the person that are occluded in the image may be selected by Step 1540, and therefore the first region may differ from the second region. In some examples, a machine learning model may be trained using training examples to estimate the region of the image corresponding to the person including to parts of the person that are occluded in the image based on the visible parts of the person in the image and/or other visual data in the image, and the trained machine learning model may be used to analyze the image and select the region of the image frame corresponding to the person together with parts of the person that are occluded in the image. An example of such training example may include an image together with the desired selection of a region in the image. In some examples, the image may be an image frame from a video, and parts of the person that are occluded in the image frame may be visible in other frames of the video (for example, in consecutive frames, in a different segment of the video, and so forth). Further, in one example, a machine learning model may be trained using training examples to estimate the region of the image frame corresponding to the person (including parts of the person that are occluded in the image frame) based on other frames of the video, and the trained machine learning model may be used to analyze the video and select the region of the image frame corresponding to the person together with parts of the person that are occluded in the image. An example of such training example may include a video together with a desired selection of a region in an image frame of the video corresponding to a person including parts of the person that are occluded in that image frame. For example, Step 1520 may present an image of a person behind a fruit stand, and Step 1530 may receive an indication of the person (for example by an "x" marker pointing to the depiction of the person in the image), as illustrated in FIG. 16D. Further, in this example, in response to an indication of a selected object type of a person including occluded parts received by Step 1510 and the input "x" marker received by Step 1530, a region of the image corresponding to the person including occluded parts of the person may be selected by Step 1540 as illustrated in FIG. 16D. Further, in this example, in response to an indication of a selected object type of a person except for occluded parts of the person received by Step 1510 and the input "x" marker received by Step 1530, a region of the image corresponding to the person without the occluded parts of the person may be selected by Step 1540 as illustrated in FIG. 16F.

In yet another example, the first selected object type of Step 1510 may be male and the second selected object type of Step 1510 may be female, in response to the first selected object type and the input to the object selection tool received by Step 1530, a first region of the image corresponding to a male figure in the image may be selected by Step 1540, and in response to the second selected object type and the input to the object selection tool received by Step 1530, a second region of the image corresponding to a female figure in the image may be selected by Step 1540, and therefore the first region may differ from the second region.

In an additional example, the first selected object type of Step 1510 may be face including hair and the second selected object type of Step 1510 may be face except for hair, in response to the first selected object type and the input to the object selection tool received by Step 1530, a first region of the image corresponding to a face and the hair corresponding to the face in the image may be selected by Step 1540, and in response to the second selected object type and the input to the object selection tool received by Step 1530, a second region of the image corresponding to the face except for the hair corresponding to the face in the image may be selected by Step 1540, and therefore the first region may differ from the second region.

In yet another example, the first selected object type of Step 1510 may be a single instance of an object of a specified object type and the second selected object type of Step 1510 may be one or more instances of objects of the specified object type, in response to the first selected object type and the input to the object selection tool received by Step 1530, a first region of the image corresponding to a single instance of an object in the image may be selected by Step 1540, and in response to the second selected object type and the input to the object selection tool received by Step 1530, a second region of the image corresponding to a plurality of instances of the object in the image may be selected by Step 1540, and therefore the first region may differ from the second region.

In an additional example, the first selected object type of Step 1510 may be a person and the second selected object type of Step 1510 may be a vehicle, in response to the first selected object type and the input to the object selection tool received by Step 1530, a first region of the image corresponding to a person in the image may be selected by Step 1540, and in response to the second selected object type and the input to the object selection tool received by Step 1530, a second region of the image corresponding to a vehicle in the image may be selected by Step 1540, and therefore the first region may differ from the second region.

In yet another example, the first selected object type of Step 1510 may be a car and the second selected object type of Step 1510 may be a truck, in response to the first selected object type and the input to the object selection tool received by Step 1530, a first region of the image corresponding to a car in the image may be selected by Step 1540, and in response to the second selected object type and the input to the object selection tool received by Step 1530, a second region of the image corresponding to a truck in the image may be selected by Step 1540, and therefore the first region may differ from the second region.

In some examples, the input to the object selection tool received by Step 1530 may comprise one or more points in the image (for example the input may indicate that the one or more points are part of the object), and the region of the image selected by Step 1540 may include the one or more points and at least one additional pixel of the image. Further, in some examples, the input to the object selection tool received by Step 1530 may comprise one or more additional points in the image (for example the input may indicate that the one or more additional points are not part of the object), and the region of the image selected by Step 1540 may not include any of the one or more additional points. For example, selecting the region of the image selected by Step 1540 may comprise solving an optimization problem that optimize some criterion function over the selected region under some constraints about the valid selected regions, and in some examples the constraints may specify that the one or more points must be within the selected region and/or that the one or more additional points must be outside the selected region.

In some examples, the input to the object selection tool received by Step 1530 may comprise one or more scribbles in the image (for example the input may indicate that the one or more areas indicated by the scribbles are part of the object), and the region of the image selected by Step 1540 may include the one or more scribbles and at least one additional pixel of the image. Further, in some examples, the input to the object selection tool received by Step 1530 may comprise one or more additional scribbles in the image (for example the input may indicate that the one or more areas indicated by the additional scribbles are not part of the object), and the region of the image selected by Step 1540 may not include any of the one or more additional scribbles. For example, selecting the region of the image selected by Step 1540 may comprise solving an optimization problem that optimize some criterion function over the selected region under some constraints about the valid selected regions, and in some examples the constraints may specify that the one or more areas indicated by the scribbles must be within the selected region and/or that the one or more areas indicated by the additional scribbles must be outside the selected region.

In some examples, the input to the object selection tool received by Step 1530 may comprise a bounding polygon (such as a bounding box, a bounding triangle, etc.), and the region of the image selected by Step 1540 may be included within the bounding polygon. For example, selecting the region of the image selected by Step 1540 may comprise solving an optimization problem that optimizes some criterion function over the selected region under some constraints about the valid selected regions, and in some examples the constraints may specify that the selected region must be contained within the bounding polygon.

In some embodiments, after the selection of the first region of the image corresponding to the object of the first selected object type in the image by Step 1540, an indication of a desire to change the selected object type to an updated object type may be received from the user (where the updated object type differs from the first selected object type), and in response to the received indication of the desire to change the selected object type, the updated object type and the input to the object selection tool may be used to select a modified region of the image corresponding to an object of the updated object type in the image. For example, Step 1540 may be repeated with the updated object type and the input to the object selection tool to select the modified region of the image corresponding to the object of the updated object type in the image.

In some examples, an overlay may be presented over the presentation of the image, and the overlay may indicate the region of the image selected by Step 1540. For example, the overlay may include a bounding contour of the selected region. In another example, the selected region may be presented with a first color scheme while the rest of the image may be presented with a second color scheme. In yet another example, the selected region may be presented with a first blurring settings (for example, without blurring, with low blurring, etc.) while the rest of the image may be presented with a second blurring settings. In an additional example, an overlay may include a first pattern over the selected region (for example, no pattern, dots pattern, lines pattern, and so forth) and a different pattern over the rest of the image (for example, no pattern, dots pattern, lines pattern, and so forth).

In some examples, a dataset of images and masks (for example of datasets 610) may be updated according to the region of the image selected by Step 1540. For example, the image presented by Step 1520 and a mask corresponding to the region of the image selected by Step 1540 may be added to the dataset. In another example, the image presented by Step 1520 may already be part of the dataset, and a mask corresponding to the region of the image selected by Step 1540 may be added to the dataset in connection to the image and/or may replace another mask in the dataset that is connected with the image.

In some embodiments, the image presented by Step 1520 and the input to the object selection tool received by Step 1530 may be analyzed to determine whether a region of the image corresponding to the input to the object selection tool depicts an object of the selected object type of Step 1510. Further, in some examples, in response to a determination that the region of the image corresponding to the input to the object selection tool does not depict an object of the selected object type, an indication may be provided to the user. For example, the indication may be provided visually, may be provided audibly, may be provided textually, may be provided through a personalized device associated with a user, may be provided through a public device, and so forth. In some examples, a machine learning model may be trained using training examples to determine whether regions of images indicated by inputs to object selection tools depict objects of particular types, and the trained machine learning model may be used to analyze the image presented by Step 1520 and the input to the object selection tool received by Step 1530 to determine whether the region of the image corresponding to the input to the object selection tool depicts an object of the selected object type of Step 1510. An example of such training example may include an image and an input to the object selection tool together with an indication of whether the region of the image corresponding to the input to the object selection tool depicts an object of a selected object type. In another example, an artificial neural network may be configured to determine whether regions of images indicated by inputs to object selection tools depict objects of particular types, and the artificial neural network may be used to analyze the image presented by Step 1520 and the input to the object selection tool received by Step 1530 to determine whether the region of the image corresponding to the input to the object selection tool depicts an object of the selected object type of Step 1510.

Figure 17:
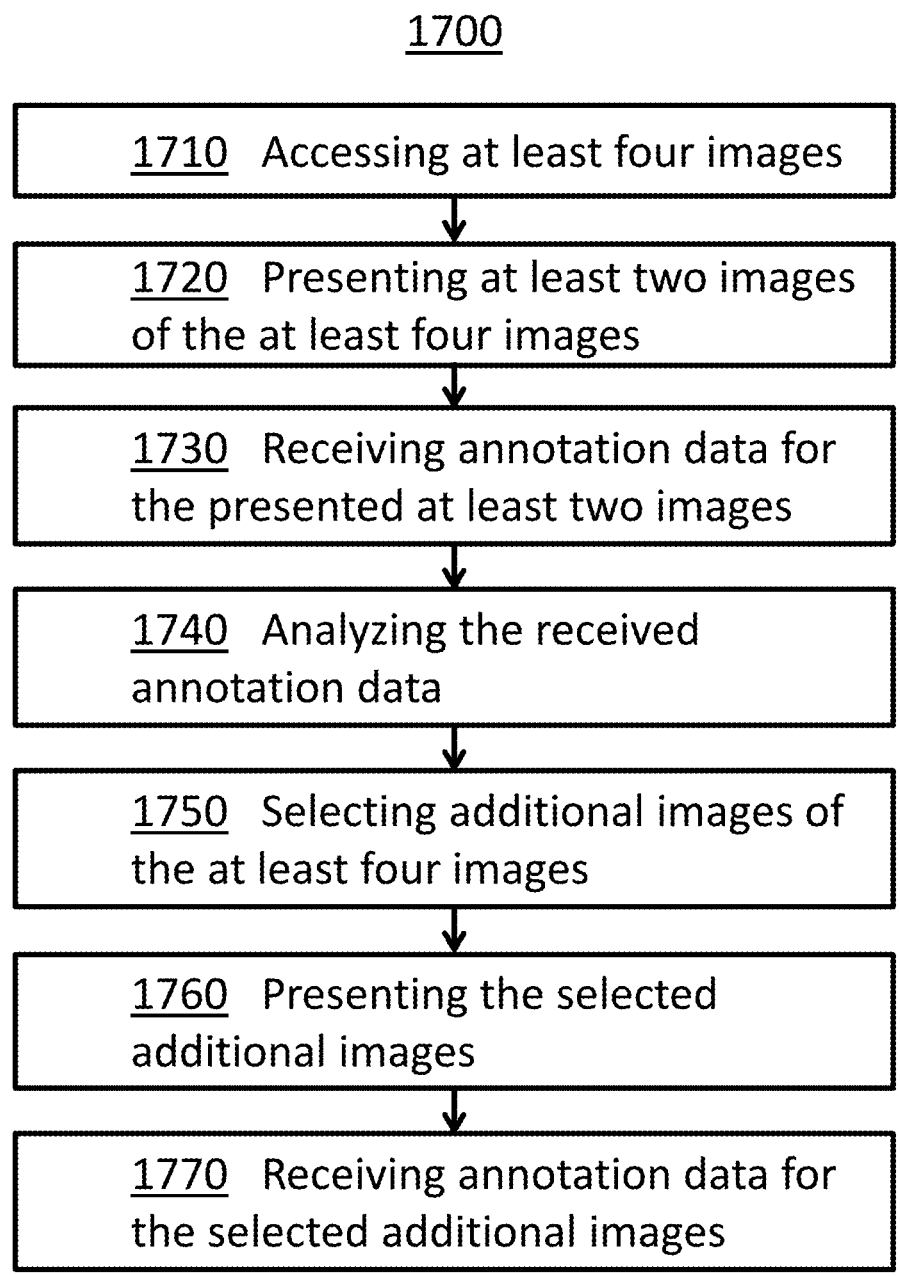
FIG. 17 illustrates an example of a method for selecting images for manual annotation.

FIG. 17 illustrates an example of a method 1700 for selecting images for manual annotation. In this example, method 1700 may comprise: accessing at least four images (Step 1710); presenting at least two images of the at least four images (Step 1720); receiving annotation data for the presented at least two images (Step 1730); analyzing the received annotation data (Step 1740); selecting additional images of the at least four images (Step 1750); presenting the selected additional images (Step 1760); and receiving annotation data for the selected additional images (Step 1770). In some implementations, method 1700 may comprise one or more additional steps, while some of the steps listed above may be modified or excluded. For example, in some cases Step 1710 and/or Step 1720 and/or Step 1750 and/or Step 1760 may be excluded from method 1700. In some implementations, one or more steps illustrated in FIG. 17 may be executed in a different order and/or one or more groups of steps may be executed simultaneously and/or a plurality of steps may be combined into single step and/or a single step may be broken down to a plurality of steps.

In some embodiments, in Step 1710 a group of images may be accessed. Further, in some examples, points in time corresponding to the group of images may also be accessed. For example, the group of images may comprise a first image that may correspond to a first point in time, a second image that may correspond to a second point in time and at least two more images, each image of the at least two more images may correspond to a point in time. For example, an image may correspond to a time of capturing of the image, may correspond to a time of processing of the image, may correspond to a time associated with an object depicted in the images (for example, a sample may be depicted in the image and the image may correspond to the sampling time of the sample, a document may be depicted in the image and the image may correspond to editing time of the document, etc.), and so forth. In another example, the images may be frames in video, and the images may correspond to time indices of the frames within the video. For example, in Step 1710, the group of images and/or the points in time corresponding to the group of images may be read from memory (for example from memory unit 210, shared memory module 410, etc.), read from a blockchain, received through a communication network (such as communication network 130) using a communication device (such as communication module 230), received from an external device (such as mobile phone 111, tablet 112, PC 113, remote storage 140, NAS 150, server 300, cloud platform 400, etc.), and so forth. In another example, in Step 1710 the group of images may be captured using image sensors (such as image sensor 260), may be extracted from a video, and so forth. In yet another example, in Step 1710 metadata associated with the images (such as file name, time associated with the image as described above, description of the image, and so forth) may be accessed.

In some embodiments, in Step 1720 at least part of at least some of the images of the group of images accessed by Step 1710 may be presented to a user. For example, at least part of the first image of the group of images obtained by Step 1710 and/or at least part of the second image of the group of images accessed by Step 1710 may be presented to the user. For example, (the parts of) the images may be presented through a user interface, through a web service, through a display screen, through an augmented reality system, through a personalized device of the user, through a public device, through an external device, and so forth.

In some embodiments, in Step 1730 annotation data associated with the images of the group of images accessed by Step 1710 and/or presented by Step 1720 may be received from the user. For example, first annotation data associated with the first image of the group of images obtained by Step 1710 and/or second annotation data associated with the second image of the group of images obtained by Step 1710 may be received from the user. For example, in Step 1730 the annotation data may be read from memory (for example from memory unit 210, shared memory module 410, etc.), read from a blockchain, received through a communication network (such as communication network 130) using a communication device (such as communication module 230), received from an external device (such as mobile phone 111, tablet 112, PC 113, remote storage 140, NAS 150, server 300, cloud platform 400, etc.), and so forth. For example, the annotation data of Step 1730 and/or the annotation data of Step 1770 may comprise a label of an image and/or of an item depicted in the image, a tag of an image and/or of an item depicted in the image, a classification of the image and/or of an item depicted in the image, an indication of a location of an object within the image (for example as a point, a mask, a bounding polygon, and so forth), a value associated with the image and/or of an item depicted in the image, a textual description of the image and/or of an item depicted in the image, a segmentation of the image, and so forth.

In some embodiments, in Step 1740 the annotation data received by Step 1730 and associated with the images of the group of images accessed by Step 1710 and/or presented by Step 1720 may be analyzed. In some examples, in Step 1740 the first annotation data and the second annotation data received by Step 1730 may be compared. For example, a label of the first annotation data may be compared with a label of the second annotation data to determine whether the two are identical or not and/or to calculate a measure of similarity between the two, a tag of the first annotation data may be compared with a tag of the second annotation data to determine whether the two are identical or not and/or to calculate a measure of similarity between the two, a classification data of the first annotation data may be compared with a classification data of the second annotation data to determine whether the two are identical or not and/or to calculate a measure of similarity between the two, a value of the first annotation data may be compared with a value of the second annotation data to determine whether the two are identical or not and/or to calculate a measure of similarity between the two, a location within a first image of the first annotation data may be compared with a location within a second image of the second annotation data to determine whether the two are identical or not and/or to calculate a measure of similarity between the two, a region of a first image of the first annotation data may be compared with a region of a second image of the second annotation data to determine whether the two are identical or not and/or to calculate a measure of similarity between the two, textual information of the first annotation data may be compared with textual information of the second annotation data to determine whether the two are identical or not and/or to calculate a measure of similarity between the two, and so forth. For example, a similarity between two values may be calculated as a monotonically decreasing function of a distance between the two values, as a function of a correlation between the two values, and so forth. In another example, a similarity between two regions may be calculated using the Jaccard index of the two regions, using the Sørensen-Dice coefficient of the two regions, using the Tversky index of the two regions, and so forth. In yet another example, a similarity between two texts may be calculated using a most-frequent-k-characters distance, hamming distance, distance between the two texts in an embedded space (for example, embedded space created using word2vec algorithm), and so forth.

In some embodiments, in Step 1750 additional images may be selected of the group of images accessed by Step 1710. For example, a third image may be selected of the at least two more images accessed by Step 1710. For example, the additional images (such as the third image above) may be selected based on, for example, a result of the analysis of Step 1740 (for example, based on a result of the comparison of the first annotation data and the second annotation data by Step 1740), and the points in time corresponding to the group of images accessed by Step 1710 (for example, the first point in time, the second point in time, and the points in time corresponding to at least some of the at least two more images). For example, a machine learning model may be trained using training examples to select images of a plurality of alternative images based on comparison results and/or points in time, and the trained machine learning model may be used to analyze the comparison of the first annotation data and the second annotation data by Step 1740 and/or and the points in time corresponding to the group of images accessed by Step 1710 and select the additional images of the at least two more images accessed by Step 1710. An example of such training example may comprise comparison results and/or points in time, together with a desired selection of images of a plurality of alternative images. In another example, an artificial neural network may be configured to select images of a plurality of alternative images based on comparison results and/or points in time, and the artificial neural network may be used to analyze the comparison of the first annotation data and the second annotation data by Step 1740 and/or and the points in time corresponding to the group of images accessed by Step 1710 and select the additional images of the at least two more images accessed by Step 1710. In yet another example, the selection of the additional images of the at least two more images accessed by Step 1710 by Step 1750 may be based on one or more of a comparison of a label of the first annotation data with a label of the second annotation data as described above, a comparison of a tag of the first annotation data with a tag of the second annotation data as described above, a comparison of a classification data of the first annotation data with a classification data of the second annotation data as described above, a comparison of a value of the first annotation data with a value of the second annotation data as described above, a comparison of a location within a first image of the first annotation data with a location within a second image of the second annotation data as described above, a comparison of a region within a first image of the first annotation data with a region within a second image of the second annotation data as described above (for example based on one or more of the Jaccard index of the two regions, the Sørensen-Dice coefficient of the two regions, the Tversky index of the two regions, etc.), a comparison of textual information of the first annotation data with textual information of the second annotation data as described above, and so forth.

In some examples, in Step 1750, in response to a first result of the analysis of Step 1740 (for example, in response to a first result of the comparison of the first annotation data and the second annotation data by Step 1740), the third image of the at least two more images may be selected such that the third image corresponds to a point in time between the first point in time and the second point in time, and in response to a second result of the analysis of Step 1740 (for example, in response to a second result of the comparison of the first annotation data and the second annotation data), the third image of the at least two more images corresponding to a third point in time may be selected such that the second point in time is between the first point in time and the third point in time.

In some examples, in Step 1750, in response to a first result of the analysis of Step 1740 (for example, in response to a first result of the comparison of the first annotation data and the second annotation data by Step 1740), the third image of the at least two more images may be selected such that the third image corresponds to a point in time closer to the first point in time than to the second point in time, and in response to a second result of the analysis of Step 1740 (for example, in response to a second result of the comparison of the first annotation data and the second annotation data), the third image of the at least two more images may be selected such that the third image corresponds to a point in time closer to the second point in time than to the first point in time.

In some embodiments, in Step 1760 at least part of the additional images selected by Step 1750 may be presented to the user. For example, in Step 1760 at least part of the third image selected by Step 1750 may be presented to the user. For example, at least part of the additional images selected by Step 1750 may be presented to the user. For example, (the parts of) the additional images may be presented through a user interface, through a web service, through a display screen, through an augmented reality system, through a personalized device of the user, through a public device, through an external device, and so forth.

In some embodiments, in Step 1770 annotation data associated with the additional images selected by Step 1750 and/or presented by Step 1760 may be received from the user. For example, third annotation data associated with the third image selected by Step 1750 and/or presented by Step 1760 may be received from the user. For example, in Step 1770 the annotation data may be read from memory (for example from memory unit 210, shared memory module 410, etc.), read from a blockchain, received through a communication network (such as communication network 130) using a communication device (such as communication module 230), received from an external device (such as mobile phone 111, tablet 112, PC 113, remote storage 140, NAS 150, server 300, cloud platform 400, etc.), and so forth.

In some examples, a dataset of images and annotations (for example of datasets 610) may be updated according to the additional images selected by Step 1750 and/or presented by Step 1760 (such as the selected third image) and the annotation data associated with the additional images and received from the user by Step 1770 (such as the third annotation data received from the user by Step 1770). For example, the image and the annotation data may be added to the dataset. In another example, the image may already be part of the dataset, and the annotation data may be added to the dataset in connection to the image and/or may replace another annotation data in the dataset that is connected with the image.

In some embodiments, a quantity may be selected based on a result of the analysis of Step 1740 (for example, based on a result of the comparison of the first annotation data and the second annotation data by Step 1740), for example as described below. Further, in some examples, in Step 1750 a set of images may be selected of the at least two more images accessed by Step 1710, such that a quantity of images in the selected set of images matches the selected quantity, for example as described below. Further, in some examples, the selected set of images may be presented to the user, for example as described above in relation to Step 1720. Further, in some examples, annotation data associated with each of the selected set of images may be received from the user, for example as described above in relation to Step 1730.

In some examples, a quantity may be selected based on a result of the analysis of Step 1740 (for example, based on a result of the comparison of the first annotation data and the second annotation data by Step 1740). For example, in response to a first result of the analysis of Step 1740 (for example, a first result of the comparison of the first annotation data and the second annotation data by Step 1740), a first quantity may be selected, and in response to a second result of the analysis of Step 1740 (for example, a second result of the comparison of the first annotation data and the second annotation data by Step 1740), a second quantity may be selected. In another example, the quantity may be a function of the result of the analysis of Step 1740 (for example, a function of a result of the comparison of the first annotation data and the second annotation data by Step 1740). In yet another example, a machine learning model may be trained to select quantities based on comparison results, and the trained machine learning model may be used to analyze the comparison result of Step 1740 and select the quantity.

In some examples, in Step 1750 a set of images may be selected of the at least two more images accessed by Step 1710, such that a quantity of images in the selected set of images matches the selected quantity. For example, the selection of the set of images may be performed by Step 1750 as described above. In another example, Step 1750 may select a quantity of images that is higher than the desired quantity, the images may be ranked, and the images with the highest rank may be picked such that the quantity of picked images matches the selected quantity. For example, Step 1750 may use a machine learning model as described above, many machine learning models may further produce a confidence level for each selected image, and such confidence levels may be used for ranking the images (having a higher rank for an image corresponding to a higher confidence). In yet another example, the selected (parts of) images may be ranked according to size, assigning a higher rank for larger images.

In some embodiments, an embedding in a mathematical space of the group of images accessed by Step 1710 may be determined, for example as described below. Further, in some examples, in Step 1750 the determined embedding of the images in the mathematical space may be used to select additional images of the group of images accessed by Step 1710, for example as described below.

In some examples, an embedding in a mathematical space of the group of images accessed by Step 1710 may be determined. For example, an embedding in a mathematical space of at least the first image, the second image and the at least two more images accessed by Step 1710 may be determined, for example as described below.

In some examples, the embedding in the mathematical space of the group of images accessed by Step 1710 may be determined based on pixel data of the images in the group of images. For example, the embedding in the mathematical space of at least the first image, the second image and the at least two more images accessed by Step 1710 may be determined based on pixel data of the first image, pixel data of the second image and pixel data of at least some of the at least two more images.

In some examples, the embedding in the mathematical space of the group of images accessed by Step 1710 may be determined based on pixel data of the images in the group of images and points in time corresponding to the group of images accessed by Step 1710. For example, the embedding in the mathematical space of at least the first image, the second image and the at least two more images accessed by Step 1710 may be determined based on pixel data of the first image, pixel data of the second image, pixel data of at least some of the at least two more images, the first point in time, the second point in time, and the points in time corresponding to at least some of the at least two more images. In some examples, a mathematical vector corresponding to an image may be concatenated with a mathematical value and/or a mathematical vector corresponding to a point in time, and the resulting mathematical vector for the relevant images and points in time (for example as described above) may be used to determine the embedding in the mathematical space of the group of images accessed by Step 1710, for example using principal component analysis (PCA), using Fisher's (linear discriminant analysis) LDA, using minor component analysis (MCA), using t-distributed stochastic neighbor embedding (t-SNE), and so forth. For example, the mathematical vector corresponding to an image may be generated by a mathematical vectorization of a matrix, where each entry in the matrix corresponds to a pixel in the image and comprise a value related to that pixel (such as gray level of the pixel, value of a color component of the pixel, value of an edge detector for that pixel, value of a convolution for that pixel, and so forth). In another example, the mathematical vector corresponding to an image may be generated by an object detector and comprise information about objects detected in the image by the object detector, such as number of detected objects, locations of detected objects, type of detected objects, properties of detected objects (such as size, color, etc.), and so forth. In yet another example, the mathematical vector corresponding to a point in time may comprise a single value corresponding to the number of time units passed since a particular time to the point in time, a vector with values describing the point in time (such as second, minute, hour, day, month, year, and so forth).

In some examples, in Step 1750 the determined embedding of the images in the mathematical space may be used to select additional images of the at least two more images accessed by Step 1710. For example, in Step 1750 the determined embedding in the mathematical space of at least the first image, the second image and the at least two more images may be used to select the third image of the at least two more images. In some examples, a centroid in the mathematical space of the embedding of the first image, the embedding of the second image, and in some examples embedding of other images, may be calculated. Further, the centroid may be used by Step 1750 to select additional images of the at least two more images accessed by Step 1710, for example by selecting the images closest to the centroid of the at least two more images accessed by Step 1710, by selecting the images farthest from the centroid, and so forth. In some examples, the images of at least two more images accessed by Step 1710 with the maximal minimal distance to the any one of the first image accessed by Step 1710 and the second image accessed by Step 1710.

In some embodiments, the group of images accessed by Step 1710 may be a group of frames of a video. For example, the first image may be a first frame of the video, the second image may be a second frame of the video, and the at least two more images may be at least two more frames of the video. Further, in some examples, in response to a first result of the analysis of Step 1740 (for example, in response to a first result of the comparison of the first annotation data and the second annotation data), a first frame rate may be selected, and in response to a second result of the analysis of Step 1740 (for example, in response to a second result of the comparison of the first annotation data and the second annotation data), a second frame rate may be selected, where the second frame rate may differ from the first frame rate. Further, in some examples, frames of at least part of the video may be sampled at the selected frame rate, for example as described below. Further, in some examples, the sampled frames may be presented to the user. For example, the obtained video of the selected frame rate may be played using a video player. In another example, individual frames of the sampled frames may be presented to the used, for example as described in relation to Step 1760. Further, in some examples, annotation data associated with the sampled frames may be received from the user. For example, annotation data related to the entire obtained video may be received (for example, with annotation data related to an action depicted in the obtained video, related to an event depicted in the obtained video, to motion depicted in the obtained video, and so forth). In another example, annotation data related to individual frames of the sampled frames may be received, for example as described in relation to Step 1770.

In some examples, frames of at least part of the video may be sampled at the selected frame rate. For example, the at least part of the video may be in a frame rate that is higher than the selected frame rate, and some of the frames of the at least part of the video may be dropped to obtain a video of the selected frame rate. In another example, the at least part of the video may be in a frame rate that is lower than the selected frame rate, intra-frames interpolation may be used to generate additional frames, and the generated additional frames may be added to the at least part of the video to obtain a video of the selected frame rate.

In some embodiments, in response to a first result of the analysis of Step 1740 (for example, in response to a first result of the comparison of the first annotation data and the second annotation data), a first image resolution may be selected, and in response to a second result of the analysis of Step 1740 (for example, in response to a second result of the comparison of the first annotation data and the second annotation data), a second image resolution may be selected, where the second image resolution may differ from the first image resolution. Further, in some examples, at least part of the selected third image may be presented in the selected resolution by Step 1760. Further, third annotation data associated with the third image may be received from the user as described above in relation to Step 1770, for example in response to the presentation of the at least part of the selected third image in the selected resolution. For example, the third image may be in an image resolution that is higher than the selected image resolution, and some of the pixels of the third image may be dropped to obtain an image of the selected image resolution. In another example, the third image may be in an image resolution that is lower than the selected image resolution, pixel interpolation may be used to generate additional pixels, and the generated additional pixels may be added to the third image to obtain an image of the selected image resolution.

In some embodiments, in response to a first result of the analysis of Step 1740 (for example, in response to a first result of the comparison of the first annotation data and the second annotation data), a first image augmentation may be selected, and in response to a second result of the analysis of Step 1740 (for example, in response to a second result of the comparison of the first annotation data and the second annotation data), a second image augmentation may be selected, where the second image augmentation may differ from the first image augmentation. Further, in some examples, the selected image augmentation may be applied to at least part of the third image to obtain an augmented image. Further, in some examples, at least part of the obtained augmented image may be presented to the user by Step 1760. Further, in some examples, third annotation data associated with the third image may be received from the user as described above in relation to Step 1770, for example in response to the presentation of the at least part of the obtained augmented image. Some examples of such image augmentations may include shifting the image, flipping the image, rotating the image, zooming, changing brightness, blurring the image, sharpening the image, applying a convolution to the image, cropping the image, and so forth.

In some embodiments, the first image and the second image accessed by Step 1710 and the first annotation data and the second annotation data received by Step 1730 may be used to train a machine learning algorithm and obtain an inference model, for example as described above with the first image and the second image with the corresponding annotations used as training examples in the training of the machine learning algorithm. Further, in some examples, the obtained inference model may be used to obtain at least one inferred result for each image of the at least two more images accessed by Step 1710, for example as described above. Further, in some examples, in Step 1750 the third image of the at least two more images may be selected based on a result of the comparison of the first annotation data and the second annotation data, the first point in time, the second point in time, the points in time corresponding to at least some of the at least two more images and the obtained inferred results associated with at least some of the at least two more images. For example, a machine learning model may be trained using training examples to select images of a plurality of alternative images based on comparison results and/or points in time and/or inferred results associated with the alternative images, and the trained machine learning model may be used to analyze the comparison of the first annotation data and the second annotation data by Step 1740 and/or and the points in time corresponding to the group of images accessed by Step 1710 and/or inferred results associated with at least some of the at least two more images and select the additional images of the at least two more images accessed by Step 1710. An example of such training example may comprise comparison results and/or points in time and/or inferred results, together with a desired selection of images of a plurality of alternative images. In another example, an artificial neural network may be configured to select images of a plurality of alternative images based on comparison results and/or points in time and/or inferred results associated with the alternative images, and the artificial neural network may be used to analyze the comparison of the first annotation data and the second annotation data by Step 1740 and/or and the points in time corresponding to the group of images accessed by Step 1710 and/or inferred results associated with at least some of the at least two more images and select the additional images of the at least two more images accessed by Step 1710.

In some embodiments, the first image and the second image accessed by Step 1710 and the first annotation data and the second annotation data received by Step 1730 may be used to train a machine learning algorithm and obtain an inference model, for example as described above. Further, in some examples, at least two augmented images may be generated for each image of the at least two more images accessed by Step 1710, for example as described above. Further, in some examples, the obtained inference model may be used to obtain a plurality of inferred results for each image of the at least two more images accessed by Step 1710, wherein the plurality of inferred results corresponding to any particular image of the at least two more images may comprise at least one inferred result for each augmented image of the generated at least two augmented images corresponding to the particular image. For example, each augmented image of the generated at least two augmented images corresponding to the particular image may be used as input to the obtained inference model to obtain an inferred result, for example as described above. Further, in some examples, the plurality of inferred results of each image of the at least two more images accessed by Step 1710 may be analyzed to obtain a stability assessment for each image of the at least two more images, for example as described below. Further, in some examples, in Step 1750 the stability assessments associated with at least some of the at least two more images accessed by Step 1710 may be used to select the third image of the at least two more images.

In some examples, the plurality of inferred results of each image of the at least two more images accessed by Step 1710 may be analyzed to obtain a stability assessment for each image of the at least two more images. For example, a plurality of inferred results may comprise two inferred results, the two inferred results may be compared to determine a measure of similarity (or a measure of dissimilarity) between the two inferred results, and the stability assessment may be based on the determined measure of similarity (or the determined measure of dissimilarity), for example by taking a function of the measure as the stability assessment. In another example, a statistical measure may be calculated for a plurality of inferred results (such as standard deviation, variance, and so forth), and the stability assessment may be based on the calculated statistical measure, for example by taking a function of the statistical measure as the stability assessment.

In some examples, in Step 1750 the stability assessments associated with at least some of the at least two more images accessed by Step 1710 may be used to select the third image of the at least two more images. For example, the image with the least stable plurality of inferred results of the at least two more images accessed by Step 1710 according to the stability assessments may be selected by Step 1750 as the third image. In another example, the stability according to the stability assessment of a plurality of inferred results corresponding to an image may be combined with additional information corresponding to the image (for example, information as described above) to obtain a combined score for the image, and Step 1750 may select the third image of the at least two more images based on the combined score (for example, selecting the image with the highest combined score, the image with the lowest combined score, the image with the combined score closest to a particular value, the image with the combined score closest to the mean of the combined scores, the image with the combined score closest to the median of the combined scores, and so forth).

What is claimed is:

1. A method for presenting inference models based on interrelationships among inference models, the method comprising:

obtaining information related to a group of at least three inference models, each inference model comprises an artificial neural network, each artificial neural network corresponds to a network graph;

obtaining a plurality of interrelationship records, wherein each interrelationship record corresponds to one subgroup of the group of at least three inference models, each subgroup comprises at least two inference models, and each interrelationship record is generated by using an inexact graph matching algorithm to compare the network graphs of each artificial neural network of the at least two inference models included in the subgroup corresponding to the interrelationship record to determine a matching score between each artificial neural network of the at least two inference models;

using the plurality of interrelationship records to determine information related to a first inference model of the group of at least three inference models; and using the determined information to present the first inference model to a user.

2. The method of claim 1, further comprising:

analyzing a first subgroup of the group of at least three inference models to generate the interrelationship record corresponding to the first subgroup; and using the generated interrelationship record corresponding to the first subgroup to determine the information related to the first inference model.

3. The method of claim 1, wherein the determined information related to the first inference model is textual information describing the first inference model.

4. The method of claim 1, further comprising:

using t-distributed stochastic neighbor embedding to analyze the plurality of interrelationship records to determine an embedding of the at least three inference models in a two dimensional space; and visually presenting the embedding of the at least three inference models in the two dimensional space.

5. The method of claim 1, further comprising:

using minor component analysis to analyze the plurality of interrelationship records to determine an embedding of the at least three inference models in a three dimensional space; and visually presenting the embedding of the at least three inference models in the three dimensional space.

6. The method of claim 1, further comprising:

using the plurality of interrelationship records to determine a hierarchical graph of the at least three inference models; and visually presenting the hierarchical graph of the at least three inference models.

7. The method of claim 1, further comprising using an interrelationship record corresponding to a subgroup of the group of at least three inference models, where the subgroup comprises exactly two inference models, to determine the information related to the first inference model.

8. The method of claim 1, further comprising using an interrelationship record corresponding to a subgroup of the group of at least three inference models, where the subgroup comprises at least three inference models, to determine the information related to the first inference model.

9. The method of claim 1, further comprising using interrelationship information based on commonality among at least two inference models to determine the information related to the first inference model.

10. The method of claim 1, further comprising using interrelationship information related to a measure based on an interrelationship between a second inference model and a third inference model to determine the information related to the first inference model, wherein both the second inference model and the third inference model differ from the first inference model.

11. The method of claim 1, further comprising using interrelationship information based on a number of layers associated with the first inference model and a number of layers associated with a second inference model to determine the information related to the first inference model.

12. The method of claim 1, further comprising using interrelationship information based on a type of at least one layer of the first inference model and a type of at least one layer of a second inference model to determine the information related to the first inference model.

13. The method of claim 1, further comprising using interrelationship information based on a number of artificial neurons associated with the first inference model and a number of artificial neurons associated with a second inference model to determine the information related to the first inference model.

14. The method of claim 1, further comprising using interrelationship information based on a type of at least one activation function of the first inference model and a type of at least one activation function of a second inference model to determine the information related to the first inference model.

15. The method of claim 1, further comprising using interrelationship information based on a measure of non-linearity associated with the first inference model and a measure of non-linearity associated with a second inference model to determine the information related to the first inference model.

16. The method of claim 1, further comprising using interrelationship information based on a plurality of results produced using the first inference model and a plurality of results produced using a second inference model to determine the information related to the first inference model.

17. The method of claim 1, further comprising using interrelationship information based on a plurality of confidence levels associated with results produced using the first inference model and a plurality of confidence levels associated with results produced using a second inference model to determine the information related to the first inference model.

18. A system for presenting inference models based on interrelationships among inference models, the system comprising:

at least one processor configured to:

obtain information related to a group of at least three inference models, each inference model comprises an artificial neural network, each artificial neural network corresponds to a network graph;

obtain a plurality of interrelationship records, wherein each interrelationship record corresponds to one subgroup of the group of at least three inference models, each subgroup comprises at least two inference models, and each interrelationship record is generated by using an inexact graph matching algorithm to compare the network graphs of each artificial neural network of the at least two inference models included in the subgroup corresponding to the interrelationship record to determine a matching score between each artificial neural network of the at least two inference models;

use the plurality of interrelationship records to determine information related to a first inference model of the group of at least three inference models; and use the determined information to present the first inference model to a user.

19. A non-transitory computer readable medium storing data and computer implementable instructions for carrying out a method for presenting inference models based on interrelationships among inference models, the method comprising:

obtaining information related to a group of at least three inference models, each inference model comprises an artificial neural network, each artificial neural network corresponds to a network graph;

obtaining a plurality of interrelationship records, wherein each interrelationship record corresponds to one subgroup of the group of at least three inference models, each subgroup comprises at least two inference models, and each interrelationship record is generated by using an inexact graph matching algorithm to compare the network graphs of each artificial neural network of the at least two inference models included in the subgroup corresponding to the interrelationship record to determine a matching score between each artificial neural network of the at least two inference models;

using the plurality of interrelationship records to determine information related to a first inference model of the group of at least three inference models; and using the determined information to present the first inference model to a user.

* * * * *